US012807389B2

(12) United States Patent
Sarageno, Jr. et al.

(10) Patent No.: US 12,807,389 B2
(45) Date of Patent: Nov. 24, 2026

(54) ACTIVE POUCHES AND METHODS OF USE

(71) Applicant: Verdant Technologies, LLC, St. Paul, MN (US)

(72) Inventors: Joseph Frank Sarageno, Jr., New Richmond, WI (US); Amanda Lundgren, St. Paul, MN (US)

(73) Assignee: Verdant Technologies, LLC, St. Paul, MN (US)

( * ) Notice: Subject to any disclaimer, the term of this patent is extended or adjusted under 35 U.S.C. 154(b) by 672 days.

(21) Appl. No.: 18/070,949

(22) Filed: Nov. 29, 2022

(65) Prior Publication Data

US 2023/0166899 A1 Jun. 1, 2023

Related U.S. Application Data

(60) Provisional application No. 63/284,060, filed on Nov. 30, 2021.

(51) Int. Cl.
*B65D 81/28* (2006.01)
*A01N 25/34* (2006.01)
(Continued)

(52) U.S. Cl.
CPC ............ *B65D 81/28* (2013.01); *A01N 25/34* (2013.01); *A01N 27/00* (2013.01); *A01P 21/00* (2021.08);
(Continued)

(58) Field of Classification Search
CPC .. B65D 81/28; B65D 75/322; B65D 81/2084; A01N 25/34; A01N 27/00; A01N 3/02;
(Continued)

(56) References Cited

U.S. PATENT DOCUMENTS 3,940,667 A 2/1976 Pearce
3,943,103 A 3/1976 Borden et al.
(Continued)

FOREIGN PATENT DOCUMENTS

CN 109527081 A 3/2019
EP 1593306 A2 11/2005
(Continued)

OTHER PUBLICATIONS

Collaborative International Pesticides Analytical Council (CIPAC) Information Sheet No. 767 (2009).
(Continued)

*Primary Examiner* — James C Yager
(74) *Attorney, Agent, or Firm* — Kagan Binder, PLLC

(57) ABSTRACT

Described herein are active pouches for obtaining selected release rates of 1-methylcyclopropene (1-MCP) therefrom. A pouch is a sealed thermoplastic containment or envelope defining an interior volume that is excluded from free exchange with the atmosphere, yet is permeable to both 1-MCP gas and water vapor. The active pouches enclose and contain a clathrate of 1-methylcyclopropene with α-cyclodextrin (1-MCP/CD). The rate of 1-MCP release from an active pouch subjected to a selected set of humidity-mediated disgorgement conditions may be varied by varying the interior volume of the active pouch relative to the amount of 1-MCP/CD contained within the active pouch.

21 Claims, 7 Drawing Sheets

(51) Int. Cl.

| | |
|---|---|
| ***A01N 27/00*** | (2006.01) |
| ***A01P 21/00*** | (2006.01) |
| ***A23B 7/152*** | (2006.01) |
| ***B31B 70/60*** | (2017.01) |
| ***B31B 70/74*** | (2017.01) |
| ***B32B 7/12*** | (2006.01) |
| ***B32B 27/08*** | (2006.01) |
| ***B32B 27/36*** | (2006.01) |
| ***B32B 37/24*** | (2006.01) |
| ***B65D 75/32*** | (2006.01) |
| ***B65D 81/20*** | (2006.01) |
| *B31B 170/00* | (2017.01) |

(52) U.S. Cl.

CPC .............. *A23B 7/152* (2013.01); *B31B 70/60* (2017.08); *B31B 70/79* (2017.08); *B32B 7/12* (2013.01); *B32B 27/08* (2013.01); *B32B 27/36* (2013.01); *B32B 37/24* (2013.01); *B65D 75/322* (2013.01); *B65D 81/2084* (2013.01); *B31B 2170/00* (2017.08); *B32B 2037/243* (2013.01); *B32B 2255/10* (2013.01); *B32B 2255/24* (2013.01); *B32B 2367/00* (2013.01); *B32B 2377/00* (2013.01); *B32B 2439/46* (2013.01)

(58) Field of Classification Search

CPC ......... A01N 25/22; A01P 21/00; A23B 7/152; B31B 70/79; B31B 70/60; B31B 2170/00; B32B 7/12; B32B 27/08; B32B 27/36; B32B 37/24; B32B 2037/243; B32B 2255/10; B32B 2255/24; B32B 2367/00; B32B 2377/00; B32B 2439/46

See application file for complete search history.

(56) References Cited

U.S. PATENT DOCUMENTS

| | | | | |
|---|---|---|---|---|
| 4,181,752 | A | 1/1980 | Martens et al. | |
| 5,619,324 | A | 4/1997 | Harvill et al. | |
| 5,658,968 | A | 8/1997 | Catena et al. | |
| 6,017,849 | A | 1/2000 | Daly et al. | |
| 6,232,365 | B1 | 5/2001 | Weiss et al. | |
| 6,271,127 | B1 | 8/2001 | Liu et al. | |
| 6,313,068 | B1 | 11/2001 | Daly et al. | |
| 6,358,670 | B1 | 3/2002 | Wong et al. | |
| 6,426,319 | B1 | 7/2002 | Kostansek | |
| 6,444,619 | B1 | 9/2002 | Kostansek | |
| 6,548,448 | B2 | 4/2003 | Kostansek | |
| 6,599,673 | B2 | 7/2003 | Kumar et al. | |
| 6,770,600 | B1 | 8/2004 | Lamola et al. | |
| 7,569,160 | B2 | 8/2009 | Oldenzijl et al. | |
| 7,799,885 | B2 | 9/2010 | Shustack et al. | |
| 7,842,746 | B2 | 11/2010 | Bloom et al. | |
| 8,414,989 | B2 | 4/2013 | Wood et al. | |
| 8,580,140 | B2 | 11/2013 | Jacobson et al. | |
| 9,320,288 | B2 | 4/2016 | Wood et al. | |
| 9,381,163 | B2 | 7/2016 | Loo et al. | |
| 9,421,793 | B2 | 8/2016 | Wood et al. | |
| 10,321,679 | B2 | 6/2019 | Chang et al. | |
| 10,542,747 | B2 | 1/2020 | Haas et al. | |
| 12,583,944 | B2 | 3/2026 | Wood et al. | |
| 2002/0054938 | A1* | 5/2002 | Hiyoshi | B65D 77/225 426/112 |
| 2003/0203081 | A1* | 10/2003 | Saari | B65D 81/2076 426/133 |
| 2005/0260309 | A1* | 11/2005 | Hagemeyer | A23L 2/54 426/330 |
| 2010/0144533 | A1 | 6/2010 | Baier et al. | |
| 2011/0143004 | A1 | 6/2011 | Wood et al. | |
| 2011/0253562 | A1 | 10/2011 | Machado | |
| 2012/0107459 | A1 | 5/2012 | Wood et al. | |
| 2014/0080710 | A1 | 3/2014 | Zhang et al. | |
| 2014/0080712 | A1 | 3/2014 | Lao et al. | |
| 2014/0154370 | A1* | 6/2014 | Wood | A01N 3/02 427/256 |
| 2016/0095311 | A1 | 4/2016 | Lu et al. | |
| 2016/0130198 | A1 | 5/2016 | Mir | |
| 2018/0339834 | A1 | 11/2018 | Machado | |

FOREIGN PATENT DOCUMENTS

| | | | |
|---|---|---|---|
| EP | 2508071 | A1 | 10/2012 |
| KR | 20160010460 | | 1/2016 |
| WO | 2004/101668 | A2 | 11/2004 |
| WO | 2008/089140 | A1 | 7/2008 |
| WO | 2011/081877 | A1 | 7/2011 |
| WO | 2012/134539 | A1 | 10/2012 |
| WO | 2014040288 | | 3/2014 |
| WO | 2014/085518 | A1 | 6/2014 |
| WO | 2015/200647 | A1 | 12/2015 |
| WO | 2021/222089 | A1 | 11/2021 |
| WO | 2021/222096 | A1 | 11/2021 |

OTHER PUBLICATIONS

Neoh, T.L. et al., “Dissociation characteristic of the inclusion complex of cyclomaltohexaose (α-cyclodextrin) with 1-methylcyclopropene in response to stepwise rising relative humidity”, Carbohydrate Research, vol. 345, No. 14 (2010) pp. 2085-2089.

Neoh, T.L. et al., “Kinetic Study of Thermally Stimulated Dissociation of Inclusion Complex of 1-Methylcyclopropene with α-Cyclodextrin by Thermal Analysis”, J. Phys. Chem. B2008, vol. 112, No. 49 (2008) pp. 15914-15920.

Neoh, T.L. et al., “Kinetics of Molecular Encapsulation of 1-Methylcyclopropene into α-Cyclodextrin”, J. Agric. Food Chem. vol. 55, No. 26 (2007) pp. 11020-11026.

Weiss et al., “Pulsed Electron Beam Polymerization”, posted Jan. 1, 2006 (http://www.adhesivesmag.com/Articles/Feature_Article/47965fdd41bc8010VgnVCM100000f932a8c0_).

Collaborative International Pesticides Analytical Council (CIPAC) Information Sheet No. 282 (2009).

ASTM D96-88(1998), Standard Test Methods for Water and Sediment in Crude Oil by Centrifuge Method (Field Procedure) (Withdrawn 2000), ASTM International, West Conshohocken, PA, 1998, www.astm.org.

ASTM D7334-08(2013), Standard Practice for Surface Wettability of Coatings, Substrates and Pigments by Advancing Contact Angle Measurement, ASTM International, West Conshohocken, PA, 2013, www.astm.org.

Dodziuk, Helena, “Cyclodextrins and Their Complexes: Chemistry, Analytical Methods, Applications”, pp. 162-170, 2006.

Sjetzli, Jozsef, “Cyclodextrin Technology”, Kluwer Academic Publishers, pp. 6,7,154,155, 1988.

International Search Report issued in connection with international patent application No. PCT/US2021/029133 on Jul. 19, 2021, 7 pages.

Written Opinion issued in connection with international patent application No. PCT/US2021/029133 on Jul. 19, 2021, 13 pages.

International Search Report mailed in International Application No. PCT/US2021/029148, mailed on Oct. 18, 2021, 11 pages.

Written Opinion mailed in International Application No. PCT/US2021/029148, mailed on Oct. 18, 2021, 36 pages.

Choi et al “Facile Fabrication of Core-in-Shell Particles by the Slow Removal of the Core and Its Use in the Encapsulation of Metal Nanoparticles”, Langmuir, 2008, 24(9), pp. 4633-4636.

Chen Xi: “Development of liquid 1-methylcyclopropene delivery formulations for modifying ethylene response of fresh produce”, 2015, pp. 1-4, 23-104.

International Search Report for International Application No. PCT/US2022/051170, mailed Mar. 29, 2023, 5 pages.

Written Opinion for International Application No. PCT/US2022/051170, mailed Mar. 29, 2023, 9 pages.

* cited by examiner

ACTIVE POUCHES AND METHODS OF USE

BACKGROUND

Exposure of living plant tissues to 1-methylcyclopropene (1-MCP) is known to slow or even halt ripening or senescence thereof 1-MCP is an ethylene antagonist and a gas at common ambient temperatures (boiling point reported as 4.7° C.). As a gas, 1-MCP can become affixed within ethylene receptors on the surface of a living plant or a portion thereof (collectively, "living plant materials"), effectively blocking ethylene insertion while failing to trigger the biological response of senescence. For this reason, 1-MCP is useful as an anti-senescence treatment for living plant materials, in particular for the post-harvest preservation of ethylene-responsive living vegetable, flower, or fruit materials, where it is capable of slowing or even halting senescence during storage and/or transportation thereof. Living vegetable, flower, or fruit materials harvested and optionally processed in preparation for human or animal consumption are collectively referred to herein as "fresh produce".

Daly et. al., U.S. Pat. Nos. 6,017,849 and 6,313,068 teach a clathrate of 1-methylcyclopropene with α-cyclodextrin ("1-MCP/CD" or "1-MCP clathrate"). The 1-MCP gas complexes readily with α-cyclodextrin to form a crystalline solid that is easily collected as a powder. When dispersed in liquid water, the powder disgorges 1-MCP gas quickly into the surrounding environment. Since less than 1 ppm of 1-MCP is required to treat most living plant materials to slow or halt senescence, the foregoing method is used in the industry for treatment of large amounts of fresh produce within enclosed facilities, such as silos. Fans are often employed in such methods, to distribute the 1-MCP gas evenly. While useful for preservation of some fresh produce such as apples, the method is limited to the types of produce that may be easily addressed in such bulk volumes.

Wood et al., U.S. Pat. Nos. 8,414,989; 9,320,288; 9,421,793; and related counterparts, incorporated by reference herein for all purposes, teach that that 1-MCP/CD may be blended with a carrier material, e.g. at 1-10 weight percent, and subsequently coated or printed on a substrate. The coated substrate is then positioned proximal to living plant material, where the humidity of biological respiration is sufficient to cause 1-MCP disgorgement. The coated substrates may be configured near, within, or integral to a packaging material or container, such as sheet wrapping, cartons, punnets, and the like where fresh produce is packaged or will be packaged. The water vapor proximal to the coated substrate, provided naturally by respiration of the living plant material, initiates the anti-senescence treatment by causing disgorgement of 1-MCP from the 1-MCP clathrate.

To cover the coated substrates and prevent direct contact thereof with comestibles, Wood et al. further teach laminated constructions wherein the coating containing the 1-MCP clathrate is covered with a second substrate, resulting in a "sandwich" type construction wherein the coating material is disposed between two substrate layers that are the same or different substrate materials. The laminate layer contacts and the coated surface and is affixed to it over the entirety of the coated surface, for example by pressure-sensitive adhesion. The laminate thereby eliminates or substantially eliminates direct contact of the 1-MCP/CD-coated surface with one or more items of fresh produce when both items are configured near, within, or integral to a packaging material or container.

Laminated constructions having 1-MCP/CD particulate, wherein the particulate is not present within a coating, are also mentioned in Kostansek, U.S. Pat. No. 6,548,448. And Baier et al., U.S. Pat. No. 8,603,524 discloses nonwoven pouches formed from spunbond polypropylene and enclosing 1-MCP/CD particulate, wherein the particulate is not present within a coating.

Wood et al., U.S. Pat. No. 8,414,989 and related counterparts, which are incorporated by reference herein for all purposes, teach that liquid α,β-unsaturated monomers and blends of such monomers are suitable carriers for a 1-MCP clathrate, wherein the liquid monomers are mixed with the 1-MCP clathrate, then the mixture is coated or printed followed by irradiating with electromagnetic irradiation. No 1-MCP disgorgement is observed during the mixing, coating, or curing. Wood further discloses laminates of the coated, irradiated mixtures.

Further, Wood et al., U.S. Pat. No. 9,320,288 and related counterparts, which are incorporated by reference herein for all purposes, teach that low-melting waxes such as petrolatum and similar materials are a suitable carriers for the 1-MCP clathrate, obtaining viscosities of e.g. 30 cP or less at 80° C. to meet the requirements for flexographic printing, and can be cooled to "set up" or solidify once printed, without curing. After printing, the printed substrate is covered with a second layer to provide a laminate construction. The second layer may be the same substrate as the first layer, or it may be different; for example, the second layer may be a polymer coated and/or cured on top of the printed surface.

Even further, Wood et al., U.S. Pat. No. 9,421,793 and related counterparts, incorporated by reference herein for all purposes, teach that electrostatically printable particles—that is, toner particles—are suitable carriers for electrostatically printing and affixing an image containing the 1-MCP clathrate on a substrate, wherein the clathrate is mixed with or applied to an electrostatically printable particle which functions as the carrier. Electrostatic printing of individualized 1-MCP clathrate-bearing package inserts or labels, for example based on weight, are enabled by conventional "toner cartridge" delivery. Laminates of the printed substrates are also disclosed.

According to the foregoing teachings, when 1-MCP/CD particulate embedded within a coated or printed carrier is located proximal to living plant materials, diffusion of gaseous water vapor through the coating is sufficient to disrupt the clathrate, disgorging 1-MCP gas which then diffuses into the atmosphere proximal to the living plant material where it can interact with an ethylene receptor. Release of 1-MCP from the coatings depends not only on temperature and humidity, but also on the rate of diffusion of water vapor into the coating and the rate of 1-MCP diffusion therefrom.

In some instances, it is desirable to prevent direct contact of 1-MCP/CD, or a coating including 1-MCP/CD, with the living plant material to be treated. For example, if the living plant material is fresh produce, that is, a living plant product for human or animal consumption, treatment may be carried out without direct contact of 1-MCP/CD, or a coating including 1-MCP/CD, with the living plant material by affixing a laminated layer to the surface of the 1-MCP/CD particulate or the 1-MCP/CD-bearing coating, and providing the laminate within a container or as part of a container for containing the living plant material. Laminated constructions, or laminate assemblies are preferred for methods where 1-MCP/CD particulate or coated substrates containing 1-MCP/CD may otherwise come into direct contact with fresh produce. The sandwich construction of the laminate prevents or substantially prevents direct contact and possible resulting transfer of 1-MCP/CD particulates and/or coated materials to the surface of the fresh produce.

In laminate constructions, factors affecting release of 1-MCP from 1-MCP/CD include permeability of the laminate and substrate layers to water vapor and also to 1-MCP gas. Additionally, if 1-MCP/CD is present in a coating, then the permeability of the coating itself to water vapor and 1-MCP gas also affect 1-MCP release. The substrate and laminate layers, optionally further combined with any coating layer(s) present, collectively constitute a mechanism for controlling permeability of both gases, and selection of variable film or sheet materials as well as thickness of the sheets or films may obtain an observed difference in the rate of release of 1-MCP under otherwise identical humidity-mediated disgorgement conditions.

However, laminated constructions generally are known to provide slower humidity-modified release of 1-MCP from 1-MCP/CD, compared to unlaminated constructions that are otherwise the same. In some cases, the rate of humidity-mediated release of 1-MCP may be unacceptably slow to achieve the effective treatment of an item of fresh produce or other living plant material. Yet the need remains to prevent or substantially prevent direct contact and transfer of 1-MCP/CD particulates and coated materials having 1-MCP/CD in the coating, to the surface of living plant materials.

SUMMARY OF THE INVENTION

Disclosed herein are active pouches having a clathrate (or inclusion complex) of 1-methylcyclopropene with α-cyclodextrin (1-MCP/CD) disposed therein. A pouch is a sealed containment or envelope, and having an exterior surface and an interior surface defining a thickness therebetween, and an interior volume that is excluded from free exchange with the atmosphere; and is capable of maintaining an interior volume at a pressure in excess of atmospheric pressure. An active pouch defines an interior volume of 50 mL to 2000 mL of air or another gas or mixture of gases per milligram of 1-MCP (1-methylcyclopropene gas) present inside the pouch, in the form of 1-MCP/CD. The active pouch includes at least a portion thereof that is permeable to water vapor. The active pouch includes at least a portion thereof that is permeable to 1-methylcyclopropene (1-MCP) gas. In embodiments, the active pouch is formed from one or more thermoplastic sheets or films. In embodiments, the active pouch exterior surface and interior surface define a thickness therebetween of about 10 microns to 1000 microns in at least a portion thereof. In embodiments the active pouch includes an interior volume of a gas that is present at a pressure that is 0.1 kPA to 20 kPa in excess of atmospheric pressure.

We have found that direct contact and transfer of particulates and coated materials containing a 1-methyl cyclopropene clathrate with αcyclodextrin (1-MCP/CD) with the surface of living plant materials can be prevented by providing the 1-MCP/CD within an active pouch. The active pouch further obtains a selected rate of humidity-mediated 1-MCP release when subjected to disgorgement conditions, wherein the amount of air or another gas added to the interior volume of an active pouch is directly related to the rate of 1-MCP release from the active pouch when the active pouch is subjected to the disgorgement conditions. Stated differently, two active pouches that differ only in the interior volume thereof, and are otherwise identical, will release 1-MCP at different rates when the two pouches are subjected to identical disgorgement conditions; and the active pouch having a greater interior volume will release 1-MCP faster than the active pouch having a lesser interior volume. In embodiments, disgorgement conditions are selected to be ambient pressure (typically about 1 atm), a temperature between 0° C. and about 50° C., and a relative humidity between about 80% and 100%. In other embodiments, disgorgement conditions are obtained by situating an active pouch proximal to a living plant material. In embodiments, when a rate of 1-MCP release is compared under identical disgorgement conditions, an active pouch releases 1-MCP faster than a laminate construction that is identical to the active pouch except that the laminate construction includes no interior volume of gas. In embodiments, when a rate of 1-MCP release is compared under identical disgorgement conditions, an active pouch releases 1-MCP slower than a coated substrate that is identical to the active pouch except that the coated substrate is in direct contact with, and obtains free exchange with the atmosphere.

The active pouches include 1-MCP/CD disposed within the interior volume of the pouch. In embodiments, the interior volume of the pouch comprises, consists essentially of, or consists of 1-MCP/CD and one or more gases. In embodiments, the one or more gases comprise, consist essentially of, or consist of air; in embodiments the air includes water vapor. In embodiments, the 1-MCP/CD is a 1-MCP/CD particulate. In embodiments, a pouch defines an interior volume of 50 mL to 2000 mL per milligram of 1-MCP (1-methylcyclopropene gas) present inside the pouch.

In embodiments a portion of the active pouch is permeable to both water vapor and to 1-MCP gas. In embodiments the entirety of the active pouch is permeable to water vapor, or to 1-MCP, or to both water vapor and 1-MCP. In embodiments, the interior volume of the active pouch includes air, $CO_2$, $N_2$, $O_2$, Ar, Ne, He, or a mixture thereof. In embodiments, the interior volume includes a pressure that is atmospheric pressure or is approximately atmospheric pressure. In embodiments, the interior volume includes a pressure in excess of atmospheric pressure. In embodiments, when the active pouch is subjected to conditions of temperature and humidity that are not disgorgement conditions, the interior volume thereof excludes or substantially excludes 1-MCP, which means that there is no measurable 1-MCP in the interior volume as determined by gas chromatography. In embodiments, when the active pouch is subjected to disgorgement conditions, the interior volume includes 1-MCP.

In embodiments, the active pouch is a coated pouch. A coated pouch is an active pouch wherein the 1-MCP/CD present within the interior volume is combined with, included, entrained, or embedded within a coating disposed on the interior surface of the active pouch, or a portion thereof. Thus, a coated pouch is a pouch as defined above, having a coating affixed to at least a portion of an interior surface thereof, wherein the coating includes a carrier and a particulate including a clathrate (or inclusion complex) of 1-methylcyclopropene with α-cyclodextrin (1-MCP/CD).

In embodiments, the active pouch defines an interior volume of 50 mL to 2000 mL per milligram of 1-MCP (1-methylcyclopropene gas) present within the interior coating as 1-MCP/CD. In embodiments, the active pouches are capable of maintaining an interior volume at a pressure in excess of atmospheric pressure; in embodiments, the active pouches include an interior volume at a pressure that is 0.1 kPA to 20 kPa in excess of atmospheric pressure. In embodiments, the surface of the coating affixed to the interior surface of a coated pouch is contacted only by gases present within the interior volume, in the absence of external forces impinging on the coated pouch exterior surface. In embodiments, the active pouches include at least a portion thereof that is permeable to water vapor. In embodiments, the active pouches include at least a portion thereof that is permeable to 1-methylcyclopropene (1-MCP) gas. In embodiments a portion of an active pouch is permeable to both water vapor and to 1-MCP gas. In embodiments the entirety of an active pouch is permeable to water vapor, or to 1-MCP, or to both water vapor and 1-MCP. In embodiments, the interior volume of an active pouch includes air, $CO_2$, $N_2$, $O_2$, Ar, Ne, He, or a mixture thereof. In embodiments, the interior volume of an active pouch includes a pressure that is atmospheric pressure or is approximately atmospheric pressure. In embodiments, the interior volume of an active pouch includes a pressure in excess of atmospheric pressure. In embodiments, when subjected to conditions of temperature and humidity that are not disgorgement conditions, the interior volume of an active pouch excludes 1-MCP. In embodiments, when the active pouch is subjected to conditions of temperature and humidity that are not disgorgement conditions, the interior volume substantially excludes 1-MCP, which means that there is no measurable 1-MCP in the interior volume as determined by gas chromatography. In embodiments, when the active pouch is subjected to disgorgement conditions, the interior volume thereof includes 1-MCP.

Further disclosed herein are methods of making active pouches. The methods include configuring and joining one or more substrates to form a joined construction, contacting a selected amount of 1-MCP/CD with the joined construction, and sealing the joined construction to form a pouch, further enclosing the 1-MCP/CD within the pouch interior volume. At least a portion of the one or more substrates is permeable to water vapor, and at least a portion of the one or more substrates is permeable to 1-MCP. In embodiments, configuring is die cutting, blade cutting, laser cutting, slicing, contacting, folding, crimping, stamping, embossing, or a combination thereof to obtain a desired shape and size. Joining is accomplished by adhesive bonding, heat bonding or heat sealing, stapling, or stitching. Sealing is accomplished using any of the same techniques used for joining, and the sealing functions to define and isolate an interior volume of the active pouch, excluding the selected interior volume from the free exchange with the surrounding atmosphere.

The foregoing methods further include applying a selected interior volume of 50 mL to 2000 mL of air to the active pouch per milligram of 1-MCP (1-methylcyclopropene gas) present within the interior volume of the active pouch as 1-MCP/CD. Applying a selected interior volume is suitably accomplished before, during, or after sealing the active pouch. In embodiments, the applying a selected interior volume includes applying a pressure within the interior volume, for example a pressure of 0.1 kPa to 20 kPa in excess of atmospheric pressure.

Further disclosed herein are methods of making coated pouches. The methods include mixing a carrier with a 1-MCP/CD particulate to form a coating composition; coating the coating composition on a major surface of a substrate; affixing the coated composition to the substrate to provide a coated substrate; and configuring, joining, and sealing the coated substrate to form a coated pouch, further wherein at least a portion of a coated substrate is configured to correspond to a coated interior surface of the coated pouch. The methods include configuring and joining a single coated substrate; configuring and joining two or more coated substrates; and configuring and joining one or more coated substrates and one or more uncoated substrates. In embodiments, configuring is die cutting, blade cutting, laser cutting, slicing, contacting, folding, crimping, stamping, embossing, or a combination thereof to obtain a desired shape and size. Configuring a coated substrate includes orienting the coated substrate surface to obtain an interior coated surface of the coated pouch upon the joining. After the configuring, joining is accomplished by adhesive bonding, heat bonding or heat sealing, stapling, or stitching. Sealing is accomplished using any one or more of the foregoing joining methods to form a pouch, or containment, defining an interior volume that is excluded from the free exchange with the surrounding atmosphere. In some embodiments, sealing is accomplished contemporaneously with joining.

Further disclosed herein are methods of making active pouches that include selecting a rate of 1-MCP release that is between 100 ppb and 25 ppm per hour (OIL); and defining the interior volume of the active pouch to be 50 mL to 2000 mL per milligram of 1-MCP (1-methylcyclopropene gas) disposed within the interior volume of the active pouch as 1-MCP/CD. The methods result in coated pouches that release 1-MCP at a rate of 100 ppb to 25 ppm per hour when subjected to disgorgement conditions. In some such embodiments, the active pouch is a coated pouch and the 1-MCP/CD is present within the interior volume of the coated pouch within the coating that is affixed on at least a portion of the interior surface. In other such embodiments, the active pouch interior volume includes a 1-MCP/CD particulate that is not entrained or incorporated within a coating.

Further disclosed herein are methods of making active pouches that release 1-MCP at different rates when subjected to identical disgorgement conditions, the methods including: forming a first active pouch defining a first interior volume and a second active pouch that is substantially identical to the first active pouch except that the second active pouch defines a second interior volume that is different from the first interior volume; and subjecting the first and second active pouches to a selected set of disgorgement conditions, wherein the second active pouch releases 1-MCP at a different rate than the first active pouch, further wherein the difference in rate is measurable. As used herein, "substantially identical" as applied to pouches, active pouches, coated substrates, laminated constructions, and the like means that the pouches, active pouches, coated substrates, laminated constructions, and the like are as close to identical as are commonly obtained by using standard manufacturing practices to obtain e.g. uniformity of coating compositions, coating thickness, total amount of 1-MCP/CD, and other parameters relevant to the goal of forming identical pouches, active pouches, coated substrates, laminated constructions, and the like, and further with reference to and consistent with paragraphs below disclosing the definition of "substantially". As referred to herein, measurable differences in the rate of 1-MCP release may be determined, for example, by measuring 1-MCP gas using gas chromatographic techniques. Exemplary but non-limiting gas chromatographic techniques are disclosed in the Examples below.

In embodiments of the methods of making active pouches disclosed above, the first active pouch releases 1-MCP faster than the second active pouch, when the first and second active pouches are subjected to identical disgorgement conditions. In other embodiments, the first active pouch releases 1-MCP slower than the second active pouch, when first and second active pouches are subjected to identical disgorgement conditions. In embodiments, the selected release rate of 1-MCP is between 100 ppb and 25 ppm per hour (measured as μL/L) under the selected disgorgement conditions.

Accordingly, the rate of 1-MCP release from an active pouch may be suitably determined, and thus selected and implemented by a user, by comparing the rate of 1-MCP release from the first and second active pouches described above under a selected set of disgorgement conditions. Accordingly, in embodiments, the methods of making active pouches as described above further include selecting a rate of 1-MCP release that is different from the rate of 1-MCP release of the first active pouch and also different from the rate of 1-MCP release of the second active pouch when measured under a selected set of disgorgement conditions; and providing a third active pouch that is substantially identical to the first and second active pouches, but defines an interior volume that is different from the interior volume of the first and second pouches, further wherein the third pouch achieves the selected release rate of 1-MCP when subjected to the selected set of disgorgement conditions. Thus, in embodiments, the foregoing methods further include selecting a rate of 1-MCP release that is different from the 1-MCP release rate of the first active pouch when subjected to the disgorgement conditions and also different from the 1-MCP release rate of the second active pouch when subjected to the disgorgement conditions; and forming a third active pouch that is substantially identical to the first and second active pouches but defines an interior volume that is different from the interior volume of the first pouch and is also different from the interior volume of the second pouch; wherein the third pouch achieves the selected release rate of 1-MCP when subjected to the selected disgorgement conditions.

In some embodiments of the above methods, the selected release rate of 1-MCP—that is, the rate of release of the third active pouch—is faster than the 1-MCP release rate of the first active pouch, the second active pouch, or both the first and second active pouch. In such embodiments, the third active pouch defines an internal volume that is greater than the internal volume of the first active pouch, or greater than the internal volume of the second active pouch, or greater than the internal volume of both the first and second active pouches. In other embodiments the selected release rate of 1-MCP is slower than the 1-MCP release rate of the first active pouch, the second active pouch, or both. In such embodiments, the third active pouch defines an internal volume that is less than the internal volume of the first active pouch, or less than the internal volume of the second active pouch, or less than the internal volume of both the first and second active pouch. In still other embodiments the selected release rate of 1-MCP is intermediate between the 1-MCP release rates of the first and second active pouches. In such embodiments, the third active pouch defines an internal volume that is intermediate between the internal volume of the first active pouch and the internal volume of the second active pouch.

In one or more of the foregoing methods, one or more of first through third active pouches define an interior volume 50 mL to 2000 mL per milligram of 1-MCP, wherein the 1-MCP is disposed within the interior volume of the active pouch as 1-MCP/CD. In some such embodiments, the 1-MCP/CD is present as a solid crystalline particulate. In other embodiments, the 1-MCP/CD is entrained or incorporated within a coating, further wherein the coating is disposed on at least a portion of an interior surface of the active pouch. In embodiments, an active pouch defining an interior volume 50 mL to 2000 mL per milligram of 1-MCP, releases 1-MCP faster than the corresponding laminated structure when the active pouch and the corresponding laminate structure are subjected to identical disgorgement conditions. In embodiments, the selected release rate of 1-MCP is between 100 ppb and 25 ppm per hour under the selected disgorgement conditions.

Thus, disclosed herein are methods of making active pouches that include selecting a rate of 1-MCP release of between 100 ppb and 25 ppm per hour under a selected set of disgorgement conditions; providing an active pouch enclosing an amount of 1-MCP/CD, including introducing a selected volume of air into the pouch interior to form an active pouch having between 50 mL and 2000 mL of air per milligram of 1-MCP present within the active pouch as 1-MCP/CD; and subjecting the active pouch to the selected disgorgement conditions, wherein the active pouch releases 1-MCP at the selected rate. In some such embodiments, the active pouch is a coated pouch that includes 1-MCP/CD entrained or incorporated in a coating, wherein the coating is affixed on at least a portion of the interior surface of the active pouch. In other such embodiments, the active pouch interior volume includes a 1-MCP/CD particulate that is not entrained or incorporated within a coating.

Additionally, disclosed herein are methods of making coated pouches that include affixing a coating to an interior pouch surface, the coating having between 0.0001 wt % and 50 wt % of a 1-MCP/CD particulate based on the weight of the affixed coating that is entrained or incorporated within the coating; selecting a rate of 1-MCP release from the coated pouch that is between 100 ppb and 25 ppm per hour; and defining the interior volume of the coated pouch to be 50 mL to 2000 mL per milligram of 1-MCP (1-methylcyclopropene gas) in the affixed coating. The methods result in coated pouches that release 1-MCP at a rate of 100 ppb to 25 ppm per hour when subjected to disgorgement conditions.

Further disclosed herein are methods for forming a coated pouch having a selected rate of 1-MCP release from the pouch, wherein the method includes mixing a carrier with a 1-MCP/CD particulate to form a coating composition; coating the coating composition on a major surface of a substrate and affixing the coated composition to the substrate major surface to provide a coated substrate; subjecting a first portion of the coated substrate to a selected set of disgorgement conditions and measuring the rate of 1-MCP release from the coated substrate; forming a laminated coated substrate (laminate) by laminating a second portion of the coated substrate; subjecting the laminate to the selected set of disgorgement conditions and measuring the rate of 1-MCP release from the laminated coated substrate; selecting a rate of 1-MCP release that is greater than the measured rate of 1-MCP release from the laminate, but less than the measured rate of 1-MCP disgorgement from the coated substrate; and forming a coated pouch from a third portion of the coated substrate, the coated pouch having an interior volume and subjecting the coated pouch to disgorgement conditions to obtain a rate of 1-MCP release from the coated pouch that is the selected rate of release. In embodiments, the selected rate of 1-MCP release from the coated pouch is between 100 ppb and 25 ppm per hour.

Further disclosed herein is are methods of subjecting an active pouch to disgorgement conditions, wherein the active pouch has a selected ratio of interior pouch volume to mass or weight of 1-MCP present within the active pouch interior volume in the form of 1-MCP/CD. In some embodiments, the methods include subjecting a coated pouch to disgorgement conditions of ambient pressure (about 1 atm), temperature between 0° C. and about 50° C., and relative humidity of about 80% to 100%. In other embodiments, the methods include subjecting a coated pouch to disgorgement conditions created by placing the active pouch proximal to or in contact with a living plant material. In such context, “proximal to” a living plant material means in sufficient proximity to the living plant or portion thereof that water vapor generated by biological respiration of the living plant or portion thereof contacts the active pouch. Such proximity may be provided, for example, by placing an active pouch into a carton or other container together with one or more living plants or portions thereof.

Also disclosed herein are methods of treating living plant material. The methods including disposing, configuring, and/or adapting an active pouch, a plurality of active pouches, or a combination of one or more active pouches and one or more conventional or “empty” pouches that are not active pouches, to form a cushion suitable for protecting a living plant or plant part. In embodiments the methods further include cushioning a living plant or plant part by contacting the living plant or plant part with the cushion. In some embodiments, the method further includes storing the cushioned living plant or plant part, transporting the living plant or plant part, displaying the living plant or plant part, or two or more thereof. In embodiments, contact of the living plant or plant part with an active pouch or a cushion causes disgorgement conditions to arise proximal to the living plant or plant part; disgorgement conditions in turn cause the release of 1-MCP from the active pouches proximal to or in contact with the living plant or plant part.

Also disclosed herein are methods of making coated pouches by configuring and joining a single coated substrate, or by configuring and joining two or more coated substrates, or by configuring and joining one or more coated substrates and one or more uncoated substrates. In embodiments, configuring is die cutting, blade cutting, laser cutting, slicing, contacting, folding, crimping, stamping, or embossing to obtain a desired shape and size. Configuring a coated substrate includes configuring and orienting the coated substrate surface to obtain an interior surface of the coated pouch upon joining. After the configuring, joining is accomplished by adhesive bonding, heat bonding or heat sealing, stapling, or stitching to form a coated pouch, the pouch defining an interior volume that is excluded from the free exchange with the surrounding atmosphere.

Also disclosed herein are assemblies of two or more active pouches, two or more uninflated active pouches, or one or more active pouches with one or more sealed, uninflated active pouches. An assembly is a collection or combination situated proximal to each other, in embodiments further situated proximal to living plant material. In embodiments, an assembly is an array. Thus, also disclosed herein are arrays including one or more active pouches or one or more sealed, uninflated active pouches. An array includes a plurality of pouches defined and joined in a single article, wherein at least one pouch is an active pouch. In some further embodiments at least one pouch is a sealed, uninflated active pouch. In some embodiments, an array is provided in the form of a strip, or a one-dimensional array defining a plurality of pouches along a single axis, wherein the plurality of pouches includes one or more active pouches. In some such embodiments the strip is detachably joined. In still other embodiments, an array is provided in the form of a sheet, or a two-dimensional array defining a plurality of pouches along two axes, the plurality of pouches including one or more active pouches. In embodiments, the sheet is configured as a roll of detachably joined pouches including one or more active pouches.

Also disclosed herein are inflatable active pouches, which are active pouch configurations having 1-MCP/CD disposed within a pouch configuration. A “pouch configuration” is a pouch that is not sufficiently joined or sealed to define an interior volume that excludes the free exchange of air with the surrounding atmosphere; and is further configured and adapted to be sealed to form an active pouch, that is, configured and adapted to be sealed to define an interior volume that excludes the free exchange of air with the surrounding atmosphere. An inflatable active pouch is an active pouch configuration that includes 1-MCP/CD disposed within the pouch configuration, that is, within the nascent interior volume of the pouch configuration. In embodiments, the inflatable active pouches are inflatable coated pouches, which are active pouch configurations in which a portion or all of the interior pouch surface includes a coating affixed thereto, wherein the coating includes between 0.0001 wt % and 50 wt % 1-MCP/CD based on the weight of the affixed coating.

Inflatable active pouches are suitably stored for later use, or provided as part of a kit for making active pouches, wherein the user of the inflatable active pouches carries out a final joining step to define the interior volume and exclude the free exchange of the interior volume with the atmosphere, by adding a selected interior volume of a gas such as air; and sealing the construction, such as by heat sealing, to form an active pouch having the selected interior volume. In embodiments, a plurality of inflatable active pouches is configured as an array thereof. In embodiments, the array is configured to provide a plurality of detachable pouches, one or more of which is an active pouch. In embodiments, an array of inflatable pouches including one or more inflatable active pouches is configured as a roll. In embodiments, an array of inflatable pouches including one or more inflatable active pouches is configured to provide a plurality of detachable pouches, the plurality including one or more detachable active pouches.

Also disclosed herein are kits including a plurality of active pouches or inflatable active pouches. The plurality may be provided in the form of single, discrete active pouches; a one-dimensional array of inflatable pouches including a plurality of inflatable active pouches; or a two-dimensional array of inflatable pouches including a plurality of inflatable active pouches. A user may inflate and join or seal one or more inflatable active pouches to define an interior volume therein and prevent the free exchange thereof with the atmosphere. In embodiments, the kit further includes instructions on how to select an interior volume for the active pouches and/or how to seal the active pouches to exclude free exchange of the interior volume with the atmosphere while providing the selected interior volume. In some embodiments the kit includes an array including one or more inflatable active pouches in roll format. In some embodiments, the kit further includes a rack or dispenser for holding/mounting the roll and allowing for ease of dispensing inflatable pouches, thereby further assisting the user in sealing the coated pouches to define an interior volume therein and, if desired, separate the array into smaller arrays or into single, discrete pouches including one or more active pouches.

Further disclosed herein are active pouches, inflatable active pouches, or an array of active pouches or inflatable active pouches having an exterior coating, which is a coating affixed to an exterior surface of an active pouch or an inflatable active pouch, wherein the coating comprises, consists essentially of, or consists of a carrier and 1-MCP/CD dispersed within the carrier. Also disclosed herein are active pouches, inflatable active pouches, or array of active pouches or inflatable active pouches having a laminated coating affixed thereto. A laminated coating is a coating affixed to a portion of the exterior surface of an active pouch, inflatable active pouch, or array of active pouches or inflatable active pouches, the coating comprising, consisting essentially of, or consisting of a carrier and 1-MCP/CD dispersed within the carrier; and an additional layer contacting and covering the coating, or substantially covering the coating such that the coating is disposed between the additional layer and the exterior surface of the active pouch, inflatable active pouch, or array of active pouches or inflatable active pouches. Also described herein are coated pouches, inflatable coated pouches, and arrays of coated pouches and inflatable coated pouches having both an exterior coating affixed to an exterior surface thereof, and a laminated coating.

Other objects and features will be in part apparent and in part pointed out hereinafter.

DETAILED DESCRIPTION

Figure 1A:
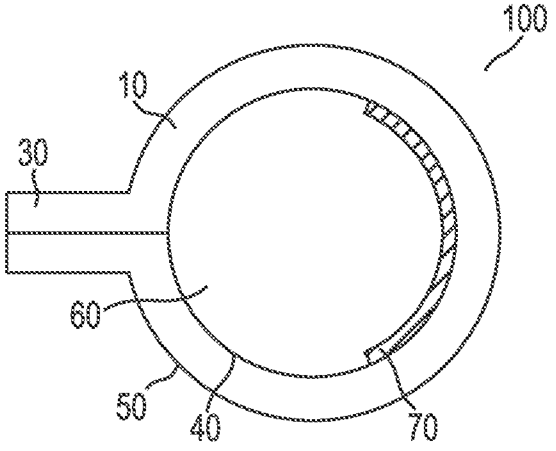
FIG. 1A is a schematic representation of a cross-section of a coated pouch in accordance with the description.
Figure 1B:
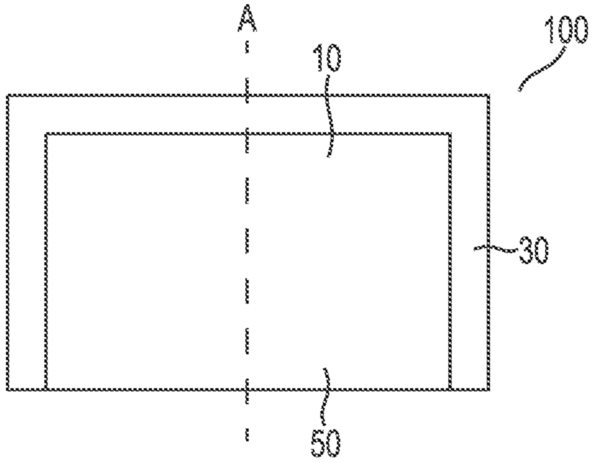
FIG. 1B is a top view of the schematic representation of FIG. 1A.

Although the present disclosure provides references to preferred embodiments, persons skilled in the art will recognize that changes may be made in form and detail without departing from the spirit and scope of the invention. Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Definitions

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing of the present invention. All publications, patent applications, patents and other references mentioned herein are incorporated by reference in their entirety. The materials, methods, and examples disclosed herein are illustrative only and not intended to be limiting.

As used herein, the terms "substrate" or "thermoplastic substrate" generally refers to a thermoplastic sheet or film characterized by substantially planar top and bottom major surfaces defining a thickness therebetween of about 10 microns to 1000 microns. In embodiments, a substrate is configured in a web format, that is, a long strip that may be wound into a roll. In other embodiments a substrate is configured in discrete sheet format, for example in a stacked plurality of sheets. Additionally, the terms "substrate" or "thermoplastic substrate" refer to a single discrete substrate, or a portion thereof; or two portions or areas of the same discrete substrate; or two or more discrete substrate portions of two or more different substrates, as determined by context and with regard to the configurations and adaptations of coated pouch embodiments disclosed herein; further wherein "different substrates" means substrates having different thicknesses, different thermoplastic polymers or different compositions employing a thermoplastic polymer, different morphologies or chemistries present at or on a major surface thereof, different numbers of layers in a multilayer thermoplastic substrate, differences in substrate surface treatments, or two or more such differences as to between discrete substrates or substrate portions.

As used herein, the term "pouch" means a thermoplastic containment having an exterior surface and an interior surface defining an interior volume comprising a gas; wherein the interior volume is measurable by volume displacement and excluded from free exchange with the atmosphere; further wherein the pouch is impervious to liquid water; further wherein at least one portion of the containment is permeable to water vapor, and still further wherein at least one portion of the containment is permeable to 1-methylcyclopropene (1-MCP) gas. "Impervious to liquid water" in the context of a pouch as recited herein means that the containment is not soluble or dispersible in water, and will not allow egress of liquid water into the interior volume, as long as not subjected to e.g. hydrostatic pressure.

As used herein, the term "active pouch" means a pouch that includes, encloses, or contains 1-MCP/CD within the interior volume and 50 mL to 2000 mL of a gas that is not 1-MCP, per milligram of 1-MCP present in the pouch as 1-MCP/CD. The term "interior volume" as applied to the gas present in the interior volume of an active pouch refers to a volume of a gas that is not 1-MCP, unless specified otherwise.

As used herein, the term "coated pouch" means an active pouch having a coating affixed to at least a portion of the interior surface thereof, wherein the coating includes a carrier and 1-MCP/CD dispersed within the carrier. Thus, in a coated pouch, 1-MCP/CD is entrained or incorporated within a coating, wherein the coating is affixed to at least a portion of the interior pouch surface and wherein the coating is in contact with the pouch interior volume.

As used herein, "permeability" or "permeable" may refer to water vapor, 1-MCP, or both, as determined by context. "Permeable" as related to 1-methylcyclopropene gas indicates 1-MCP permeability of equal to or greater than 0.01

($cm^3 \cdot mm/m^2 \cdot 24$ hrs·bar) at standard temperature and pressure (STP) and 0% relative humidity. "Permeable" as related to water vapor indicates permeability of equal to or greater than 0.1 ($g \cdot mm/m^2 \cdot 24$ hr) at 38° C. and 90% relative humidity, when measured according to ASTM D96.

As used herein, the term "disgorgement conditions" refers in some embodiments to selected atmospheric conditions including ambient pressure (typically about 1 atm), temperature between 0° C. and about 50° C., and relative humidity between about 80% and 100%. In embodiments as determined by context, a selected set of disgorgement conditions includes a selected temperature within the stated range, and a selected relative humidity within the stated range. For example, a selected set of disgorgement conditions may be 2° C., relative humidity of 100%; or 23° C., relative humidity of 80%; or 45° C., relative humidity of 90%; or another set of selected conditions intended to achieve disgorgement of 1-MCP from 1-MCP/CD. "Identical disgorgement conditions" means conditions including the same temperature within ±1° C. and the same relative humidity within ±3% RH; or conditions wherein two or more samples, materials, or other items are proximal to each other in an area where the temperature and humidity conditions measured are the same for all of the samples, materials, or other items.

In other embodiments determined by context, the term "disgorgement conditions" or "identical disgorgement conditions" refers to conditions supplied by biological respiration of a living plant material such as a living plant or a portion of a living plant, wherein a particulate, an active pouch, or other source of 1-MCP/CD is placed proximal the living plant or portion thereof. In such contexts, "proximal" means in touching relation to the living plant or portion thereof, or in sufficient proximity to the living plant or portion thereof that water vapor generated by biological respiration of the living plant or portion thereof contacts the particulate, the active pouch, or the other source of 1-MCP/CD. Such proximity may be provided, for example, by placing an active pouch into a carton or other container together with one or more living plants or portions thereof.

As used herein, the term "living plant material" means a living plant, or a portion thereof that is actively respiring and is climacteric or non-climacteric on the basis of the pattern of ethylene production and responsiveness to externally added ethylene, and/or determined to be responsive to treatment with 1-methylcyclopropene gas. Living plant materials include horticultural commodities harvested for human or animal consumption, in embodiments termed "fresh produce" and including vegetables and fruits; horticultural commodities harvested for ornamental purposes, in embodiments including potted or cut plants and ornamental flowers; or any other living plant material categorized as being climacteric or non-climacteric on the basis of the pattern of ethylene production and responsiveness to externally added ethylene, and/or determined to be responsive to treatment with 1-methylcyclopropene gas. Many living plant materials responsive to treatment with 1-methylcyclopropene gas are known in the industry and have been disclosed, for example, in numerous patents assigned to AgroFresh Inc. of Philadelphia, PA, including for example U.S. Pat. Nos. 5,518,988; 6,313,068; 6,548,448; and 8,603,524, disclosures of which are incorporated by reference herein for all purposes.

The terms "comprise(s)," "include(s)," "having," "has," "can," "contain(s)," and variants thereof, as used herein, are intended to be open-ended transitional phrases, terms, or words that do not preclude the possibility of additional acts or structures. The singular forms "a," "and" and "the" include plural references unless the context clearly dictates otherwise. The present disclosure also contemplates other embodiments "comprising," "consisting of" and "consisting essentially of," the embodiments or elements presented herein, whether explicitly set forth or not.

As used herein, the term "optional" or "optionally" means that the subsequently described event or circumstance may but need not occur, and that the description includes instances where the event or circumstance occurs and instances in which it does not.

As used herein, the term "about" modifying, for example, the quantity of an ingredient in a composition, concentration, volume, process temperature, process time, yield, flow rate, pressure, and like values, and ranges thereof, employed in describing the embodiments of the disclosure, refers to variation in the numerical quantity that can occur, for example, through typical measuring and handling procedures used for making compounds, compositions, concentrates or use formulations; through inadvertent error in these procedures; through differences in the manufacture, source, or purity of starting materials or ingredients used to carry out the methods, and like proximate considerations. The term "about" also encompasses amounts that differ due to aging of a formulation with a particular initial concentration or mixture, and amounts that differ due to mixing or processing a formulation with a particular initial concentration or mixture. Where modified by the term "about" the claims appended hereto include equivalents to these quantities. Further, where "about" is employed to describe a range of values, for example "about 1 to 5" the recitation means "1 to 5" and "about 1 to about 5" and "1 to about 5" and "about 1 to 5" unless specifically limited by context.

As used herein, the term "substantially" means "consisting essentially of", as that term is construed in U.S. patent law, and includes "consisting of" as that term is construed in U.S. patent law. For example, a solution that is "substantially free" of a specified compound or material may be free of that compound or material, or may have a minor amount of that compound or material present, such as through unintended contamination, side reactions, or incomplete purification. A "minor amount" may be a trace, an unmeasurable amount, an amount that does not interfere with a value or property, or some other amount as provided in context. A composition that has "substantially only" a provided list of components may consist of only those components, or have a trace amount of some other component present, or have one or more additional components that do not materially affect the properties of the composition. Additionally, "substantially" modifying, for example, the type or quantity of an ingredient in a composition, a property, a measurable quantity, a method, a value, or a range, employed in describing the embodiments of the disclosure, refers to a variation that does not affect the overall recited composition, property, quantity, method, value, or range thereof in a manner that negates an intended composition, property, quantity, method, value, or range. Where modified by the term "substantially" the claims appended hereto include equivalents according to this definition.

As used herein, any recited ranges of values contemplate all values within the range and are to be construed as support for claims reciting any sub-ranges having endpoints which are real number values within the recited range. By way of a hypothetical illustrative example, a disclosure in this specification of a range of from 1 to 5 shall be considered to support claims to any of the following ranges: 1-5; 1-4; 1-3; 1-2; 2-5; 2-4; 2-3; 3-5; 3-4; and 4-5.

As used herein, “a” or “the” with reference to an article, a composition, or a method, or a use, refers to both the singular and plural articles, compositions, methods, and uses, as determined by context. Generally, embodiments below that refer to an article, a composition, a method, or a use also refer to a plurality of articles, compositions, methods, or uses in accordance with the present disclosures.

DISCUSSION

Disclosed herein are active pouches having a clathrate (or inclusion complex) of 1-methylcyclopropene with α-cyclodextrin (1-MCP/CD) disposed therein. A pouch is a sealed containment or envelope, and having an exterior surface and an interior surface defining a thickness therebetween, and an interior volume that is excluded from free exchange with the atmosphere; wherein the pouch is capable of maintaining an interior volume at a pressure in excess of atmospheric pressure, a portion of the pouch is permeable to water vapor, and a portion thereof is permeable to 1-methylcyclopropene (1-MCP) gas. In embodiments, the pouch includes one or more thermoplastic sheets or films. In embodiments, the pouch is formed from a single thermoplastic sheet or film or portion thereof. In other embodiments, the pouch is formed from two or more thermoplastic sheets or films or portions thereof. In embodiments, the pouch exterior surface and interior surface define a thickness therebetween of about 10 microns to 1000 microns in at least a portion thereof. In embodiments the pouch includes an interior volume at a pressure that is 0.1 kPA to 20 kPa in excess of atmospheric pressure.

In embodiments a portion of the active pouch is permeable to both water vapor and to 1-MCP gas. In embodiments the entirety of the active pouch is permeable to water vapor, or to 1-MCP, or to both water vapor and 1-MCP. In embodiments, a first portion of the active thermoplastic pouch is permeable to water vapor, and a second portion of the active thermoplastic pouch is permeable to 1-MCP, where the first and second portions are different portions of the same active pouch. For example, in a representative embodiment, an active pouch is formed by configuring and sealing two different thermoplastic sheets that are first and second thermoplastic sheets, wherein the first thermoplastic sheet is permeable to water vapor and impermeable to 1-MCP; and the second sheet is permeable to 1-MCP and impermeable to water vapor. In another representative embodiment, an active pouch is formed by configuring and sealing two different thermoplastic sheets that are first and second thermoplastic sheets, wherein the first thermoplastic sheet is permeable to both water vapor and also to 1-MCP; and the second sheet is permeable to 1-MCP and impermeable to water vapor. In yet another representative embodiment, an active pouch is formed by configuring and sealing first and second thermoplastic sheets that are the chemically the same and have substantially the same thickness, further wherein the first and second thermoplastic sheets are permeable to both water vapor and also to 1-MCP. Many other variations of permeability of the active pouches to water vapor and 1-MCP will be readily envisioned.

In embodiments, the interior volume of the active pouch includes 50 mL to 2000 mL of air or another gas that is not 1-MCP, per milligram of 1-MCP in the coating and present as 1-MCP/CD. In embodiments, the interior volume of the active pouch includes air, $CO_2$, $N_2$, $O_2$, Ar, Ne, He, or a mixture thereof. In some embodiments, the interior volume of the active pouch further includes water vapor, 1-MCP gas, or both water vapor and 1-MCP gas. In embodiments, the interior volume of the active pouch includes a pressure that is atmospheric pressure, or is approximately atmospheric pressure. In embodiments, the interior volume includes a pressure in excess of atmospheric pressure. In embodiments, when the active pouch is subjected to conditions of temperature and humidity that are not disgorgement conditions, the interior volume thereof excludes or substantially excludes 1-MCP, which means that there is no measurable 1-MCP in the interior volume as determined by gas chromatography. In embodiments, when the active pouch is subjected to disgorgement conditions, the interior volume does include 1-MCP.

The active pouches include 1-MCP/CD disposed within the interior volume of the pouch, and 50 mL to 2000 mL of air or another gas that is not 1-MCP, per milligram of 1-MCP in the coating and present as 1-MCP/CD. In embodiments, the 1-MCP/CD is a particulate, wherein the particulate is a discrete group or mass of particles comprising, consisting essentially of, or consisting of 1-MCP/CD. In embodiments, 1-MCP/CD is a crystalline particulate form of the clathrate of 1-methylcyclopropene with α-cyclodextrin, as received, for example from AgroFresh Inc. of Philadelphia, PA; or as obtained from contacting α-cyclodextrin with 1-methylcyclopropene gas according to a procedure outlined in one or more of the following: U.S. Pat. Nos. 8,580,140; 6,548,448; 6,017,849; and Neoh, T. Z. et al., *J. Agric. Food Chem.* 2007, 55, 11020-11026. In embodiments, a 1-MCP/CD particulate consisting essentially of 1-MCP/CD also includes free α-cyclodextrin in an amount of up to about 15 wt % of the particulate; and less than 1 ppm by weight of the chlorinated impurities 1-chloromethylpropene and 3-chloromethylpropene. The 1-MCP/CD particulates having such properties are crystalline. In embodiments, a 1-MCP/CD particulate is characterized as having a mean particle size of 1000 microns or less as measured by a volume based method such as light scattering. In embodiments, a particulate consisting essentially of 1-MCP/CD has mean particle size between 30 μm and 100 μm, often between 40 μm and 70 μm as determined by a volume-based method, such as laser scattering. The particle size of such a 1-MCP/CD particulate may be reduced by comminuting, such as milling, to obtain a mean particle size between 3 μm and 30 μm; and/or the particulate may be classified to provide a selected mean particle size. Additionally, 1-MCP/CD particulates having different mean particle sizes may be suitably blended, such as by admixing, to form the 1-MCP/CD particulate to be disposed within the interior volume of an active pouch. Such blended 1-MCP/CD particulates have a bimodal distribution of mean particle sizes characteristic of the blend, including the weight ratio of the different mean particle size 1-MCP/CD particulates incorporated or present in the blend.

In embodiments, the interior volume of the active pouch comprises, consists essentially of, or consists of 1-MCP/CD and one or more gases. In embodiments, the one or more gases comprise, consist essentially of, or consist of air; in embodiments the air includes water vapor and/or 1-MCP gas. In embodiments, an active pouch defines an interior volume of 50 mL to 2000 mL of a gas that is not 1-MCP, per milligram of 1-MCP gas present inside the pouch as 1-MCP/CD, that is, in the form of 1-MCP/CD.

In embodiments, the active pouch is a coated pouch. A coated pouch is an active pouch wherein the 1-MCP/CD present within the interior volume is mixed with, combined with, included in, entrained in, incorporated within, or embedded within a coating that is affixed to the interior surface of the active pouch, or a portion thereof. The coating includes a carrier and a particulate including a clathrate (or inclusion complex) of 1-methylcyclopropene with α-cyclodextrin (1-MCP/CD). In embodiments, a coated pouch comprises, consists essentially of, or consists of a thermoplastic substrate adapted and configured to form a pouch, wherein at least a portion of an interior surface of the pouch includes a coating affixed thereon, and the coating comprises, consists essentially of, or consists of a carrier and a 1-MCP/CD particulate dispersed within the carrier. In embodiments the coated pouches are formed from coated substrates, which are thermoplastic substrates having a coating affixed on at least a portion of one major surface thereof, wherein the coating includes at least a carrier and a 1-MCP/CD particulate dispersed within the carrier. In embodiments, the 1-MCP/CD is a 1-MCP/CD particulate. In embodiments, the coating includes between 0.0001 wt % and 50 wt % 1-MCP/CD.

In embodiments, the active pouch is a sealed containment formed from a thermoplastic substrate, further wherein at least a portion of the containment is permeable to water vapor, and at least a portion of the containment is permeable to 1-methylcyclopropene (1-MCP) gas; and the interior volume of the containment comprises, consists essentially of, or consists of 1-MCP/CD and one or more gases. In coated pouch embodiments, the interior volume of the containment comprises, consists essentially of, or consists of a coating comprising 1-MCP/CD and one or more gases. In embodiments, the same portion of the active pouch is permeable to both water vapor and 1-MCP gas. In embodiments, the entirety of the active pouch is permeable to water vapor. In embodiments, the entirety of the active pouch is permeable to 1-MCP gas. In embodiments, all or substantially all of the active pouch is permeable to both water vapor and to 1-MCP gas.

The active pouch comprises an exterior surface and an interior surface defining an enclosed interior volume that excludes the free exchange of the interior volume with the atmosphere, that is, the ambient atmosphere surrounding or proximal to the active pouch. In embodiments, the active pouch has a fixed or substantially fixed interior volume. In embodiments, an interior volume of an active pouch is selected by the operator or manufacturer, and a selected volume of gas is added or inserted prior to, contemporaneously with, or even after sealing or joining the active pouch, where "sealing" or "joining" herein, further in the context of methods of making pouches generally and also methods of making the active pouches herein, means to define the interior volume of a pouch, and further cause the exclusion of free exchange of the atmosphere with the defined interior volume. Adding gas to an active pouch after sealing in some embodiments is accomplished by injecting the selected gas into the active pouch interior volume, such as through a needle injection, or by flowing gas through a valve or injection port affixed to the active pouch to provide fluid connection with a gas source, such as a source of compressed air, nitrogen, carbon dioxide, or another gas to deliver a selected amount of the gas to the interior volume of the active pouch.

In embodiments, a coated pouch interior volume is sufficient to prevent or substantially prevent contact of the portion of the interior surface having the coating affixed thereto, from contacting another portion of the interior surface. In embodiments, the interior volume of an active pouch, such as a coated pouch, is present at atmospheric pressure, in the absence of external forces or pressures in excess of gravity. In other embodiments, the interior volume of an active pouch is present at greater than atmospheric pressure, in the absence of external forces or pressures in excess of gravity. In some such embodiments, the interior volume is present at about 0.1 kPa to 140 kPa in excess of atmospheric pressure, in the absence of external forces or pressures in excess of gravity.

In embodiments, the active pouch is impervious to liquid water at least in the absence of external pressure, such as hydrostatic pressure. In embodiments, "impervious to liquid water" in the context of a containment that is a pouch or an active pouch, such as a coated pouch, means that the containment is not soluble or dispersible in water, and will not allow egress of liquid water into the interior volume in the absence of external pressure or other external forces and in some embodiments even when subjected to some such external pressure or force. In some embodiments the active pouch is impervious to hydrostatic or other externally applied pressure up to 150 kPa, or even greater, wherein such pressures may be applied to a coated pouch without breaching the interior volume thereof, that is, bursting the active pouch. The ability of an active pouch to withstand external pressure is determined using conventional techniques applied by the operator or manufacturer in selecting the substrate and substrate thickness (that is, the thickness to be defined between the exterior surface and interior surface of an active pouch), active pouch configuration and method of configuring, joining, and sealing, and other factors in order to provide an active pouch having the physical characteristics necessary for the intended application. Relevant factors and selections include but are not limited to selection of substrate composition and thickness, method of sealing the active pouch, pressure (if any) in excess of atmospheric within the active pouch interior volume, total interior volume per active pouch, weight and shape of materials expected to be placed on top of an active pouch, if any, and other factors familiar to one of skill in the art of making and using air-filled pouches, such as "air pillows" or "bubble wrap", that are used in the industry for cushioning applications in transporting and storing goods of all known types.

In embodiments, the interior volume enclosed within an active pouch includes a gas. In embodiments, the interior volume includes air, where "air" in this context means ambient air, including in some embodiments an amount of water vapor (humidity). In some embodiments, the interior volume enclosed within the active pouch consists of air. In some embodiments, the interior volume gas is dry, wherein a dry gas includes as much water vapor as air having 50% or less relative humidity at 20° C., such as 50% to 45%, 45% to 40%, 50% to 40%, 40% to 35%, 35% to 30%, 40% to 30%, 30% to 25%, 25% to 20%, 30% to 20%, 20% to 15%, 15% to 10%, or 20% to 10%, 10% to 5%, 5% to 50%, 5% to 20%, 20% to 35%, 35% to 50%, 5% relative humidity to no measurable water vapor, 10% relative humidity to no measurable water vapor, or 25% relative humidity to no measurable water vapor. In other embodiments during or after applying gas to an active pouch interior, the interior volume enclosed within the active pouch includes more than 50% relative humidity at 20° C., such as 50% to 55%, 55% to 60%, 60% to 65%, 65% to 70%, 70% to 75%, 75% to 80%, 80% to 85%, 85% to 90%, 90% to 95%, 95% to 99.9%, 50% to 99.9%, 50% to 75%, or 75% to 99.9% relative humidity at 20° C. Such conditions may be present, for example, when the active pouch is situated proximal to one or more living plants or portions thereof, or placed in liquid water or where water may condense on the surface of the pouch.

In embodiments the interior volume enclosed within an active pouch includes air and a second gas. In still other embodiments the interior volume includes a second gas and excludes air; in some such embodiments the interior volume consists of or consists essentially of the second gas. In embodiments the second gas is nitrogen, argon, helium, carbon dioxide, sulfur dioxide, ethylene, ethylene oxide, chlorine dioxide, or methyl bromide. In embodiments the second gas is a biofumigant, or biological VOC ("bVOC"). In embodiments the bVOC is microbially sourced and include vapor phase compounds and characteristic mixtures of such compounds captured from cultures of microbes such as *Candida intermedia, Gluconobacter cerinus, Hanseniaspora osmophila, Hanseniaspora uvarum, Ceratocystis fimbriata*, one or more fungi of the *Galactomyces* genus, or another such fungal or microbial source. In embodiments the second gas is a bVOC classified as an "essential oil", which is a concentrated plant extract obtained through mechanical pressing and/or distillation of plant material. In embodiments the second gas is a mixture of volatile compounds obtained from an essential oil such as a *eucalyptus* oil, lavender oil, cinnamon oil, tea tree oil, or citrus oil such as lemon, lime, grapefruit, or orange oil. In embodiments the second gas is a combination of two or more of the foregoing second gases.

In embodiments, the interior volume of an active pouch comprising, consisting essentially of, or consisting of air or a second gas is present at atmospheric pressure, in the absence of external forces in excess of gravity. In other embodiments, the interior volume of an active pouch comprising, consisting essentially of, or consisting of air or a second gas is present at greater than atmospheric pressure, in the absence of external forces in excess of gravity. In some such embodiments, an interior volume comprising, consisting essentially of, or consisting of air or a second gas is present at about 0.1 kPa to 140 kPa in excess of atmospheric pressure, in the absence of external forces in excess of gravity.

In embodiments, the interior volume of an active pouch further includes one or more additional humidity-sensitive clathrates. Suitable humidity-sensitive clathrates include clathrates of beneficial compounds with α-cyclodextrin, β-cyclodextrin, or γ-cyclodextrin useful for subsequent release of the beneficial compound under disgorgement conditions such as those listed below herein, and/or due to equilibration loss in an open environment. To be released from an active pouch after disgorgement from a clathrate, the beneficial compound obtains a vapor pressure at 1 atm/20° C.; and a portion of the active pouch is permeable to the beneficial compound vapor. Suitable humidity-sensitive clathrates of α-cyclodextrin or β-cyclodextrin include clathrates with fragrances, antiviral compounds, antifungal compounds, antibacterial compounds, deodorizing compounds, sanitizing compounds, essential oils and bVOCs such as any of those listed above. In embodiments, the active pouch is a coated pouch, and the one or more additional humidity-sensitive clathrates are included in, mixed with, combined with, entrained in, or embedded within a coating affixed to an interior surface of the active pouch. In some such embodiments, a coating affixed to an interior surface of an active pouch includes both 1-MCP/CD and one or more additional humidity-sensitive clathrates. In embodiments, the interior volume of an active pouch comprises, consists essentially of, or consists of one or more additional humidity-sensitive clathrates and a gas. In some such embodiments, the interior volume of an active pouch consists of one or more additional humidity-sensitive clathrates and a gas, and excludes 1-MCP/CD. Such active pouches may be used alone or in combination with one or more active pouches comprising, consisting essentially of, or consisting of 1-MCP/CD and a gas.

In embodiments, a "substrate" or "thermoplastic substrate" suitable for forming the active pouches described herein comprises, consists essentially of, or consists of a thermoplastic sheet or film characterized by substantially planar top and bottom major surfaces defining a thickness therebetween of about 10 microns to 1000 microns. In embodiments, a substrate is configured in a web format, that is, a long strip that is or may be wound into a roll. In other embodiments a substrate is configured in discrete sheet format, for example as a stacked plurality of sheets. In embodiments, a "substrate" or "thermoplastic substrate" comprises a single discrete substrate, or a portion thereof; or two portions or areas of the same discrete substrate; or two or more discrete substrate portions of two or more different substrates, as determined by context and with regard to the configurations and adaptations of coated pouch embodiments disclosed herein. In embodiments, "different substrates" means substrates having different thicknesses or different thermoplastic polymers or different compositions employing a thermoplastic polymer or different morphologies or different chemistries present at or on a major surface thereof or different numbers of layers in a multilayer thermoplastic substrate or different substrate surface treatments; or two or more such differences as to between discrete substrates or substrate portions. Any one or more discrete substrates or substrate portions are useful to form a pouch, further defining the entirety or a portion of the interior surface thereof.

In embodiments, a "pouch" comprises, consists essentially of, or consists of a thermoplastic containment having an exterior surface and an interior surface defining an interior volume comprising a gas; wherein the interior volume is measurable by volume displacement and is excluded from free exchange with the atmosphere; further wherein the pouch is impervious to liquid water; further still wherein at least one portion of the pouch is permeable to water vapor, and further still wherein at least one portion of the pouch is permeable to 1-methylcyclopropene (1-MCP) gas. In embodiments, an "active pouch" is a pouch including 1-MCP/CD disposed within the interior volume. In embodiments, the interior volume of the active pouch comprises, consists essentially of, or consists of 1-MCP/CD and a gas. In embodiments, a "coated pouch" comprises, consists essentially of, or consists of a pouch having a coating disposed on at least a portion of an interior surface thereof, wherein the coating comprises, consists essentially of, or consists of a carrier and a 1-MCP/CD particulate dispersed within the carrier. In embodiments, a "coated pouch" comprises, consists essentially of, or consists of a pouch having a coating affixed to at least a portion of an interior surface thereof, wherein the coating comprises, consists essentially of, or consists of a carrier and 1-MCP/CD dispersed within the carrier.

In embodiments an active pouch interior volume is present at atmospheric pressure; in other embodiments the interior volume is present at a pressure in excess of atmospheric pressure. In some embodiments, the excess of atmospheric pressure is a pressure 0.1 kPa to 140 kPa in excess of atmospheric pressure, for example 0.1 kPa to 130 kPa, or 0.1 kPa to 120 kPa, or 0.1 kPa to 110 kPa, or 0.1 kPa to 90 kPa, or 0.1 kPa to 80 kPa, or 0.1 kPa to 70 kPa, or 0.1 kPa to 60 kPa, or 0.1 kPa to 50 kPa, or 0.1 kPa to 40 kPa, or 0.1 kPa to 30 kPa, or 0.1 kPa to 20 kPa, or 0.1 kPa to 10 kPa, or 1 kPa to 130 kPa, or 1 kPa to 120 kPa, or 1 kPa to 110 kPa, or 1 kPa to 90 kPa, or 1 kPa to 80 kPa, or 1 kPa to 70 kPa, or 1 kPa to 60 kPa, or 1 kPa to 50 kPa, or 1 kPa to 40 kPa, or 1 kPa to 30 kPa, or 1 kPa to 20 kPa, or 1 kPa to 10 kPa, or 5 kPa to 140 kPa, or 10 kPa to 140 kPa, or 15 kPa to 140 kPa, or 20 kPa to 140 kPa, or 25 kPa to 140 kPa, or 30 kPa to 140 kPa, or 40 kPa to 140 kPa, or 50 kPa to 140 kPa, or 60 kPa to 140 kPa, or 70 kPa to 140 kPa, or 80 kPa to 140 kPa, or 90 kPa to 140 kPa, or 100 kPa to 140 kPa, or 5 kPa to 100 kPa, or 10 kPa to 100 kPa, or 5 kPa to 50 kPa, or 10 kPa to 50 kPa, or 0.1 kPa to 1 kPa, or 1 kPa to 2 kPa, or 2 kPa to 3 kPa, or 3 kPa to 4 kPa, or 4 kPa to 5 kPa, or 5 kPa to 6 kPa, or 6 kPa to 7 kPa, or 7 kPa to 10 kPa, or 10 kPa to 20 kPa, or 20 kPa to 30 kPa, or 30 kPa to 40 kPa, or 40 kPa to 50 kPa, or 50 kPa to 60 kPa, or 60 kPa to 80 kPa, or 80 kPa to 100 kPa, or 100 kPa to 120 kPa, or 120 kPa to 140 kPa in excess of atmospheric pressure.

In some embodiments, a coated pouch may become damaged during use thereof, such as by accidental breach of the interior volume of the pouch by perforation or tearing in connection with packaging, transporting, or handling of one or more items of comestible living plants or plant parts ("fresh produce"). An advantage of the coated pouches described herein is that even if damage to a pouch causes loss of the interior volume by breach of a thermoplastic substrate, the coating materials will still exclude direct contact between the coating and any living plant material (produce) situated proximal to one or more coated pouches in similar fashion to a laminate type construction.

In embodiments, substrates useful for forming the active pouches comprise, consist essentially of, or consist of a thermoplastic sheet or film characterized by substantially planar top and bottom major surfaces defining a thickness therebetween of about 10 microns to 1000 microns, for example 25 microns to 500 microns, 50 microns to 500 microns, 25 microns to 300 microns, 50 microns to 300 microns, 100 microns to 1000 microns, 100 microns to 500 microns, or 100 microns to 300 microns. In embodiments, the substrate is two or more different thermoplastic substrates incorporated in a single active pouch. In embodiments, prior to using a substrate to form an active pouch, the substrate is disposed in a "web" format, that is, a long strip that is or may be wound into a roll. In other embodiments, prior to using a substrate to form an active pouch, a substrate is disposed in discrete sheet format. In embodiments, a substrate or a portion thereof has at least one major surface capable of receiving a coating composition.

In embodiments, the substrate is impervious to liquid water, meaning that liquid water does not pass through the substrate without applying hydrostatic pressure. In embodiments, the substrate takes up 0 to 0.1 wt % water when immersed in liquid water, or 0 to 0.01 wt %, or 0 to 0.001 wt %, or 0 to 0.0001 wt % water when immersed in liquid water. In embodiments, the substrate does not dissolve or disperse in water. In embodiments, the substrate does not become plasticized by liquid water. In embodiments, the substrate does not swell when contacted with liquid water. In embodiments, the substrate does not degrade when contacted with liquid water.

In embodiments, the substrate is capable of being configured into a pouch that is impervious to liquid water. In embodiments, the substrate is capable of being configured into a coated pouch that is impervious to liquid water. In embodiments, the substrate is capable of being configured into a pouch having an interior volume that is sealed from free exchange with the surrounding atmosphere. In embodiments, the substrate is capable of being configured into a pouch having an interior volume that is at a pressure 0.1 kPa to 140 kPa in excess of atmospheric pressure.

In embodiments, the substrate is permeable to water vapor. In embodiments, the substrate is permeable to 1-methylcyclopropene (1-MCP) gas. In embodiments, the substrate is permeable to both water vapor and 1-MCP gas. In embodiments, "permeable" as related to water vapor indicates permeability of equal to or greater than 0.1 (g·mm/$m^2$·24 hr) at 38° C. and 90% relative humidity, when measured according to ASTM D96. In embodiments, "permeable" as related to 1-methylcyclopropene gas means 1-MCP permeability of equal to or greater than 0.01 ($cm^3$·mm/$m^2$·24 hrs·bar) at standard temperature and pressure (STP) and 0% relative humidity. "Permeability" or "permeable" may refer to water vapor, 1-MCP, or both as determined by context.

Suitable substrates include thermoplastic films and sheets comprising, consisting essentially of, or consisting of a thermoplastic polymeric compound or resin. Suitable resins include, but are not limited to polyvinyl halides such as poly(vinyl chloride) (plasticized and unplasticized) and copolymers thereof; polyvinylidene halides such as polyvinylidene chloride and copolymers thereof; polyolefins such as polyethylene, polypropylene, copolymers thereof, and morphological variations thereof including LLDPE, LDPE, HDPE, UHMWPE, metallocene polymerized polypropylene, and the like; polyesters such as polyethylene terephthalate (PET) or polylactic acid (PLA) and plasticized variations thereof; polystyrene and copolymers thereof including HIPS; polyvinyl alcohol and copolymers thereof; copolymers of ethylene and vinyl acetate; and the like. Blends, alloys, composites, crosslinked versions of the foregoing, and recycled versions thereof are also useful in various embodiments. In embodiments, the thermoplastic substrate is a polypropylene film, a polyethylene film, or a polyethylene terephthalate film. A thermoplastic film or sheet may be processed by orienting the film or sheet, such as by biaxially orienting the film or sheet. Two or more layers of thermoplastics are present in some embodiments as multilayer films or sheets.

In some embodiments the substrate contains one or more fillers, stabilizers, colorants, bleaches, and the like. In some embodiments the substrate is pretreated on one or both major surfaces thereof with a surface treatment such as plasma or corona treatment, primer layer coating, prior to disposing the coating composition thereon. Such surface treatments are well known in the industry and are employed to modify the surface energy of substrates, for example to improve wetting or adhesion of coatings or printed materials to the surface of a substrate.

The dimensions of the major surfaces of the thermoplastic substrate are not particularly limited and may be selected from "sheets" which generally refer to major surface dimensions of 1 meter or less in any direction; and "films" which generally refer to roll or strip type formats wherein the major surfaces are characterized by a width of about 2 cm to 2 m and a length of 10 m to 1 km or even more. Films and sheets are suitably subjected to one or more of die cutting, blade cutting, laser cutting, slicing, splicing, stamping, embossing, and the like as necessary to provide a suitable shape and configuration for coating and/or adapting and configuring to form a pouch.

In embodiments, a thermoplastic substrate or a portion thereof has at least one major surface capable of receiving a coating composition. In embodiments, to form a coated pouch, first and second major surfaces of a thermoplastic substrate are configured and adapted to form and define the interior and exterior surfaces of the pouch, further wherein at least a portion of the surface of the substrate having a coating disposed thereon or affixed thereon is configured to obtain an interior surface portion of the coated pouch. Thus, a method of forming a coated pouch includes affixing a coating to a portion of one major surface of a substrate to form a coated substrate, followed by configuring and adapting the coated substrate to form a coated pouch. An interior surface of the coated pouch includes the coating affixed thereto. The coating comprises, consists essentially of, or consists of a carrier and a 1-MCP/CD particulate.

In embodiments, a method of forming an active pouch comprises, consists essentially of, or consists of configuring and joining one or more substrates to form a joined construction, contacting a selected amount of 1-MCP/CD with the joined construction, and sealing the joined construction to form a pouch, wherein the sealing encloses the 1-MCP/CD within the pouch interior volume. In embodiments, the 1-MCP/CD is a 1-MCP/CD particulate. In embodiments, configuring is accomplished by die cutting, blade cutting, laser cutting, slicing, splicing, contacting, folding, crimping, stamping, embossing, or a combination thereof to obtain a desired shape and size. In embodiments, joining is accomplished by adhesive bonding, heat bonding or heat sealing, stapling, or stitching. Sealing is accomplished using any of the same techniques used for joining, and the sealing functions to define and isolate the interior volume of the active pouch, excluding the selected interior volume from the free exchange with the surrounding atmosphere.

In embodiments, the method of forming an active pouch includes applying a selected interior volume of 50 mL to 2000 mL of air to the active pouch per milligram of 1-MCP (1-methylcyclopropene gas) present within the interior volume of the active pouch as 1-MCP/CD. Applying the selected interior volume is suitably accomplished before, during, or after sealing the active pouch. In embodiments, the applying a selected interior volume includes applying a pressure to the interior volume, for example a pressure of 0.1 kPa to 20 kPa in excess of atmospheric pressure.

In embodiments, a method of forming a coated pouch comprises, consists essentially of, or consists of mixing a carrier with a 1-MCP/CD particulate to form a coating composition; coating the coating composition on a major surface of a substrate; affixing the coated composition to the substrate to provide a coated substrate; and configuring the coated substrate to form a coated pouch, wherein the coated substrate surface is adapted to obtain an interior coated surface or surface portion of the coated pouch. In embodiments, a coated substrate comprises, consists essentially of, or consists of a substrate having a coating affixed to a portion, or all of one major surface thereof. In some embodiments, the portion of the major surface is the entirety of the major surface, or substantially the entirety of the major surface of the substrate.

Thus, further disclosed herein are methods of making coated pouches from thermoplastic substrates and a coating composition. The methods comprise, consist essentially of, or consist of mixing a carrier with a 1-MCP/CD particulate to form a coating composition; coating the coating composition on a major surface of a substrate and affixing the coated composition to the substrate major surface to provide a coated substrate; and adapting and configuring the coated substrate to form a pouch, further wherein the surface of the affixed coating is configured to correspond to an interior surface of the coated pouch.

In some embodiments, the coating composition further includes one or more non-aqueous solvents. In embodiments, a coating composition includes 5 wt % of water or less based on the weight of the coating composition, and in some such embodiments 2 wt % of water or less based on the weight of the coating composition.

In some embodiments one or more of the mixing, coating, or affixing is accomplished in a continuous process; in some such embodiments, the coating and affixing are accomplished serially in a continuous process; in still other such embodiments mixing, coating, and affixing are accomplished serially in a continuous process.

In embodiments, the mixing, coating, and affixing are limited by the need to avoid disgorgement of 1-MCP. Accordingly, in embodiments, liquid water is excluded or substantially excluded from the 1-MCP/CD particulates and from the coating compositions. “Substantially excluded” herein recognizes that a coating composition may include up to 5 wt % water, particularly since cyclodextrin itself, present as part of the clathrate in the 1-MCP/CD particulate, naturally associates with water in its crystalline form and this water will be included within any of the coating compositions employed herein. In the event that a coating composition is found to include more than 5 wt % water, the coating composition, individual components thereof, or any mixture of the components may be dried to remove water using conventional methods such as zeolite adsorption, oven drying, and the like as determined by the specific material to be dried. Further in embodiments herein, temperature proximal to 1-MCP/CD should not exceed 90° C. and preferably should be about 80° C. or less, including during drying, storing, mixing, coating, and affixing.

The coating of the coating composition onto a thermoplastic substrate is preferably carried out in the absence of liquid water and under conditions of temperature and humidity that avoid disgorgement of 1-MCP. Such conditions include but are not limited to temperatures of less than 90° C., preferably less than 80° C.; and relative humidity of 50% or less. We have found that coating in accordance with the methods disclosed herein may be used to avoid measurable loss of 1-MCP therefrom. In embodiments, the methods disclosed herein do not lead to loss of 1-MCP gas from 1-MCP/CD.

In embodiments, the carrier comprises, consists essentially of, or consists of: a polymer carrier, a polymerizable carrier, a wax carrier, or an electrostatically printable particulate carrier. In embodiments, components further included in the carrier are nucleating agents, oils, water scavengers, desiccants, adhesion promoters, antifouling agents, thermal or oxidative stabilizers, colorants, adjuvants, plasticizers, or two more thereof. Components are not generally limited in nature and are dictated by the particular end use of the cyclodextrin compositions and treated substrates, further within the boundaries for the carrier properties set forth above.

In embodiments, the polymer carrier comprises, consists essentially of, or consists of one or more polymers, that is, one or more compounds having two or more repeating units; and one or more non-aqueous solvents. The amounts of polymer and solvent are selected by the user to provide a targeted viscosity or other physical property suitable for coating the coating composition on a thermoplastic substrate.

In embodiments, the one or more polymers comprise, consist of, or consist essentially of homopolymers, copolymers (herein construed to include any polymers comprising more than one type of monomer residue such as terpolymers, tetrapolymers and the like), or a combination thereof. The copolymers may be block copolymers, random copolymers, and/or alternating copolymers. The polymers are linear polymers, branched polymers, radial polymers, dendritic polymers, or any combination thereof. In embodiments, the one or more polymers comprises one or more addition polymers, one or more condensation polymers, or any combination thereof.

In embodiments, a polymer is selected from poly(alpha hydroxy acids) (i.e. poly(alpha hydroxy carboxylic acids), polysaccharides, chemically modified polysaccharides, polyamides, polyolefins, thermoplastic polyurethanes, polyureas, polyacrylates, polystyrenes, polyesters, polybutadienes, polysiloxanes, polyalkylsilanes, polyvinyl halides, polyvinylidene halides, polyacrylonitriles, polycarbonates, polyethers, polyglycerols, polyethylene imines, nucleic acids, poly(phenylene oxide)s, polymethacrylamides, poly (N-alkylacrylamides), poly(divinyl ether), polyvinyl acetate, polyvinyl alcohol and copolymers thereof, furan resin (poly (2-furanmethanol)), polyhydroxyalkanoates, polyindole, polymethacrylonitrile, and any combination thereof.

In embodiments, a polymer is selected from poly(lactic acid), polyamide, nitrocellulose, polyvinyl butyral, vinyl formal vinyl acetate copolymer, styrene acrylate copolymer, styrene divinyl benzene copolymer, polyester resin, styrene butadiene copolymer, and any combination thereof. In some such embodiments, the polymer is selected from the group consisting of polyamide, nitrocellulose, and a combination thereof. In some such embodiments, the polymer comprises, consists of, or consists essentially of a polyamide that is a condensation product of a diamine and a dibasic acid mixture comprising dibasic acid dimers. In some such embodiments, the dibasic acid mixture comprises, consists of, or consists essentially of C20-C44 dibasic acid dimers, a C6-C12 dibasic acid, or a combination thereof. In some such embodiments, the C20-C44 dibasic acid dimers comprise, consist of, or consist essentially of a C36 dibasic acid dimer. In embodiments, the C6-C12 dibasic acid comprises, consists of, or consists essentially of azelaic acid.

In embodiments, the polymer comprises, consists of, or consists essentially of nitrocellulose, a polyamide, or a combination thereof. In some such embodiments, the polymer is a polyamide disclosed in U.S. Pat. No. 5,658,968. In embodiments, the polyamide is a product of a diamine composition and a dibasic acid composition. In embodiments, the diamine composition comprises, consists of, or consists essentially of a C2-05 diamine, a C6-C12 alkyl diamine, or a combination thereof. In embodiments, the C2-05 diamine comprises, consists of, or consists essentially of ethylene diamine and hexamethylene diamine. In embodiments, the dibasic acid composition comprises, consists of, or consists essentially of a C20-C44 dibasic acid dimers, a C6-C12 dibasic acid, or a combination thereof. In embodiments, the dibasic acid composition comprises, consists of, or consists essentially of a C36 dibasic acid dimer, azelaic acid, and n-propanoic acid. In embodiments, the organic solvent comprises, consists of, or consists essentially of ethyl acetate, ethanol, isopropyl acetate, 1-propoxy-2-propanol, heptane, naphtha, propan-1-ol, toluene, or any combination thereof. In embodiments, the polyamide has a weight average molecular weight of about 8,000 g/mol to about 12,000 g/mol.

Non-aqueous solvents useful in the polymer carriers of sixth embodiments include ketones, esters, aldehydes, ketals, acetals, hydrocarbon solvents, amides, ethers, polyols, alcohols, and any combination thereof.

Ketones include but are not limited to aromatic, linear, branched, cyclic or alicyclic saturated or unsaturated ketones having 3 to 10 carbons. Exemplary ketones include but are not limited to acetone, methyl ethyl ketone (butanone), 2-pentanone, 3-pentanone, methyl isopropyl ketone, ethyl isopropyl ketone, methyl isobutyl ketone, 2-hexanone, acetophenone, cyclopentanone, isophorone, and any combination thereof.

Ketals include but are not limited to 2-methyl-2-ethyl-1,3-dioxolane; and any one or more ketal reaction products of ethylene glycol, propylene glycol, a sugar alcohol (including glycerol and erythritol) or a sugar with any one or more ketones, ketoesters, and any combination thereof. Acetals include dimethoxymethane, dioxolane, paraldehyde, and any one or more ketal reaction products of ethylene glycol, propylene glycol, a sugar alcohol (including glycerol and erythritol) or a sugar with any one or more of a ketone, ketoester, and any combination thereof.

Amides include but are not limited to formamide, N-methyl formamide, dimethyl formamide, dimethylacetamide, 2-pyrrolidone, N-methyl-2-pyrrolidone, N-vinylacetamide, N-vinylpyrrolidone, and any combination thereof. Aldehydes include but are not limited to formaldehyde, acetaldehyde, propionaldehyde, dimethyl formamide, dimethyl carbonate, N-methylmorpholine N-oxide, and any combination thereof. Ethers include but are not limited to dimethyl ether, tetrahydrofuran, glycol ethers, diethyl ether, and any combination thereof. Polyols include but are not limited to glycols and sugar alcohols such as glycerol and erythritol. Esters include but are not limited to aromatic, linear, branched, cyclic or alicyclic saturated or unsaturated alkyl esters having 4 to 20 carbons. Esters include but are not limited to ethyl acetate, ethyl propionate, animal or plant triglycerides, biodiesel, glycol esters, and any combination thereof. Alcohols include but are not limited to ethanol, n-propanol, isopropanol, n-butanol, isobutanol, t-butyl alcohol, and any combination thereof.

Hydrocarbon solvents include but are not limited to aromatic, linear, branched, cyclic or alicyclic saturated or unsaturated compounds having 6 to 20 carbons or mixtures thereof, or halogenated versions thereof such as chlorinated, fluorinated, or brominated versions thereof; halogenated hydrocarbons having 1 to 5 carbons; and cyclic aliphatic or aromatic compounds having one or more N, S, or O atoms incorporated within the ring, such as furans, pyrroles, thiophenes, pyridines, morpholines, dioxanes, thiazoles, oxazoles, oxazolines, imidazoles, thiazoles, oxazoles, and pyrans, alkylated or hydrogenated versions thereof, and mixtures thereof; petroleum distillates of crude oil such as mineral spirits, kerosene, white spirits, naphtha, and Stoddard solvent (CAS ID #: 8052-41-3); paraffinic distillates, and isoparaffinic fluids such as ISOPAR® fluids manufactured by ExxonMobil Chemical Co. of Houston, TX.

In some embodiments, a solvent compound includes two more functional groups such as two or more ester, amide, keto, aldehyde, hydroxyl, ketal, acetal, or other such functional group. Examples of such compounds include β-hydroxy aldehydes, β-hydroxy ketones, β-hydroxy esters, β-keto esters, semialdehydes, ketal esters, and the like. Generally, such compounds have between 3 and 12 carbons.

In embodiments, the organic solvent comprises, consists of, or consists essentially of ethyl acetate, heptane, methanol, ethanol, propan-1-ol, isopropanol, n-propyl acetate, isopropyl acetate, 1-propoxy-2-propanol, 1-pentene, n-pentane, 1-hexene, n-hexane, benzene, cyclohexane, 3-methylhexane, 1-heptene, n-heptane, 2,5-dimethylcyclohexane, toluene, 1-octene, n-octane, ethylbenzene, m-xylene, p-xylene, 1-decene, n-decane, or any combination thereof. In embodiments, the organic solvent comprises, consists of, or consists essentially of one or more solvents selected from the group consisting of ethyl acetate, heptane, ethanol, methanol, naphtha, propan-1-ol, isopropanol, isopropyl acetate, or any combination thereof.

Naphtha is a mixture of liquid hydrocarbons. As used herein, it may include light naphtha (a fraction boiling between 30° C. and 90° C. at 1 atmosphere of pressure), heavy naphtha (a fraction boiling between 90° C. and 200° C.), or a combination thereof. In embodiments, the naphtha comprises, consists of, or consists essentially of light naphtha. In embodiments, the naphtha comprises or consists essentially of n-pentane, 1-hexene, n-hexane, cyclohexane, 3-methyl heptane, 1-heptene, n-heptane, toluene, 1-octene, n-octane, ethylcyclohexane, ethylbenzene, m-xylene, p-xylene, 1-decene, n-decane, or any combination thereof.

In some embodiments, a polymer carrier is formed by admixing one or more polymers with one or more non-aqueous solvents, employing conventional mixing methodology for obtaining polymer solutions or dispersions. In embodiments, the polymer carrier includes about 1 wt % to about 80 wt % total of the one or more polymers in the polymer carrier, for example 1 wt % to 75 wt %, or 1 wt % to 70 wt %, or 1 wt % to 65 wt %, or 1 wt % to 60 wt %, or 1 wt % to 55 wt %, or 1 wt % to 50 wt %, or 1 wt % to 45 wt %, or 1 wt % to 40 wt %, or 1 wt % to 35 wt %, or 1 wt % to 30 wt %, or 1 wt % to 25 wt %, or 1 wt % to 20 wt %, or 1 wt % to 15 wt %, or 1 wt % to 10 wt %, or 1 wt % to 9 wt %, or 1 wt % to 8 wt %, or 1 wt % to 7 wt %, or 1 wt % to 6 wt %, or 1 wt % to 5 wt %, or 5 wt % to 75 wt %, or 10 wt % to 75 wt %, or 15 wt % to 75 wt %, or 20 wt % to 75 wt %, or 25 wt % to 75 wt %, or 30 wt % to 75 wt %, or 35 wt % to 75 wt %, or 40 wt % to 75 wt %, or 45 wt % to 75 wt %, or 50 wt % to 75 wt % total of the one or more polymers in the polymer carrier.

In some embodiments, the polymerizable carrier comprises, consists essentially of, or consists of one or more α,β-unsaturated monomers that are liquids within a temperature range of 0° C. to 50° C. at atmospheric pressure and are capable of polymerization when irradiated with electromagnetic radiation. The α,β-unsaturated monomers useful in the polymerizable carriers are selected from acrylates, methacrylates, acrylamides, methacrylamides, allylic monomers, α-olefins, butadiene, styrene and styrene derivatives, acrylonitrile, and the like. Some examples of useful monomers include acrylic acid, methacrylic acid, and alkyl esters of acrylic or methacrylic acid wherein the ester groups have between 1 and 18 carbons, in some embodiments between 1 and 8 carbons, and are linear, branched, or cyclic. In embodiments, the polymerizable carrier includes blends of two or more monomers. In some such embodiments, one or more monomers are selected to target specific polymer properties of permeability to water vapor, 1-MCP gas, or both.

In embodiments, the polymerizable carrier comprises one or more monomers having two or more unsaturated and polymerizable bonds. Such polyfunctional monomers, which function as crosslinkers, include diacrylates such as ethylene glycol diacrylate, hexanediol diacrylate, and tripropyleneglycol diacrylate; triacrylates such as glycerol triacrylate and trimethylolpropane triacrylate; and tetraacrylates such as erythritol tetraacrylate and pentaerythritol tetraacrylate; divinyl benzene and derivatives thereof, and the like. Such monomers provide crosslinking to the cured cyclodextrin composition.

In some such embodiments, a crosslinker or mixture thereof, is present at less than about 10% by weight of the polymerizable carrier, for example at about 0.1% to 5% by weight of the polymerizable carrier or even 0.01% to 1% by weight of the polymerizable carrier.

In some embodiments the polymerizable carrier further includes a photoinitiator. In some embodiments where affixing (discussed below) is carried out by UV irradiation, the photoinitiator absorbs the UV radiation and becomes activated, thereby initiating the polymerization or of the monomers. In such embodiments, the photoinitiator is selected based on the wavelength of UV radiation to be employed. Where a photoinitiator is present in the polymerizable carrier, it is included in the cyclodextrin compositions at about 0.01% by weight to 5% by weight based on the weight of the coating composition, for example 0.5% by weight to 2% by weight based on the weight of the coating composition. Examples of suitable photoinitiators include those sold under the trade name IRGACURE® by Ciba Specialty Chemicals Corp. of Tarrytown, NY; those sold under the trade name CHEMCURE® by Sun Chemical Company of Tokyo, Japan; and LUCIRIN® TPO sold by BASF Corporation of Charlotte, NC.

In embodiments, a wax carrier comprises, consists essentially of, or consists of one or more waxes. A wax comprises, consists essentially of, or consists of a mixture of compounds characterized by melting transition onsets, of 23° C. to about 60° C., such as 23° C. to 50° C. or 23° C. to 40° C.; and water contact angle of 90° or greater when measured according to ASTM D7334-08 or alternatively solubility in water of less than 1 wt % at 25° C. In some embodiments, the wax comprises, consists essentially of, or consists of a petrolatum or a petrolatum-like material. Petrolatum (Merkur; mineral jelly; petroleum jelly; CAS No. [8009-03-8]; EINECS No. 232-373-2) is a purified mixture of semi-solid saturated hydrocarbons having the general formula $C_nH_{2n+2}$, and is obtained from petroleum sources. The hydrocarbons consist mainly of branched and unbranched chains although some cyclic alkanes and aromatic molecules with alkyl side chains may also be present.

In some embodiments, the wax comprises, consists essentially of, or consists of petrolatum-like material that is sourced from vegetable matter. Such materials are described, for example, in U.S. Pat. No. 7,842,746. The vegetable-based petrolatum-like materials are made from hydrogenated polymerized vegetable oils, such as hydrogenated blown oils or hydrogenated copolymerized oils. The petrolatum-like materials are formulated to have a targeted range of properties and thus are suitably formulated to have melting transition onset of between about 23° C. and 40° C., as well as water contact angle to the surface of 90° or greater, measured according to ASTM D7334-08, and/or solubility in water of less than 1 wt % at 25° C.

In some embodiments, oils are included in the wax carrier. Oils are hydrophobic compounds that are liquids at 25° C., wherein hydrophobic means solubility in water of less than 1 wt % at 25° C. In some embodiments, the oil is a hydrocarbon or silicone oil; in other embodiments the oil is a plant oil such as peanut oil, walnut oil, canola oil, linseed oil, and the like. In some embodiments, the oil is a "drying oil", that is, the oil reacts with oxygen in the atmosphere to form crosslinks. In embodiments, one or more oils are added to the wax carrier at about 0.1 wt % to 10 wt % of the weight of the carrier, or about 0.5 wt % to 5 wt % of the weight of the carrier, or about 0.1 wt % to 5 wt % of the weight of the carrier.

In embodiments, an electrostatically printable carrier comprises, consists essentially of, or consists of an electrostatically printable particulate. The electrostatically printable particulate is a mixture of one or more polymers (selected in embodiments from the polymers listed above regarding the polymer carrier) in a particulate form, that is, a polymer particulate; the polymer particulate optionally includes one or more additional components associated with electrophotographic toner compositions, such as charge control agents and colorants. Useful polymer particles suitably employed in electrostatically printable carriers include styrene acrylate copolymers, styrene divinyl benzene copolymers, polyester resins, styrene butadiene copolymers, and polyolefins, wherein the polymer particles have particle sizes in the range of about 5 μm to 50 μm in the largest direction. In some embodiments the electrostatically printable carrier is a previously manufactured toner composition employed for electrostatic printing.

In one or more additional embodiments, combinations of the foregoing carriers or individual components thereof are suitably mixed to form a carrier blend. Non-limiting examples of such carrier blends include a polymerizable carrier mixed with a wax or a polymer or both; a wax carrier mixed with a non-aqueous solvent, and the like without limitation. Coating compositions as defined herein include any carrier or blend thereof as described herein, without limit. In some embodiments the carrier further includes one or more fillers, which include but not limited to polymer beads and bubbles; glass or ceramic beads or bubbles; mineral particulates such as silicas, calcium carbonate; and similar inert materials.

In embodiments, a carrier as described above is mixed with a 1-MCP/CD particulate to form a coating composition. The mixing is accomplished by one or more methods known to those of skill in mixing powders with liquids or in mixing two particulate solids. Nonlimiting examples of useful mixing methods include static mixing, injection mixing, stirring, blade mixing, sonicating, or a combination thereof. Where a coating composition includes more than two components, order of mixing the components is not limited except as required by the specific coating composition targeted, that is, the components thereof and their interactions. For example, it may be advantageous to mix a polymer with a non-aqueous solvent prior to mixing the 1-MCP/CD particulate with the polymer/solvent combination, in order to fully disperse or dissolve the polymer in the solvent prior to mixing the 1-MCP/CD particulate with the polymer/solvent combination. Further, it may be useful to heat one or more carrier components to facilitate mixing; heating without limitation is useful except, however, that when the 1-MCP/CD particulate is mixed with the carrier or component thereof, the carrier or component thereof should have a temperature of 90° C. or less, preferably 80° C. or less. Further, it may be advantageous to dry a carrier or carrier component in order to obtain a coating composition having less than 5 wt % water after the mixing is completed.

In some embodiments, the 1-MCP/CD particulate present within an active pouch is a high purity 1-MCP/CD. Accordingly, in some embodiments, the mixing further includes mixing a high purity 1-MCP/CD particulate with the carrier to form the coating composition. “High purity” as used herein, specifically with reference to 1-MCP/CD particulate means that the particulate includes at least 85 wt % 1-MCP/CD and 0-15 wt % α-CD, and excludes other components present at more than 1 ppm (e.g., impurities). In some embodiments, the method further includes mixing a low particle size 1-MCP/CD particulate with the carrier to form the coating composition. “Low particle size” in reference to a 1-MCP/CD particulate means that the particulate has a mean particle size of 3 μm to 15 μm. In some embodiments, the method further includes mixing a high purity, low particle size 1-MCP/CD particulate with the carrier to form the coating composition. High purity, low particle size 1-MCP/CD particulates are described in pending U.S. patent application Ser. No. 16/859,399 and may be formed herein substantially as described in the pending application, and added to an active pouch as a particulate, or added to a carrier composition for coating and affixing to one or more substrates as described in any of the foregoing embodiments.

In embodiments, the method of mixing further includes selecting components and amounts thereof that is targeted to produce a coated substrate or coated pouch interior coating having between 0.0001 wt % and 80 wt % of a 1-MCP/CD particulate based on the weight of the affixed coating, wherein the particulate is dispersed, entrained, or incorporated within the affixed coating. In some embodiments, the method further includes mixing a high purity, low particle size 1-MCP/CD particulate with the carrier to form the coating composition. High purity, low particle size 1-MCP/CD particulates are suitably obtained by comminution and/or classification of high purity 1-MCP/CD particulates, which obtain crystals having mean particle sizes of 30 μm-100 μm or even greater, as determined by volume-based measurement methods such as light scattering. Further, mixtures of high purity 1-MCP/CD particulates having bimodal, trimodal, or higher order particle size distributions may be mixed with a carrier to form a coating composition. Such polymodal distributions are formed by mixing 1-MCP/CD particulates having different mean particle sizes.

In embodiments, the coating is affixed to a substrate in the absence of disgorgement conditions, that is, in the absence of liquid water; at temperatures of less than 90° C., preferably less than 80° C.; and at relative humidity of 50% or less. Such conditions are generally known by those of skill to avoid loss of 1-MCP gas from 1-MCP/CD particulates. In embodiments, the coating is affixed by disposing a coating composition on a substrate major surface or portion thereof, and affixing the coating composition thereon to form a coated substrate.

In embodiments, a coating composition comprises, consists essentially of, or consists of a carrier and a 1-MCP/CD particulate. The amount of the 1-MCP/CD particulate in the coating composition is not particularly limited; however, in some industrially useful embodiments the coating composition includes between about 0.0001 g/L and 500 g/L of the 1-MCP/CD particulate based on the volume of the coating composition, or similarly 0.0001 g/kg to 800 g/kg of the 1-MCP/CD particulate based on the weight of the coating composition, that is, 0.00001 wt % to 80 wt %; or 0.00001 wt % to 70 wt %, or 0.00001 wt % to 60 wt %, or 0.00001 wt % to 50 wt %, or 0.0001 wt % to 80 wt %, or 0.0001 wt % to 70 wt %, or 0.0001 wt % to 60 wt %, or 0.0001 wt % to 50 wt %, or 0.0001 wt % to 45 wt %, or 0.0001 wt % to 40 wt %, or 0.0001 wt % to 35 wt %, or 0.0001 wt % to 30 wt %, or 0.0001 wt % to 25 wt %, or 0.0001 wt % to 20 wt %, or 0.0001 wt % to 15 wt %, or 0.0001 wt % to 10 wt %, or 0.0001 wt % to 5 wt %, or 0.0001 wt % to 1 wt %, or 0.001 wt % to 80 wt %, or 0.001 wt % to 70 wt %, or 0.001 wt % to 60 wt %, or 0.001 wt % to 50 wt %, or 0.001 wt % to 45 wt %, or 0.001 wt % to 40 wt %, or 0.001 wt % to 35 wt %, or 0.001 wt % to 30 wt %, or 0.001 wt % to 25 wt %, or 0.001 wt % to 20 wt %, or 0.001 wt % to 15 wt %, or 0.001 wt % to 10 wt %, or 0.001 wt % to 5 wt %, or 0.001 wt % to 1 wt %, or 0.01 wt % to 80 wt %, or 0.01 wt % to 70 wt %, or 0.01 wt % to 60 wt %, or 0.01 wt % to 50 wt %, or 0.01 wt % to 45 wt %, or 0.01 wt % to 40 wt %, or 0.01 wt % to 35 wt %, or 0.01 wt % to 30 wt %, or 0.01 wt % to 25 wt %, or 0.01 wt % to 20 wt %, or 0.01 wt % to 15 wt %, or 0.01 wt % to 10 wt %, or 0.01 wt % to 5 wt %, or 0.01 wt % to 1 wt %, or 1 wt % to 80 wt %, or 1 wt % to 70 wt %, or 1 wt % to 60 wt %, or 1 wt % to 50 wt %, or 1 wt % to 45 wt %, or 1 wt % to 40 wt %, or 1 wt % to 35 wt %, or 1 wt % to 30 wt %, or 1 wt % to 25 wt %, or 1 wt % to 20 wt %, or 1 wt % to 15 wt %, or 1 wt % to 10 wt %, or 1 wt % to 9 wt %, or 1 wt % to 8 wt %, or 1 wt % to 7 wt %, or 1 wt % to 6 wt %, or 1 wt % to 5 wt %, or 1 wt % to 4 wt %, or 1 wt % to 3 wt %, or 2 wt % to 5 wt %, or 5 wt % to 10 wt %, or 10 wt % to 15 wt %, or 15 wt % to 20 wt %, or 20 wt % to 25 wt %, or 25 wt % to 30 wt %, or 30 wt % to 35 wt %, or 40 wt % to 45 wt %, or 45 wt % to 5 wt %, or 50 wt % to 55 wt %, or 55 wt % to 60 wt %, or 60 wt % to 65 wt %, or 65 et % to 70 wt %, or 70 wt % to 75 wt %, or 75 wt % to 80 wt % of the 1-MCP/CD particulate based on the weight of the coating composition.

In embodiments, methods of coating the coating composition onto a substrate include using one or more industrially useful methods selected from die coating including drop die and horizontal die coating, slot coating, brush coating, spray coating, flood coating, curtain coating, and printing methods including screen printing, inkjet printing, gravure or reverse gravure coating, flexographic printing, or electrostatic printing. In embodiments, during the coating temperatures of 90° C. or less, preferably 80° C. or less, are employed during the disposing or coating and also during the affixing of the coating to the substrate.

In embodiments, a coating composition is coated on a substrate major surface using one or more methods well known to those of skill in the coating and/or printing industry, further wherein specific coating methodology is determined by the physicochemical properties of the carrier. In embodiments the coating is carried out using conventional apparatuses and conditions, excluding conditions wherein the temperature of the 1-MCP/CD particulate exceeds 90° C., and preferably excluding conditions wherein the temperature of the 1-MCP/CD particulate exceeds 80° C. Coating methods suitably employed to coat the coating compositions include but are not limited to die coating, slot coating, brush coating, spray coating, flood coating, screen printing, fluidized bed coating, inkjet printing, gravure or reverse gravure coating, flexographic printing, electrostatic printing, and the like.

In some embodiments the coating composition is heated to lower the viscosity thereof prior to and/or during the coating. In such embodiments, the heating is heating to a temperature of less than 90° C., preferably to 80° C. or less. The coating method may be continuous coating, which is coating of all or substantially all of a substrate surface with the coating composition; or discontinuous coating, which is coating only a selected portion of the coatable substrate surface with the coating composition. In some embodiments, the discontinuous coating is a pattern coating.

Coating of the coating compositions includes selecting a coating weight of the coating composition on the substrate. Such selection is not particularly limited and in some embodiments is selected for use with a known method or known coating apparatus requirement or limitation. In embodiments the coating is selected to provide 0.1 g/m$^2$ to 100 g/m$^2$ of the coating composition on the substrate, for example 0.1 g/m$^2$ to 90 g/m$^2$, or 0.1 g/m$^2$ to 80 g/m$^2$, or 0.1 g/m$^2$ to 70 g/m$^2$, or 0.1 g/m$^2$ to 60 g/m$^2$, or 0.1 g/m$^2$ to 50 g/m$^2$, or 0.1 g/m$^2$ to 40 g/m$^2$, or 0.1 g/m$^2$ to 30 g/m$^2$, or 0.1 g/m$^2$ to 20 g/m$^2$, or 0.1 g/m$^2$ to 15 g/m$^2$, or 0.1 g/m$^2$ to 10 g/m$^2$, or 1 g/m$^2$ to 90 g/m$^2$, or 1 g/m$^2$ to 80 g/m$^2$, or 1 g/m$^2$ to 70 g/m$^2$, or 1 g/m$^2$ to 60 g/m$^2$, or 1 g/m$^2$ to 50 g/m$^2$, or 1 g/m$^2$ to 40 g/m$^2$, or 1 g/m$^2$ to 30 g/m$^2$, or 1 g/m$^2$ to 20 g/m$^2$, or 1 g/m$^2$ to 15 g/m$^2$, or 1 g/m$^2$ to 10 g/m$^2$ of the coating composition on the substrate.

In embodiments, affixing the coating composition on the substrate surface is accomplished using one or more methods known to those of skill in the coating and/or printing industry, further wherein specific affixing methodology is determined by the physicochemical properties of the carrier and the coating method employed to coat the coating composition on the substrate. Affixing methods suitably employed to affix the coating compositions to the substrate surface include evaporating (drying), irradiating, cooling, and applying heat and pressure.

In embodiments where the carrier includes a polymer and a non-aqueous solvent, affixing comprises or consists of evaporating the solvent from the coated composition. In some embodiments, evaporating comprises or consists of heating the coating composition using set temperatures of 90° C. or below, in embodiments 80° C. or below. In some embodiments, evaporating comprises or consists of convecting by applying a gas such as air, dry air, or dry nitrogen gas to the coating composition. In some embodiments, affixing comprises or consists of a combination of evaporating and convecting.

In embodiments where the carrier includes one or more α,β-unsaturated monomers, affixing comprises or consists of irradiating the coated composition with electromagnetic radiation. In some such embodiments, affixing is accomplished by employing UV radiation. UV radiation is electromagnetic radiation having a wavelength of between 10 nm and 400 nm. In embodiments, wavelengths between about 100 nm and 400 nm are useful; in other embodiments wavelengths between about 200 nm and 380 nm are useful. Wavelength, as well as radiation intensity and time of exposure, is selected based on processing parameters such as the absorption characteristics of the photoinitiator employed and polymerization kinetics of the monomer(s) selected. Useful methodologies and criteria to consider in UV curing are described, for example, in U.S. Pat. No. 4,181,752.

In embodiments, affixing by irradiation is accomplished in an environment that is substantially free of water vapor, air, or both. Such an environment is achieved, in some embodiments, by purging the coated area with an inert gas such as carbon dioxide or nitrogen during the curing, and in some such embodiments the inert gas is also dry or substantially free of water vapor. In other embodiments, water vapor and air are suitably excluded proximal to the coating composition by applying a UV-transparent, water impermeable liner on top of the coating composition after the coating and prior to the affixing. The liner material is not particularly limited in composition or thickness and is selected for UV transparency at the desired wavelength. In embodiments, the liner is removed from the surface of the coating composition after the affixing, for example by peeling the liner away from the coated substrate.

In some embodiments, affixing by irradiation is accomplished employing electron beam, or e-beam, radiation. E-beam methods employed to polymerize the cyclodextrin composition are described, for example, in the web article by Weiss et al., "Pulsed Electron Beam Polymerization", posted Jan. 1, 2006 (http://www.adhesivesmag.com/Articles/Feature Article/47965fdd41bc8010VgnVCM100000f932a8c0______). Additional information is available as disclosed in U.S. Pat. Nos. 3,940,667; 3,943,103; 6,232,365; 6,271,127; 6,358,670; 7,569,160; 7,799,885, and the like.

In embodiments where the carrier includes a wax, affixing may include cooling the coated composition. In some embodiments, the cooling is cooling to a temperature of about 15° C. to 20° C.; in other embodiments cooling is cooling to a temperature of less than 15° C., such as between 0° C. and 15° C. or even to a temperature of less than 0° C., in to obtain a solidified coating affixed to the substrate surface.

In embodiments where the carrier is an electrostatically printable particulate, affixing means fusing, wherein fusing means applying pressure and/or heat to the coating composition disposed on the substrate. Conventional electrostatic printing includes a fusing step wherein a substrate coated with polymer particles (toner) is passed through a heated nip (fusing rollers) to heat and "fuse" the polymer particles to the substrate (partially melt and coalesce the polymer particles of the toner). Such fusing is a suitable method for affixing the coating composition to the substrate, where the coating composition comprises, consists essentially of, or consists of a polymer particulate and a 1-MCP/CD particulate.

In embodiments, the fusing comprises passing the substrate and coated composition between the fusing rollers to obtain an applied pressure to the coating composition. In such embodiments, the fusing comprises or consists of providing a physical pressure point to compress the coating composition against the substrate, affixing the coating composition thereto to result in a coated composition. In other embodiments, the fusing rollers are heated, for example by setting the temperature of fusing rollers to about 80° C. to 200° C., or about 100° C. to 190° C., or about 110° C. to 180° C., or about 120° C. to 170° C., or about 130° C. to 160° C., or about 130° C. to 150° C. For example, in some embodiments where the substrate includes a wax coating thereon, the fusing rollers are not heated or are heated to a temperature of about 100° C. or less, such as 60° C. to 90° C.

Affixing the coating composition to the substrate results in a coated substrate. The coated substrates comprise, consist essentially of, or consist of a substrate having a coating affixed to at least a portion of a surface thereof, wherein the affixed coating comprises, consists essentially of, or consists of a polymer, a wax, or a combination thereof; and a 1-MCP/CD particulate dispersed within the coating. The polymer or wax is affixed as a result of affixing methods that include evaporating, irradiating, or fusing.

The thickness and coating weight of an affixed coating are selected by the user in accord with one or more commercially useful embodiments, further in accord with the physicochemical properties of the carrier and the weight percent of 1-MCP/CD particulate dispersed therein. In some embodiments, the thickness of the affixed coating is between 0.01 μm and 50 μm on all or a portion of a major substrate surface, for example 0.01 μm to 40 μm, or 0.01 μm to 30 μm, or 0.01 μm to 25 μm, or 0.01 μm to 20 μm, or 0.01 μm to 15 μm, or 0.01 μm to 10 μm, or 0.01 μm to 9 μm, or 0.01 μm to 8 μm, or 0.01 μm to 7 μm, or 0.01 μm to 6 μm, or 0.01 μm to 5 μm, or 0.01 μm to 4 μm, or 0.01 μm to 3 μm, or 0.01 μm to 2 μm, or 0.01 μm to 1 μm, or 0.1 μm to 40 μm, or 0.1 μm to 30 μm, or 0.1 μm to 25 μm, or 0.1 μm to 20 μm, or 0.1 μm to 15 μm, or 0.1 μm to 10 μm, or 0.1 μm to 9 μm, or 0.1 μm to 8 μm, or 0.1 μm to 7 μm, or 0.1 μm to 6 μm, or 0.1 μm to 5 μm, or 0.1 μm to 4 μm, or 0.1 μm to 3 μm, or 0.1 μm to 2 μm, or 0.1 μm to 1 μm, or 1 μm to 50 μm, or 1 μm to 40 μm, or 1 μm to 30 μm, or 1 μm to 20 μm, or 1 μm to 10 μm, or 1 μm to 5 μm, or 5 μm to 50 μm, or 5 μm to 40 μm, or 5 μm to 30 μm, or 5 μm to 20 μm, or 5 μm to 10 μm thick on all or a portion of a major substrate surface.

In embodiments, the affixed coating obtains a total coating weight of 0.001 $g/m^2$ to 10 $g/m^2$ on a substrate major surface, for example 0.001 $g/m^2$ to 9 $g/m^2$, or 0.001 $g/m^2$ to 8 $g/m^2$, or 0.001 $g/m^2$ to 7 $g/m^2$, or 0.001 $g/m^2$ to 6 $g/m^2$, or 0.001 $g/m^2$ to 5 $g/m^2$, or 0.001 $g/m^2$ to 4 $g/m^2$, or 0.001 $g/m^2$ to 3 $g/m^2$, or 0.001 $g/m^2$ to 2 $g/m^2$, or 0.001 $g/m^2$ to 1 $g/m^2$, or 0.01 $g/m^2$ to 10 $g/m^2$, or 0.01 $g/m^2$ to 9 $g/m^2$, or 0.01 $g/m^2$ to 8 $g/m^2$, or 0.01 $g/m^2$ to 7 $g/m^2$, or 0.01 $g/m^2$ to 6 $g/m^2$, or 0.01 $g/m^2$ to 5 $g/m^2$, or 0.01 $g/m^2$ to 4 $g/m^2$, or 0.01 $g/m^2$ to 3 $g/m^2$, or 0.01 $g/m^2$ to 2 $g/m^2$, or 0.01 $g/m^2$ to 1 $g/m^2$, or 0.1 $g/m^2$ to 10 $g/m^2$, or 0.1 $g/m^2$ to 9 $g/m^2$, or 0.1 $g/m^2$ to 8 $g/m^2$, or 0.1 $g/m^2$ to 7 $g/m^2$, or 0.1 $g/m^2$ to 6 $g/m^2$, or 0.1 $g/m^2$ to 5 $g/m^2$, or 0.1 $g/m^2$ to 4 $g/m^2$, or 0.1 $g/m^2$ to 3 $g/m^2$, or 0.1 $g/m^2$ to 2 $g/m^2$, or 0.1 $g/m^2$ to 1 $g/m^2$, or 0.5 $g/m^2$ to 10 $g/m^2$, or 0.5 $g/m^2$ to 9 $g/m^2$, or 0.5 $g/m^2$ to 8 $g/m^2$, or 0.5 $g/m^2$ to 7 $g/m^2$, or 0.5 $g/m^2$ to 6 $g/m^2$, or 0.5 $g/m^2$ to 5 $g/m^2$, or 0.5 $g/m^2$ to 4 $g/m^2$, or 0.5 $g/m^2$ to 3 $g/m^2$, or 0.5 $g/m^2$ to 2 $g/m^2$, or 0.5 $g/m^2$ to 1 $g/m^2$, or 1 $g/m^2$ to 10 $g/m^2$, or 1 $g/m^2$ to 9 $g/m^2$, or 1 $g/m^2$ to 8 $g/m^2$, or 1 $g/m^2$ to 7 $g/m^2$, or 1 $g/m^2$ to 6 $g/m^2$, or 1 $g/m^2$ to 5 $g/m^2$, or 1 $g/m^2$ to 4 $g/m^2$, or 1 $g/m^2$ to 3 $g/m^2$, or 1 $g/m^2$ to 2 $g/m^2$ on a substrate major surface.

Further disclosed herein are methods of making coated pouches by selecting a ratio of the mass or weight of 1-MCP present within the coated pouch to the interior volume of the coated pouch, present as 1-MCP/CD therein; and forming the coated pouch to obtain the selected interior volume. In embodiments, the weight or mass of 1-MCP is calculated based on the weight or mass of 1-MCP/CD dispersed within the coating affixed to the interior surface of the pouch. Such methods include adapting and configuring a coated substrate to form a pouch, further wherein the coated substrate surface is adapted and configured to correspond to an interior surface of the coated pouch, and the amount of 1-MCP enclosed within the interior of the coated pouch and dispersed in the affixed coating in the form of 1-MCP/CD is known on a weight or mass basis. In embodiments, the selected interior volume is 50 mL to 2000 mL interior volume of air or another gas, per milligram of 1-MCP in the coating and present as 1-MCP/CD.

Coated pouches are assembled by configuring and joining a single coated substrate, or by configuring and joining two or more coated substrates, or by configuring and joining one or more coated substrates and one or more uncoated substrates. In embodiments, configuring coated and uncoated substrates is accomplished using one or more methods of die cutting, blade cutting, laser cutting, slicing, contacting, folding, crimping, stamping, embossing, and the like as necessary to provide a suitable configuration for pouch or envelope conformation, further obtaining a desired shape and size as determined by the operator or manufacturer. Configuring a coated substrate includes configuring and orienting the coated substrate surface to obtain an interior surface of the coated pouch upon joining. After the configuring, joining is accomplished by adhesive bonding, heat bonding or heat sealing, stapling, stitching, other related methods of configuring thermoplastic materials to form pouch or envelope type containers defining an interior volume that is sealed from the free exchange with the surrounding atmosphere.

Accordingly, disclosed herein are methods of obtaining different rates of 1-MCP release from 1-MCP/CD, the methods including: forming a first active pouch defining a first interior volume and a second active pouch that is substantially identical to the first active pouch except that the second active pouch defines a second interior volume that is different from the first interior volume; and subjecting the first and second active pouches to a selected set of disgorgement conditions, wherein the second active pouch releases 1-MCP at a different rate than the first active pouch, further wherein the difference in rate is measurable. As used herein, "substantially identical" as applied to pouches, active pouches, coated substrates, laminated constructions, and the like means that the pouches, active pouches, coated substrates, laminated constructions, and the like are as close to identical as are commonly obtained by using standard manufacturing practices to obtain e.g. uniformity of coating compositions, coating thickness, total amount of 1-MCP/CD, and other parameters relevant to the goal of forming identical pouches, active pouches, coated substrates, laminated constructions, and the like, and further with reference to and consistent with paragraphs below disclosing the definition of "substantially". As referred to herein, measurable differences in the rate of 1-MCP release may be determined, for example, by measuring 1-MCP gas using gas chromatographic techniques. Exemplary but non-limiting gas chromatographic techniques are disclosed in the Examples below.

In embodiments of the methods of making active pouches disclosed above, the first active pouch releases 1-MCP faster than the second active pouch, when the first and second active pouches are subjected to identical disgorgement conditions. In other embodiments, the first active pouch releases 1-MCP slower than the second active pouch, when first and second active pouches are subjected to identical disgorgement conditions. In embodiments, the selected release rate of 1-MCP is between 100 ppb and 25 ppm per hour (measured as μL/L) under the selected disgorgement conditions.

Accordingly, the rate of 1-MCP release from an active pouch may be suitably determined, and thus selected and implemented by a user, by comparing the rate of 1-MCP release from the first and second active pouches described above under a selected set of disgorgement conditions. Accordingly, in embodiments, the methods of making active pouches as described above further include selecting a rate of 1-MCP release that is different from the rate of 1-MCP release of the first active pouch and also different from the rate of 1-MCP release of the second active pouch when measured under a selected set of disgorgement conditions; and providing a third active pouch that is substantially identical to the first and second active pouches, but defines an interior volume that is different from the interior volume of the first and second pouches, further wherein the third pouch achieves the selected release rate of 1-MCP when subjected to the selected set of disgorgement conditions. Thus, in embodiments, the foregoing methods further include selecting a rate of 1-MCP release that is different from the 1-MCP release rate of the first active pouch when subjected to the disgorgement conditions and also different from the 1-MCP release rate of the second active pouch when subjected to the disgorgement conditions; and forming a third active pouch that is substantially identical to the first and second active pouches but defines an interior volume that is different from the interior volume of the first pouch and is also different from the interior volume of the second pouch; wherein the third pouch achieves the selected release rate of 1-MCP when subjected to the selected disgorgement conditions.

In some embodiments of the above methods, the selected release rate of 1-MCP—that is, the rate of release of the third active pouch—is faster than the 1-MCP release rate of the first active pouch, the second active pouch, or both the first and second active pouch. In such embodiments, the third active pouch defines an internal volume that is greater than the internal volume of the first active pouch, or greater than the internal volume of the second active pouch, or greater than the internal volume of both the first and second active pouches. In other embodiments the selected release rate of 1-MCP is slower than the 1-MCP release rate of the first active pouch, the second active pouch, or both. In such embodiments, the third active pouch defines an internal volume that is less than the internal volume of the first active pouch, or less than the internal volume of the second active pouch, or less than the internal volume of both the first and second active pouch. In still other embodiments the selected release rate of 1-MCP is intermediate between the 1-MCP release rates of the first and second active pouches. In such embodiments, the third active pouch defines an internal volume that is intermediate between the internal volume of the first active pouch and the internal volume of the second active pouch.

In one or more of the foregoing methods, one or more of first through third active pouches define an interior volume 50 mL to 2000 mL per milligram of 1-MCP, wherein the 1-MCP is disposed within the interior volume of the active pouch as 1-MCP/CD. In some such embodiments, the 1-MCP/CD is present as a solid crystalline particulate. In other embodiments, the 1-MCP/CD is entrained or incorporated within a coating, further wherein the coating is disposed on at least a portion of an interior surface of the active pouch. In embodiments, an active pouch defining an interior volume 50 mL to 2000 mL per milligram of 1-MCP, releases 1-MCP faster than the corresponding laminated structure when the active pouch and the corresponding laminate structure are subjected to identical disgorgement conditions. In embodiments, the selected release rate of 1-MCP is between 100 ppb and 25 ppm per hour under the selected disgorgement conditions.

Thus, disclosed herein are methods of making active pouches that include selecting a rate of 1-MCP release of between 100 ppb and 25 ppm per hour under a selected set of disgorgement conditions; providing an active pouch enclosing an amount of 1-MCP/CD, including introducing a selected volume of air into the pouch interior to form an active pouch having between 50 mL and 2000 mL of air per milligram of 1-MCP present within the active pouch as 1-MCP/CD; and subjecting the active pouch to the selected disgorgement conditions, wherein the active pouch releases 1-MCP at the selected rate. In some such embodiments, the active pouch is a coated pouch that includes 1-MCP/CD entrained or incorporated in a coating, wherein the coating is affixed on at least a portion of the interior surface of the active pouch. In other such embodiments, the active pouch interior volume includes a 1-MCP/CD particulate that is not entrained or incorporated within a coating.

In some embodiments, an active pouch is configured as an inflatable active pouch. An inflatable pouch (or pouch configuration) includes one or more substrates configured as a pouch, but not sealed to define an interior volume exclusive of free exchange of air with the surrounding atmosphere; wherein the pouch configuration is configured and adapted to be sealed to form a pouch, that is, configured and adapted to be sealed to define an interior volume that excludes the free exchange of air with the surrounding atmosphere. An active pouch configuration is a pouch configuration that includes 1-MCP/CD disposed within the nascent interior volume of the pouch configuration. An inflatable active pouch is an inflatable pouch having 1-MCP/CD contacted with a portion of the pouch configuration that defines the interior volume of the active pouch upon sealing thereof.

Inflatable active pouches are suitably stored for later use, or provided as a kit for making active pouches, wherein the user of the inflatable active pouches or the user of the kit carries out a final joining step to define the interior volume of the active pouch, further to exclude the free exchange of the interior volume with the atmosphere, and further still to apply a selected amount of air or another gas to the interior volume of the active pouch, or to provide a selected amount of air or another gas to the inflatable pouch during or prior to joining the inflatable pouch to form the active pouch. In some embodiments, a kit including one or more inflatable active pouches includes joining instructions for forming an active pouch, and further instructions for selecting an active pouch interior volume to obtain a selected rate of 1-MCP release from the active pouch.

Figure 6:
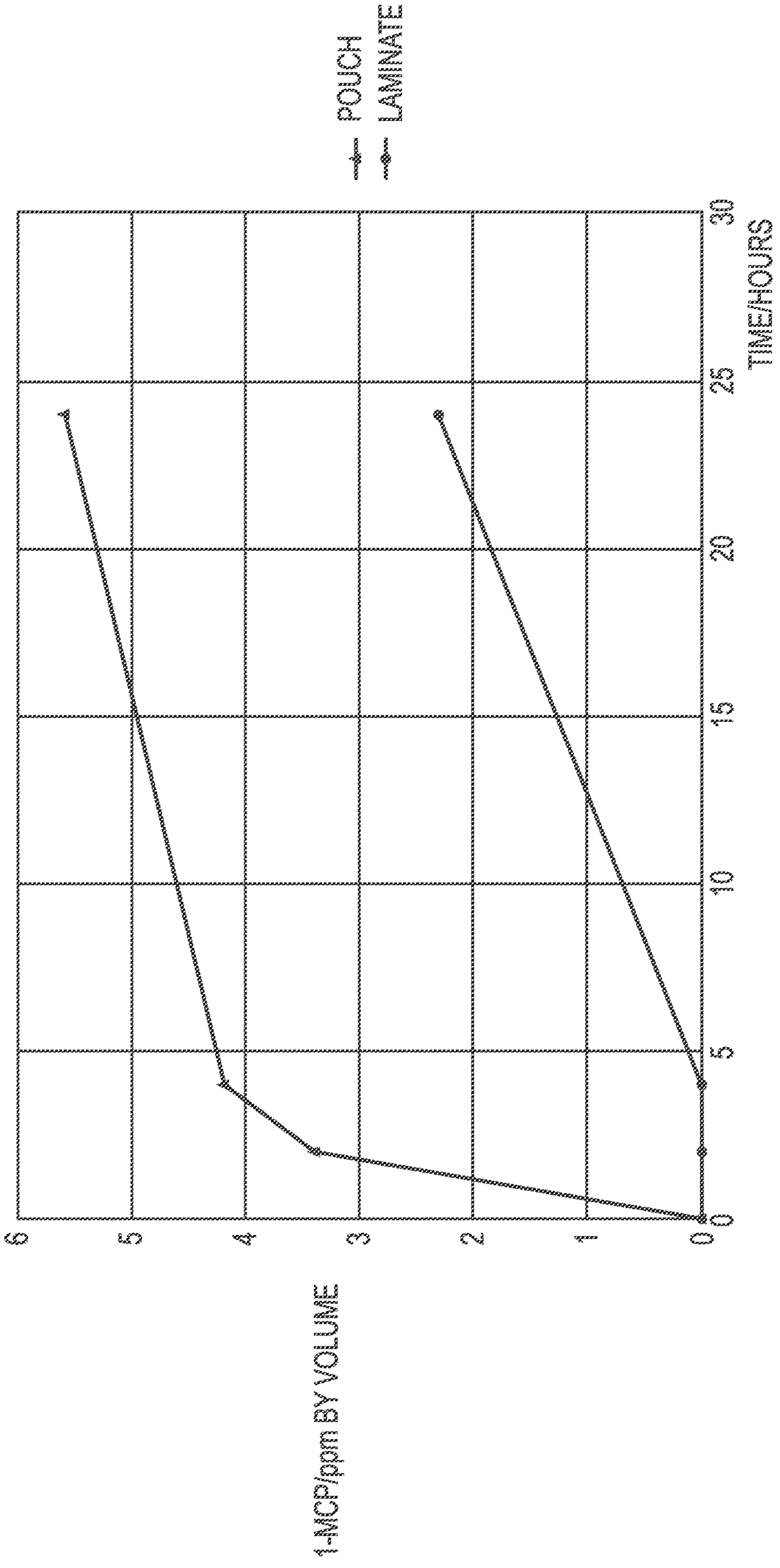
FIG. 6 is a plot of 1-MCP concentration in a headspace as a function of time, in accordance with the procedure of Example 4.

In some embodiments, a kit including one or more inflatable active pouches includes instructions for forming a sealed, uninflated active pouch, the sealed, uninflated pouch having less than 50 mL interior volume of air or another gas, per milligram of 1-MCP present within the interior volume as 1-MCP/CD. In embodiments, a sealed, uninflated pouch is the same as an active pouch; that is, in embodiments, active pouches and sealed, uninflated pouches are identical or substantially identical, except that the active pouches include 50 mL to 2000 mL interior volume of a gas that is not 1-MCP, per milligram of 1-MCP present within the interior volume as 1-MCP/CD; and the sealed, uninflated pouches have less than 50 mL interior volume of a gas that is not 1-MCP, per milligram of 1-MCP present within the interior volume as 1-MCP/CD. In some such embodiments, a sealed uninflated pouch includes 0 mL interior volume, and is formed by applying a vacuum to an uninflated active pouch, and joining the pouch while the vacuum is applied. A sealed, uninflated coated pouch having less than 50 mL interior volume of air or another gas, per milligram of 1-MCP present within the coating as 1-MCP/CD provides a rate of 1-MCP disgorgement when subjected to a selected set of disgorgement conditions that is the same as or similar to a corresponding laminated coated substrate. This is demonstrated in Example 6 below and shown in FIG. 7 and Table 4, where pouch volume of less than about 100 mL interior volume of air per milligram 1-MCP present as 1-MCP/CD released slightly less than 2 ppm 1-MCP over 24 hours; further in comparison to Example 4 and FIG. 6, showing that a laminate construction released just over 2 ppm 1-MCP over 24 hours using similar but not identical disgorgement conditions.

In one non-limiting example, a kit for making active pouches includes one or more substantially identical inflatable active pouches, and instructions for joining an inflatable active pouch and applying a selected amount of air to the interior volume of the inflatable active pouch during the joining. In embodiments, the instructions are further directed to providing variable selected amounts of air in order obtain variable rates of 1-MCP release from the resulting active pouches under the same disgorgement conditions. Further, in embodiments such variable rates of 1-MCP release are further directed to the treatment of different types of living plant materials. Thus for example, a first rate of 1-MCP release may be needed for effective treatment of ripe tomato fruits, a second rate of 1-MCP release may be needed for effective treatment of freshly cut broccoli florets, and a third rate of 1-MCP release may be needed for effective treatment of freshly cut carnation flowers. In accordance with the methods and active pouch articles disclosed herein, a kit may include at least one inflatable active pouch, and instructions directing the user to apply a first amount of air to the inflatable active pouch to form a first active pouch having a first interior volume of air, wherein the first active pouch provides a suitable rate of 1-MCP release to treat one or more living tomato fruits when the active pouch is placed proximal to the living tomato fruits; and additional directions to place the active pouch proximal to, for example in touching relation to, one or more living tomato fruits.

The same kit may further include instructions directing the user to alternatively apply a second amount of air to the inflatable active pouch, to form a second active pouch having a second interior volume of air that is different from the first interior volume of air, to provide a second active pouch having a suitable rate of 1-MCP release to treat one or more living broccoli florets when the second active pouch is subjected to the same disgorgement conditions as the first active pouch; and additional directions to place the second active pouch proximal to, for example in touching relation to, one or more living broccoli florets. The same kit may further include instructions directing the user to alternatively apply a third amount of air to the inflatable active pouch to form a third active pouch having a third interior volume of air that is different from the first and second interior volumes of air, wherein the third active pouch provides a suitable rate of 1-MCP release to treat one or more living freshly cut carnations when the third active pouch is placed proximal thereto. In similar fashion, directions to apply fourth, fifth, sixth, or more selected amounts of air to the inflatable pouch to form fourth, fifth, sixth, and higher active pouches are envisioned, enabling effective treatment of fourth, fifth, sixth, or more types of living plant material.

Further, one selected interior volume of air may result in the release 1-MCP at a suitable rate to provide effective treatment of more than one type of living plant material; for example, the first active pouch described above may also have a suitable rate of 1-MCP release for treatment of apples and pears, when the first active pouch is placed proximal thereto; and/or the second active pouch above may also have a suitable rate of 1-MCP release for treatment of melons, when the second active pouch is placed proximal thereto; and/or the third active pouch above may also have a suitable rate of 1-MCP release for treatment of cut orchids, calla lilies, and roses, when the first active pouch is placed proximal thereto. As such, the directions may instruct the user to select an interior volume of air to apply to the inflatable pouch, wherein the selected interior volume is correlated to the use of the resulting active pouch to treat one or more of a selected list of living plant materials; and further still wherein the user is directed to place the active pouch proximal one or more of the correlated living plant materials to obtain treatment thereof.

We have found that the rate of humidity-mediated 1-MCP release from an active pouch under a selected set of disgorgement conditions, can be varied by simply varying the interior volume of the active pouch, that is, varying the interior volume of the pouch between 50 mL and 2000 mL interior volume of air or another gas, per milligram of 1-MCP present within the interior volume as 1-MCP/CD. Accordingly, the interior volume of gas, such as air, in any one active pouch is directly related to the rate of humidity-mediated release of 1-MCP therefrom when the active pouch is subjected to a set of disgorgement conditions. In embodiments, two active pouches that are substantially identical except for their interior volumes will release 1-MCP at different rates when subjected to identical disgorgement conditions, further wherein the active pouch having the greater interior volume will release 1-MCP faster than the active pouch with the lesser interior volume.

Accordingly, an unexpected advantage of the kits including inflatable active pouches is the ability to select the interior volume of air, or another gas, for applying to each of the inflatable active pouches, wherein the selected interior volume determines the release rate of 1-MCP when the active pouch is subjected to a selected set of disgorgement conditions. Thus, the inflatable active pouches provide the user of the kit with the ability to tailor 1-MCP release for maximum efficacy based on individual plants' biological requirements.

A kit in accordance with the methods and articles disclosed herein may also include instructions for a user to place one or more active pouches proximal to one or more different living plant materials, or types of living plant materials, to obtain 1-MCP treatment of the living plant material. For example, a kit may include a plurality of identical inflatable active pouches, wherein the directions provided in the kit include a first list of living plant materials suitably treated by forming a first active pouch from one or more of the inflatable active pouches, the first active pouch having a first interior volume of air, and placing the first active pouch proximal to one or more of the first listed living plant materials. The kit directions may further include a second list of living plant materials (wherein the first list and the second list include different living plant materials) that are suitably treated by forming a second active pouch from one or more of the inflatable active pouches, the second active pouch having a second interior volume of air that is different from the first interior volume of air, and placing the second active pouch proximal to one or more of the second listed living plant materials. In such embodiments, the first and second active pouches release 1-MCP at different rates when subjected to identical disgorgement conditions.

Additionally, a kit in accordance with the above and including a plurality of identical inflatable active pouches, may further include directions to form a combination of one or more active pouches, and one or more sealed uninflated active pouches, and placing the combination proximal to a living plant material. In such embodiments, a sealed uninflated active pouch is an inflatable pouch that is sealed to prevent the free exchange thereof with the atmosphere, further wherein the interior volume of the sealed uninflated active pouch is less than 50 mL of air or another gas per milligram of 1-MCP within the interior volume and present as 1-MCP/CD. In such embodiments, when the combination of pouches is subjected to the same disgorgement conditions, the one or more active pouches release 1-MCP faster than the one or more sealed, uninflated active pouches. Further, we have found that the sealed, uninflated active pouches release 1-MCP at the same or similar rate as a corresponding laminate construction. Thus, a kit in accordance with the above and including a plurality of identical inflatable active pouches, may further include directions to combine one or a plurality of active pouches with one or a plurality of sealed uninflated active pouches in a single location that is proximal to a living plant material. For example, a kit in accordance with the above may include directions to combine 1-100 active pouches with 1-100 sealed uninflated active pouches, in a single location that is proximal to a living plant material. Such combinations provide both fast and slow release of 1-MCP when subjected to identical disgorgement conditions; and the ratio of active pouches to sealed uninflated active pouches is easily adjusted to provide a selected amount and rate of 1-MCP release. Thus, the kit may include directions for combining 1 active pouch with 100 sealed, uninflated active pouches; or 1 sealed, uninflated active pouch with 100 active pouches; or combining 1, 2, 3, 4, 5, 6, 7, 8, 9, 10, 10-15, 15-20, 20-25, 25-30, 30-35, 35-40, 40-45, 45-50, 50-55, 55-60, 60-65, 65-70, 70-75, 75-80, 80-85, 85-90, 90-95, or 95-100 active pouches with 1, 2, 3, 4, 5, 6, 7, 8, 9, 10, 10-15, 15-20, 20-25, 25-30, 30-35, 35-40, 40-45, 45-50, 50-55, 55-60, 60-65, 65-70, 70-75, 75-80, 80-85, 85-90, 90-95, or 95-100 sealed, uninflated active pouches; and directions for placing the combination proximal to living plant material; or to subject the combination to a set of disgorgement conditions to achieve a targeted rate of 1-MCP release.

Accordingly, disclosed herein are combinations of one or more active pouches and one or more sealed uninflated active pouches. In embodiments the pouch combinations include at least one active pouch having 50 mL to 2000 mL interior volume of air or another gas that is not 1-MCP, per milligram of 1-MCP within the interior volume thereof and present as 1-MCP/CD; and at least one sealed, uninflated active pouch having less than 50 mL interior volume of air or another gas that is not 1-MCP, per milligram of 1-MCP within the interior volume thereof and present as 1-MCP/CD. In embodiments, the pouch combinations are combined or disposed in a single location where a desired release rate of 1-MCP is targeted, for example to treat a living plant or plant part, or a group of living plants or plant parts. The pouch combinations provide a combined release rate of 1-MCP that can be easily adjusted by adding or subtracting the number of pouches employed overall, or by changing the ratio of active pouches to sealed, uninflated active pouches combined. In embodiments, the pouch combination is assembled in a ratio of 1 active pouch combined with 100 sealed, uninflated active pouches; or in a ratio of 1 sealed, uninflated active pouch combined with 100 active pouches; or the pouch combination is a combination of 1, 2, 3, 4, 5, 6, 7, 8, 9, 10, 10-15, 15-20, 20-25, 25-30, 30-35, 35-40, 40-45, 45-50, 50-55, 55-60, 60-65, 65-70, 70-75, 75-80, 80-85, 85-90, 90-95, or 95-100 active pouches combined with 1, 2, 3, 4, 5, 6, 7, 8, 9, 10, 10-15, 15-20, 20-25, 25-30, 30-35, 35-40, 40-45, 45-50, 50-55, 55-60, 60-65, 65-70, 70-75, 75-80, 80-85, 85-90, 90-95, or 95-100 sealed, uninflated active pouches; or the pouch combination is provided at a ratio of 1, 2, 3, 4, 5, 6, 7, 8, 9, 10, 10-15, 15-20, 20-25, 25-30, 30-35, 35-40, 40-45, 45-50, 50-55, 55-60, 60-65, 65-70, 70-75, 75-80, 80-85, 85-90, 90-95, or 95-100 active pouches for each 1, 2, 3, 4, 5, 6, 7, 8, 9, 10, 10-15, 15-20, 20-25, 25-30, 30-35, 35-40, 40-45, 45-50, 50-55, 55-60, 60-65, 65-70, 70-75, 75-80, 80-85, 85-90, 90-95, or 95-100 sealed, uninflated active pouches. In embodiments the pouch combination is further subjected to a single set of disgorgement conditions, or to an identical set of disgorgement conditions, to achieve a selected or targeted rate of 1-MCP release. In some such embodiments, subjecting to disgorgement conditions may include positioning of the combination proximal to one or more living plants or living plant parts, where disgorgement conditions are supplied by the biological respiration of the one or more living plants or living plant parts.

In embodiments active pouches, sealed uninflated active pouches, and inflatable active pouches are configured, or joined, or configured and joined in the absence of liquid water and under conditions of temperature and humidity that avoid disgorgement of 1-MCP. Such conditions include but are not limited to temperatures of less than 90° C., preferably less than 80° C.; and relative humidity of 50% or less. In embodiments, the conditions include atmospheric pressure; in other embodiments the conditions include a pressure above or below the pressure of the surrounding atmosphere. Accordingly, using the foregoing conditions during configuring and joining of an active pouch or an inflatable active pouch enables one of skill to reproducibly configure a plurality of active pouches or inflatable active pouches to have the same, or substantially the same amount of 1-MCP/CD as the particulate product combined with the carrier to obtain the coating compositions described above. The methods described herein of coating, affixing, configuring, joining, and finally sealing do not lead to loss of 1-MCP gas from the 1-MCP/CD particulate.

It is a feature of the active pouches described herein that when subjected to conditions of atmospheric temperature and humidity proximal to the coated pouch that avoid disgorgement of 1-MCP—that is, conditions that are not disgorgement conditions—the interior volume of the coated pouch excludes or substantially excludes 1-MCP gas. "Substantially excludes 1-MCP gas" means there is no measurable 1-MCP gas in the interior volume as determined by gas chromatographic methods. Suitable gas chromatographic methods include those described in detail in the Examples herein below. However, when a coated pouch is subjected to disgorgement conditions in the atmosphere proximal to the coated pouch, the interior volume of the coated pouch may include a measurable amount of 1-MCP by gas chromatographic methods. In embodiments, when a coated pouch is subjected to disgorgement conditions, the interior volume includes a measurable amount of 1-MCP.

In embodiments, active pouches and inflatable active pouches are configured and joined using any one or more of the methods employed in the industry to make "air pillow" or "bubble wrap" type configurations, inflatable configurations, and arrays thereof for use in cushioning items within a package; or for providing in a kit. Thus, the methods, machines, and systems used to form the active pouches and inflatable active pouches may be conventional methods familiar to those of skill in the art of making air-filled pouches and pillows for protecting items during transportation, such as by truck, airplane, boat, or railcar.

In embodiments, an active pouch is a single, discrete active pouch. In embodiments, an inflatable active pouch is a single, discrete inflatable active pouch. In embodiments, an active pouch or an inflatable active pouch is defined within an array that includes a plurality of pouches or inflatable pouches defined or joined in a single article. In some embodiments, an array is provided in the form of a strip, or a one-dimensional array defining a plurality of pouches along a single axis, wherein the plurality includes at least one active pouch. In some such embodiments the strip is detachably joined, and the plurality of pouches may suitably be detached and separated by the unassisted action of human hands without breaching the active pouch interior volume to provide a plurality of single, discrete pouches or smaller arrays thereof that are active pouches or include one or more active pouches. In still other embodiments, an array is provided in the form of a sheet, or a two-dimensional array defining a plurality of pouches along two axes, the plurality of pouches including one or more active pouches.

In some embodiments, an array is provided in the form of a strip, or a one-dimensional array defining a plurality of inflatable pouches along a single axis, wherein the plurality includes at least one inflatable active pouch. In some such embodiments the strip is detachably joined, and the plurality of inflatable pouches may suitably be detached and separated by the unassisted action of human hands to provide a plurality of single, discrete inflatable pouches that are inflatable active pouches or include at least one inflatable active pouch. In still other embodiments, an array is provided in the form of a sheet, or a two-dimensional array defining a plurality of inflatable pouches along two axes, the plurality of inflatable pouches including one or more inflatable coated pouches. In such embodiments, the array of inflatable pouches is suitably inflated and joined to form an array of pouches using methods known to those of skill in the art in making articles such as bubble wrap and air pillows. The inflatable pouches of the array may be inflated and joined individually, that is, serially; or an array of inflatable pouches may be inflated simultaneously, for example where one or more air channels are configured between individual inflatable pouches during the joining thereof.

In embodiments, an active pouch, inflatable active pouch, sealed uninflated active pouch, or an array of active pouches or inflatable active pouches further includes an exterior coating, which is a coating affixed to an exterior surface thereof that includes a carrier and 1-MCP/CD dispersed within the carrier. In other embodiments, an active pouch, inflatable active pouch, or array of active pouches or inflatable active pouches includes a laminated coating affixed thereto, wherein the laminated coating includes a carrier and 1-MCP/CD dispersed within the carrier. In embodiments the laminated coating is defined within a sealed or joined area of an active pouch, inflatable active pouch, or array thereof, where two layers of a substrate are joined to seal the active pouch, and further wherein at least one of the substrate layers is a coated substrate layer, wherein joining effectively laminates the coating between substrate layers in the joined regions. In embodiments, an active pouch, inflatable active pouch, or array of active pouches or inflatable active pouches includes an exterior coating affixed to a portion of the exterior surface thereof, and a laminated coating affixed to another portion of the exterior surface thereof. In embodiments, the ability to use one or more 1-MCP/CD particulates, 1-MCP/CD-bearing coatings, 1-MCP/CD-bearing laminated coatings, and MCP/c/CD-bearing coated pouch interior surfaces collectively provide the manufacturer with complete flexibility to provide a single article that provides slower, faster, and/or intermediate release rates of 1-MCP as desired. Additionally, in embodiments, varying amounts of 1-MCP/CD are incorporated into exterior coatings, coated pouch coatings, and laminated coatings in different amounts by weight or mass, to adjust the amount of 1-MCP released as a function of time, when such active pouches are subjected to disgorgement conditions.

In embodiments, a plurality of active pouches, sealed uninflated active pouches, or inflatable active pouches are provided as a kit. The plurality may be a plurality of single, discrete active pouches, a plurality of single, discrete inflatable active pouches, a plurality of sealed uninflated active pouches, a one-dimensional array of inflatable pouches including one or more inflatable active pouches, or a two-dimensional array of inflatable pouches including one or more inflatable active pouches. In some embodiments, each and every pouch or inflatable pouch included in an array is an active pouch or inflatable active pouch. A user of such a kit may inflate and/or join one or more inflatable active pouches to define an interior volume therein and prevent the free exchange thereof with the atmosphere. The interior volume of a sealed, uninflated active pouch is less than 50 mL of air or another gas, per milligram of 1-MCP present within the interior volume as 1-MCP/CD; whereas the interior volume of an active pouch is between 50 mL and 2000 mL of air or another gas, per milligram of 1-MCP present within the interior volume as 1-MCP/CD. In embodiments, a kit further includes instructions on how to select an interior volume for the inflatable active pouches and how to seal an inflatable active pouch to form an active pouch and/or a sealed, uninflated active pouch that excludes free exchange of the interior volume with the atmosphere while providing the selected interior volume within the pouch. In embodiments the kit includes an array including one or more inflatable active pouches in roll format. In some embodiments the kit includes 2 to 10,000 inflatable active pouches. In some embodiments, the kit further includes a rack or dispenser for holding/mounting the roll of inflatable active pouches to allow for ease of dispensing the inflatable pouches, thereby assisting the user in sealing the active pouches to define an interior volume therein and, if desired, separate the array into smaller arrays or into single, discrete pouches.

Accordingly, described herein are methods of making pouches having different rates of 1-MCP release when subjected to a selected set of disgorgement conditions, the methods including: forming a first active pouch comprising a first exterior surface and a first interior surface defining a first interior volume that is excluded from free exchange with the atmosphere, the first interior volume including a selected amount of a clathrate of 1-methylcyclopropene with α-cyclodextrin (1-MCP/CD) and a first interior volume of a gas that is not 1-MCP, wherein at least a portion of the first active pouch is permeable to 1-methylcyclopropene (1-MCP) gas and at least a portion of the first active pouch is permeable to water vapor; forming a second active pouch that is substantially identical to the first active pouch except that the second active pouch defines a second interior volume of the gas that is different from the first interior volume of the gas; and subjecting the first and second active pouches to a selected set of disgorgement conditions, wherein the first active pouch releases 1-MCP at a different rate than the second active pouch. In embodiments, the methods include selecting a rate of 1-MCP release that is different from the rate of 1-MCP release of the first active pouch and also different from the rate of 1-MCP release from the second active pouch; and forming a third active pouch that is substantially identical to the first and second active pouches, but defines an interior volume of the gas that is different from the interior volume of the gas in the first and second active pouches, further wherein the third active pouch obtains the selected release rate of 1-MCP when subjected to the selected set of disgorgement conditions.

In accordance with the foregoing methods, a kit comprising one or more inflatable active pouches is disclosed. In embodiments, the inflatable active pouches are substantially identical. In embodiments, the inflatable active pouches are detachably joined in a roll form. In embodiments the kit includes instructions for a user to: inflate and seal one or more of the inflatable active pouches to define an interior volume of 50 mL to 2000 mL of air per milligram of 1-MCP present within the interior volume as 1-MCP/CD to provide an active pouch; seal one or more of the inflatable active pouches to define an interior volume of less than 50 mL of air per milligram of 1-MCP present within the interior volume as 1-MCP/CD to provide a sealed, uninflated active pouch; combine one or more active pouches with one or more sealed, uninflated active pouches; and situate the combination proximal to living plant material. In some embodiments, the kit further includes one or more inflatable pouches that do not include 1-MCP/CD. Such "inactive" pouches are suitable for use in cushioning one or more living plant materials, such as fresh product.

It is an advantage of the methods described herein that conventional techniques may be suitably used to configure and join coated pouches, inflatable coated pouches, sealed uninflated active pouches, combinations of active pouches and sealed, uninflated active pouches, arrays of coated pouches, and arrays of inflatable coated pouches, using a coated substrate in place of one or more substrates of the known art used to make air-filled thermoplastic pouches, e.g. bubble wrap or air pillows for packing, storage, and transportation applications as well as inflatable bubble wrap or inflatable air pillows, and kits including rolls of inflatable bubble wrap or inflatable air pillows. Exemplary but non-limiting machines, materials, and processes useful for configuring and joining coated pouches, inflatable coated pouches, arrays of coated pouches, and arrays of inflatable pouches are described in U.S. Pat. Nos. 7,067,025; 8,770,408; 9,540,162; 10,040,618; 10,647,460; 10,786,960; 10,850,906; and 10,850,907 as well as other patent and non-patent literature.

In embodiments, the coated pouches are similar in appearance and general construction to air pillows and bubblewrap products sold in the marketplace, except that the coated pouches include a coating comprising 1-MCP/CD affixed to an interior surface, and the coated pouches include a known interior volume that applied to the coated pouch to obtain a selected rate of 1-MCP release from the coated pouch when subjected to disgorgement conditions. Thus, in appearance, general construction, and in the ability to use systems and machines to configure and join the coated pouches, the coated pouches and inflatable coated pouches described herein are similar to e.g. AIRplus® sold by Storopack Hans Reichenecker GmbH of Metzingen, Germany; Fill-Air® products sold by Sealed Air of Charlotte, NC; and other similar pouch and inflatable pouch products as well as machines used to inflate and join the inflatable pouch products.

The dimensions of the active pouches are not particularly limited. For convenience, particularly where an array or kit is provided, an active pouch may be generally rectilinear in shape having a width of about 2 mm to 2 m and a length of 2 mm to 1 km. Coated pouches having a known weight or mass of 1-MCP/CD particulate per pouch may be continuously manufactured using conventional methodology. Further, individual pouches enclosing different weights or masses of 1-MCP/CD within the interior volume thereof are suitably manufactured at the discretion of an operator depending on commercial demand and ability to manufacture in accord with desired specifications.

In embodiments, methods of using the active pouches include subjecting a single active pouch to disgorgement conditions. In embodiments, methods of using the active pouches include subjecting multiple active pouches to disgorgement conditions. The subjecting of multiple active pouches to disgorgement conditions may be subjecting serially or subjecting contemporaneously or both, as selected by the user to obtain customized treatment for a living plant material targeted for treatment with 1-MCP (1-methylcyclopropene gas).

Further disclosed herein is a method for forming an active pouch that includes selecting a rate of 1-MCP release from the active pouch that is between 100 ppb and 25 ppm per hour; and forming an active pouch having a ratio of 50 mL to 2000 mL interior volume of air or another gas, per milligram of 1-MCP in the coating and present as 1-MCP/CD. In embodiments the active pouch is a coated pouch, and the 1-MCP/CD is affixed to a portion of the interior surface thereof. In embodiments the method includes subjecting the active pouch to disgorgement conditions, wherein the selected rate of 1-MCP release is obtained. As used herein, the term "disgorgement conditions" refers to atmospheric conditions proximal to a pouch. Such conditions include ambient pressure (typically about 1 atmosphere), temperature between 0° C. and about 50° C., and relative humidity between about 80% and 100%. Suitable disgorgement conditions may be selected by the user or encountered in the ambient surroundings of temperature, humidity, and pressure proximal to an active pouch.

In embodiments, a rate of 1-MCP release from an active pouch is selected to be 100 ppb to 200 ppb per hour, or 200 ppb to 300 ppb per hour, or 300 ppb to 400 ppb per hour, or 400 ppb to 500 ppb per hour, or 500 ppb to 600 ppb per hour, or 600 ppb to 700 ppb per hour, or 700 ppb to 800 ppb per hour, or 800 ppb to 900 ppb per hour, or 900 ppb to 1 ppm per hour, or 1 ppm to 2 ppm per hour, or 2 ppm to 3 ppm per hour, or 3 ppm to 4 ppm per hour, or 4 ppm to 5 ppm per hour, or 5 ppm to 6 ppm per hour, or 6 ppm to 7 ppm per hour, or 7 ppm to 8 ppm per hour, or 8 ppm to 9 ppm per hour, or 9 ppm to 10 ppm per hour, or 10 ppm to 11 ppm per hour, or 11 ppm to 12 ppm, per hour or 12 ppm to 13 ppm per hour, or 13 ppm to 14 ppm per hour, or 14 ppm to 15 ppm per hour, or 15 ppm to 16 ppm per hour, or 16 ppm to 17 ppm per hour, or 17 ppm to 18 ppm per hour, or 18 ppm to 19 ppm per hour, or 19 ppm to 20 ppm per hour, or 20 ppm to 21 ppm per hour, or 21 ppm to 22 ppm per hour, or 23 ppm to 24 ppm per hour, or 24 ppm to 25 ppm per hour. The desirable rate of 1-MCP release is in turn selected according to the type of living plant material and mass thereof to be treated by exposing the living plant material to 1-MCP.

To obtain a selected rate of 1-MCP release of 100 ppb to 25 ppm per hour under disgorgement conditions, a user may select a pouch interior volume, and select an amount of 1-MCP/CD to enclose within the interior volume, such that the active pouch includes 50 mL to 2000 mL (2 L) interior volume of a gas, such as air or another gas or mixture of gases that does not include 1-MCP, per milligram of 1-MCP (1-methylcyclopropene) present as 1-MCP/CD within the active pouch interior volume. Thus, in embodiments, to obtain a selected rate of 1-MCP release of 100 ppb to 25 ppm per hour under disgorgement conditions, 50 mL to 100 mL of a non-1-MCP gas or mixture thereof per milligram 1-MCP present as 1-MCP/CD is selected as the interior volume of an active pouch, or 100 mL to 200 mL, or 200 mL to 300 mL, or 300 mL to 400 mL, or 400 mL to 500 mL, or 500 mL to 600 mL, or 600 mL to 700 mL, or 700 mL to 800 mL, or 800 mL to 900 mL, or 900 mL to 1000 mL, 1000 mL to 1200 mL, 1200 mL to 1400 mL, 1400 mL to 1600 mL, 1600 mL to 1800 mL, or 1800 mL to 2000 mL, or 50 mL to 1500 mL, or 50 mL to 1000 mL, or 50 mL to 500 mL, or 50 mL to 200 mL, or 100 mL to 1500 mL, or 100 mL to 1000 mL, or 100 mL to 500 mL, or 100 mL to 200 mL, or 200 mL to 1500 mL, or 200 mL to 1000 mL, or 200 mL to 500 mL of a gas that is not 1-MCP, per milligram of 1-MCP present as 1-MCP/CD within the active pouch interior volume. In embodiments, the active pouch is a coated pouch including 50 mL to 2000 mL (2 L) interior volume of a gas that is not 1-MCP, per milligram of 1-MCP in the coating affixed to the interior pouch surface, that is, based on the weight of 1-MCP enclosed within the coated pouch and dispersed as 1-MCP/CD in the coating affixed to the interior surface of the pouch.

We have found that when subjected to identical disgorgement conditions, a selected amount of 1-MCP/CD particulate—that is, 1-MCP/CD particulate that is not enclosed or affixed within a coating—disgorges 1-MCP faster than an active pouch having the same amount of 1-MCP/CD particulate of the same particle size or particle size distribution enclosed within the interior volume thereof. In such comparisons, the only difference between the unenclosed 1-MCP/CD particulate and 1-MCP/CD particulate enclosed within the active pouch, is the inclusion of a fixed or substantially fixed interior volume enclosing or surrounding the 1-MCP/CD particulate.

We have further found that when subjected to identical disgorgement conditions, coated pouches disgorge 1-MCP gas faster than laminated coated substrates (two substrate layers having a coating layer disposed therebetween), where the only difference between the laminated coated substrate and the coated pouch is the inclusion of an interior volume of 50 mL to 2000 mL of air or another gas that is not 1-MCP, per milligram of 1-MCP in the coating and present as 1-MCP/CD, whereas the laminate excludes an interior volume. We have further found that when subjected to identical disgorgement conditions, coated substrates disgorge 1-MCP faster than the coated pouches, where the only difference between the coated substrate and the coated pouch is the coated pouch has an enclosed interior volume of 50 mL to 2000 mL of air or another gas that is not 1-MCP, per milligram of 1-MCP in the coating and present as 1-MCP/CD, further wherein the enclosed volume includes the coating, and the free exchange of the active pouch interior volume with the surrounding atmosphere is prevented. Finally, we have found that where the same thermoplastic substrate is used to form a coated substrate, a laminate, and a coated pouch, these three constructions may be subjected to identical disgorgement conditions, where the result of the subjecting is that the coated pouch releases 1-MCP at a rate that is intermediate between the coated substrate and the laminate.

We have further found that increasing the volume of an active pouch interior relative to the weight of 1-MCP within the active pouch and present as 1-MCP/CD obtains a faster rate of 1-MCP disgorgement under identical disgorgement conditions. Thus, when two active pouches differing only by interior volume are subjected to identical disgorgement conditions, the active pouch having a greater interior volume will release 1-MCP faster. Accordingly, disclosed herein are methods of disgorging 1-MCP from a plurality of active pouches, each one of the plurality of active pouches having a different proportion of interior volume to weight of 1-MCP enclosed within the interior volume and present as 1-MCP/CD. Unexpectedly, the plurality of active pouches will each have a different rate of 1-MCP release when the plurality is subjected to identical disgorgement conditions, wherein the relative rate of 1-MCP release is directly related to the interior volume of each of the active pouches in the plurality thereof.

Thus, in embodiments, a method for forming an active pouch having a selected rate of 1-MCP release includes subjecting a selected amount of a 1-MCP/CD particulate to disgorgement conditions, and measuring the rate of 1-MCP release therefrom; selecting a rate of 1-MCP release that is less than the rate of 1-MCP release from the particulate; and forming an active pouch enclosing the selected amount of the 1-MCP/CD particulate within the interior volume thereof, further wherein the active pouch comprises 50 mL to 2000 mL (2 L) interior volume per milligram of 1-MCP present within the interior volume in the form of 1-MCP/CD. In embodiments, the selected rate of 1-MCP release from the active pouch is between 100 ppb and 25 ppm per hour.

In embodiments, the rate of humidity-mediated 1-MCP release from an active pouch can be varied solely by varying the interior volume of the active pouch. This in turn is easily accomplished by adding air (or another gas that is not 1-MCP) to the interior volume of an active pouch, or subtracting air (or another gas) from the interior volume of the active pouch. Accordingly, the interior volume of an active pouch is directly related to the rate of humidity-mediated release of 1-MCP therefrom. Two active pouches that are identical except for their interior volumes, will release 1-MCP at different rates when subjected to identical humidity-mediated disgorgement conditions; wherein the active pouch having the greater interior volume will release 1-MCP faster than the active pouch with the lesser interior volume. Thus, disclosed herein are methods of making active pouches, the methods including: forming a first active pouch defining a first interior volume; forming a second active pouch that is substantially identical to the first active pouch except that the second active pouch defines a second interior volume that is different from the first interior volume; and subjecting the first and second active pouches to an identical set of disgorgement conditions, wherein the second active pouch releases 1-MCP at a different rate than the first active pouch, further wherein the difference in rate is measurable. Such measurable differences may be determined, for example, by measuring 1-MCP gas released from an active pouch using gas chromatographic techniques. In embodiments, the first active pouch releases 1-MCP faster than the second active pouch, when first and second active pouches are subjected to identical disgorgement conditions. In other embodiments, the first active pouch releases 1-MCP slower than the second active pouch, when first and second active pouches are subjected to identical disgorgement conditions.

We have found that the rate of 1-MCP release from an active pouch may be suitably determined, and thus selected and implemented by a user, by comparing the rate of 1-MCP release from the first and second active pouches described above under a selected set of disgorgement conditions; and providing a third active pouch that is identical to the first and second active pouches, but defines an interior volume that is different from the interior volume of the first and second pouches and wherein the third pouch achieves the selected release rate of 1-MCP when subjected to the disgorgement conditions. Thus, in embodiments, the foregoing methods further include selecting a rate of 1-MCP release that is different from the 1-MCP release rate of the first active pouch when subjected to the disgorgement conditions and also different from the 1-MCP release rate of the second active pouch when subjected to the disgorgement conditions; and forming a third active pouch that is identical to the first and second active pouches but defines an interior volume that is different from the interior volume of the first pouch and is also different from the interior volume of the second pouch; wherein the third pouch achieves the selected release rate of 1-MCP when subjected to the disgorgement conditions.

In some embodiments of the above methods, the selected release rate of 1-MCP— that is, the rate of release of the third active pouch—is faster than the 1-MCP release rate of the first active pouch, the second active pouch, or both the first and second active pouch. In such embodiments, the third active pouch defines an internal volume that is greater than the internal volume of the first active pouch, or greater than the internal volume of the second active pouch, or greater than the internal volume of both the first and second active pouches. In other embodiments the selected release rate of 1-MCP is slower than the 1-MCP release rate of the first active pouch, the second active pouch, or both. In such embodiments, the third active pouch defines an internal volume that is less than the internal volume of the first active pouch, or less than the internal volume of the second active pouch, or less than the internal volume of both the first and second active pouch. In still other embodiments the selected release rate of 1-MCP is intermediate between the 1-MCP release rates of the first and second active pouches. In such embodiments, the third active pouch defines an internal volume that is intermediate between the internal volume of the first active pouch and the internal volume of the second active pouch.

In one or more of the foregoing methods, one or more of first through third active pouches define an interior volume 50 mL to 2000 mL per milligram of 1-MCP, wherein the 1-MCP is disposed within the interior volume of the active pouch as 1-MCP/CD. The 1-MCP/CD is a solid crystalline particulate, or is entrained or incorporated in a coating. In embodiments, an active pouch defining an interior volume 50 mL to 2000 mL per milligram of 1-MCP, releases 1-MCP faster than the corresponding laminated structure when the active pouch and the corresponding laminate structure are subjected to identical humidity-mediated disgorgement conditions.

Thus, disclosed herein are methods of making active pouches that include selecting a rate of 1-MCP release under a selected set of disgorgement conditions; providing a pouch enclosing an amount of 1-MCP/CD, including introducing a selected volume of air into the pouch interior to form an active pouch, where the selected volume of air is between 50 mL and 2000 mL of air per milligram of 1-MCP present within the active pouch as 1-MCP/CD; and subjecting the active pouch to the selected disgorgement conditions, wherein the active pouch releases 1-MCP at the selected rate. In embodiments, the selected release rate of 1-MCP is between 100 ppb and 25 ppm per hour under the selected disgorgement conditions. In some such embodiments, the active pouch is a coated pouch that includes 1-MCP/CD entrained or incorporated in a coating, wherein the coating is affixed on at least a portion of the interior surface of the active pouch. In other such embodiments, the active pouch interior volume includes a 1-MCP/CD particulate that is not entrained or incorporated within a coating.

In further embodiments, a method for forming a coated pouch having a selected rate of 1-MCP release includes mixing a carrier with a 1-MCP/CD particulate to form a coating composition, disposing the coating composition on a major surface of a substrate and affixing the coated composition to the substrate to provide a coated substrate, subjecting a first portion of the coated substrate to disgorgement conditions, and measuring the rate of 1-MCP release from the coated substrate; forming a laminate by laminating a second portion of the coated substrate, subjecting the laminate to disgorgement conditions, and measuring the rate of 1-MCP release from the laminated coated substrate; selecting a rate of 1-MCP release that is greater than the rate of 1-MCP release from the laminate and less than the rate of 1-MCP release from the coated substrate; and forming a coated pouch from a third portion of the coated substrate, the coated pouch comprising 50 mL to 2000 mL (2 L) interior volume per milligram of 1-MCP present in the form of 1-MCP/CD in the coating affixed to the interior pouch surface.

In embodiments, a coated pouch provides an intermediate rate of release of 1-MCP when the coated pouch is subjected to disgorgement conditions, that is, the rate of 1-MCP release by the coated pouch is intermediate between the release rate of a corresponding coated substrate and the release rate of a corresponding laminated coated substrate, where "corresponding" means that the coating is the same material and the same coating weight as to between the laminate, the coated pouch, and the coated substrate. The interior volume of the coated pouch relative to the weight or mass of the 1-MCP within the 1-MCP/CD clathrate affixed to an interior surface thereof determines the relative rate of the intermediate release, wherein a greater interior volume relative to the weight of 1-MCP/CD within the interior volume leads to faster release.

Accordingly, in embodiments, a method of obtaining 1-MCP gas released at an intermediate rate includes subjecting a coated pouch to disgorgement conditions to obtain the selected rate of 1-MCP release from the coated pouch. In embodiments, the selected rate of 1-MCP release from the coated pouch is between 100 ppb and 25 ppm per hour. In embodiments, the selected rate of release is intermediate between the rate of 1-MCP release from the corresponding coated substrate and the corresponding laminate, subjected to identical disgorgement conditions.

Accordingly, also disclosed herein are methods of disgorging 1-MCP from any of the active pouches described above. The methods comprise, consist essentially of, or consist of subjecting the active pouches to disgorgement conditions including ambient pressure of about 1 atmosphere, temperature between 0° C. and about 50° C., and relative humidity between about 80% and 100%. The specific disgorgement conditions are suitably selected by a user, for example by placing an active pouch proximal to one or more living plant materials, whereupon respiration of the plant causes release of water vapor proximal to one or more active pouches.

We have found that when subjected to identical disgorgement conditions, coated pouches disgorge 1-MCP gas at a rate that is intermediate between coated substrates and laminate constructions. We have further determined that the rate of 1-MCP disgorgement of the coated pouches increases with increasing ratio of interior pouch volume to mass of 1-MCP in the coating disposed on the interior surface of the pouch. Accordingly, disclosed herein are methods of disgorging 1-MCP from a plurality of coated pouches, each one of the plurality of coated pouches having a different proportion of interior volume to weight of 1-MCP enclosed within the interior volume and affixed to an interior surface as 1-MCP/CD. Unexpectedly, the plurality of coated pouches will each have a different rate of 1-MCP release when the plurality is subjected to identical disgorgement conditions, wherein the relative rate of 1-MCP release is directly related to the interior volume of each of the coated pouches in the plurality thereof.

It is not necessary to include or use liquid water to obtain disgorgement of 1-MCP from the active pouches. Since the pouches are impervious to liquid water, in embodiments disgorgement conditions may further include the further presence of liquid water proximal to or even in contact with the exterior surface of an active pouch. However, in other embodiments disgorgement conditions suitably exclude liquid water proximal to or in contact with the exterior surface of an active pouch.

In some embodiments, a portion or all of the water vapor contacting the active pouches is supplied by biological respiration of a living plant or portion thereof, for example one or more items of fresh produce, wherein the living plant or portion thereof is situated proximal to one or more active pouches and in some embodiments is in contact with one or more active pouches.

In embodiments, a method of treating living plant material is disclosed herein. In some such embodiments the method includes placing a single active pouch proximal to a selected mass of living plant material. In some embodiments a plurality of active pouches, or a mixture of active pouches and conventional, air-filled pouches are configured and arranged to provide a cushion suitable for protecting a living plant or plant part; and a method of treating living plant material is cushioning the living plant or plant part by placing the living plant or plant part in contact with the cushion to provide a cushioned, treated living plant material. The plurality of active pouches may be attached in a single article, such as a strip array or a sheet array.

In some embodiments, the method further includes storing the living plant or plant part, transporting the living plant or plant part, displaying the living plant or plant part, or two or more thereof, during the cushioning and treating. Placement of the living plant or plant part in contact with the active pouch or the cushion causes disgorgement conditions to form, or arise during the cushioning, which in turn causes the release of 1-MCP from the one or more coated pouches. In some such embodiments, the placement of the living plant or plant part is placing the living plant or plant part proximal to or in touching relation with a single active pouch or with a plurality of active pouches.

FIGS. 1-5 show some nonlimiting embodiments of coated pouches and inflatable coated pouches, wherein same or similar numbers used throughout are intended to indicate the same or similar features of the coated pouches and inflatable pouches. FIG. 1A is a schematic representation of a cross-section of a coated pouch 100, wherein a top view of the coated pouch 100 is shown in FIG. 1B, and the cross-sectional view of FIG. 1A is taken along line A in FIG. 1B. FIGS. 1A and 1B shows coated pouch 100 constructed from a first substrate 10, that is folded over and sealed in area 30 to define an interior surface 40, exterior surface 50, and interior volume 60 sealed therein. Interior surface 40 includes a coating 70 affixed to a portion thereof, that is a discrete coating or coated area that includes a 1-MCP/CD particulate affixed within the coating.

Figure 2A:
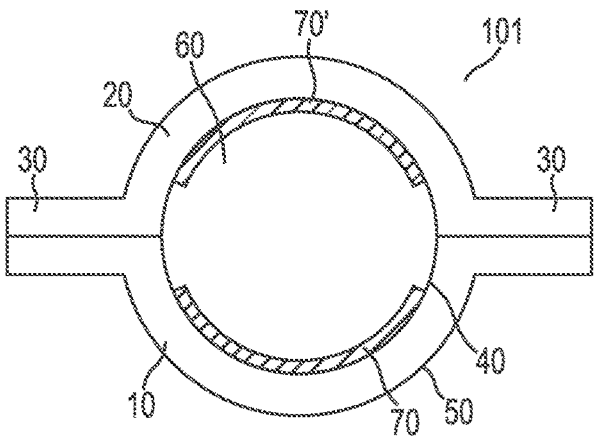
FIG. 2A is a schematic representation of a cross-section of another coated pouch in accordance with the description.
Figure 2B:
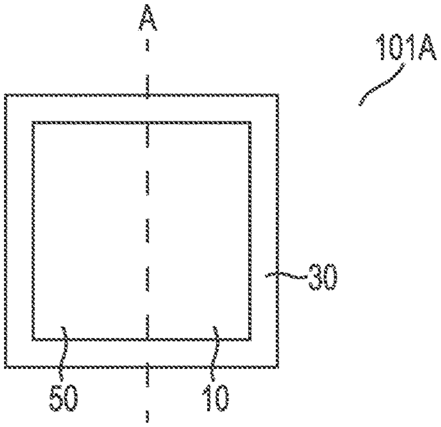
FIG. 2B is a top view of the schematic representation of FIG. 2A.
Figure 2C:
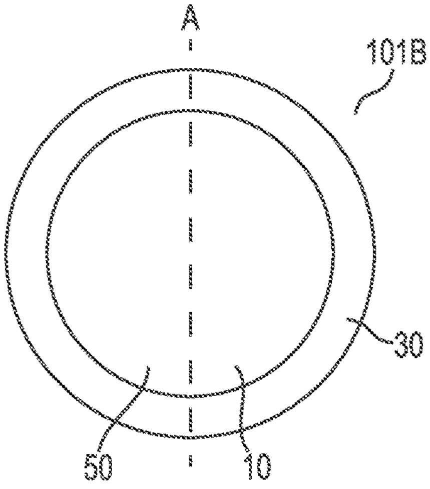
FIG. 2C is an alternative top view of the schematic representation of FIG. 2A.

FIG. 2A is a schematic representation of a cross-section of a coated pouch 101, wherein a top view of the coated pouch 101 is shown in FIG. 2B, wherein the cross-sectional view of FIG. 2A is taken along line A of coated pouch first embodiment 101A as shown in FIG. 2B; or along line A' of coated pouch second embodiment 101B as shown in FIG. 2C. Coated pouches 101A and 101B differ only in the selected coated pouch shape, which is selected to be rectilinear, as shown in FIG. 2B; or arcuate as shown in FIG. 2C. FIGS. 2A-2B show coated pouch 101 constructed from a first substrate 10 and second substrate 20, wherein first substrate 10 and second substrate 20 are different or the same. Coated pouch 101 is joined in area 30 to define interior surfaces 40, exterior surface 50, and interior volumes 60 sealed therein. Interior surface 40 includes two discrete coatings 70, 70' affixed to different portions of interior surface 40. In embodiments, both coatings 70, 70' include the same 1-MCP/CD particulate affixed therein, such as the same particle size 1-MCP/CD affixed therein. In other embodiments, the 1-MCP/CD particulate affixed within coating 70 is different from the 1-MCP/CD particulate affixed within coating 70', such as by particle size. In still other embodiments, the carrier employed to coat and affix coating 70 is different from the carrier employed to coat and affix coating 70', and/or the method employed to affix coating 70 is different from the method employed to affix coated 70'. In still other embodiments, both the 1-MCP/CD particulate and the carrier are different as to between coatings 70, 70'.

Figure 3A:
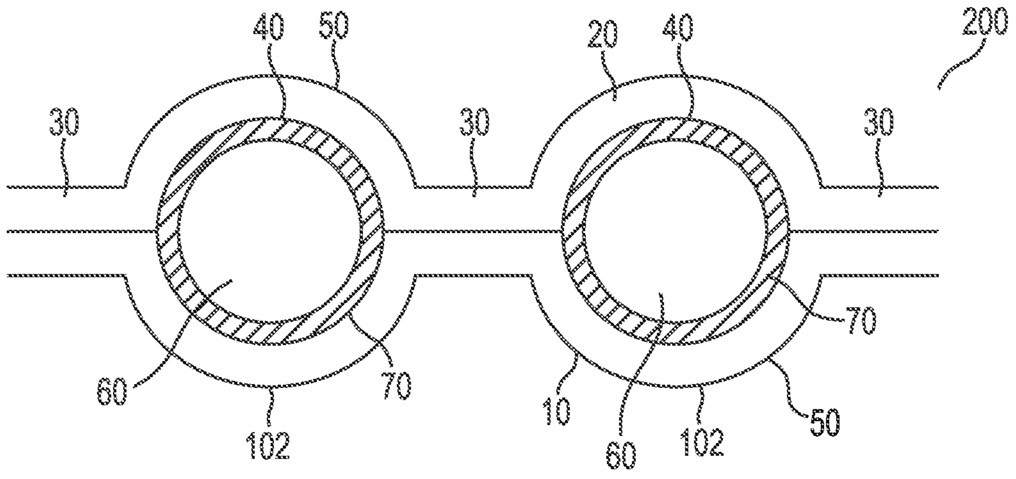
FIG. 3A is a schematic representation of a cross-section of a coated pouch array in accordance with the description.
Figure 3B:
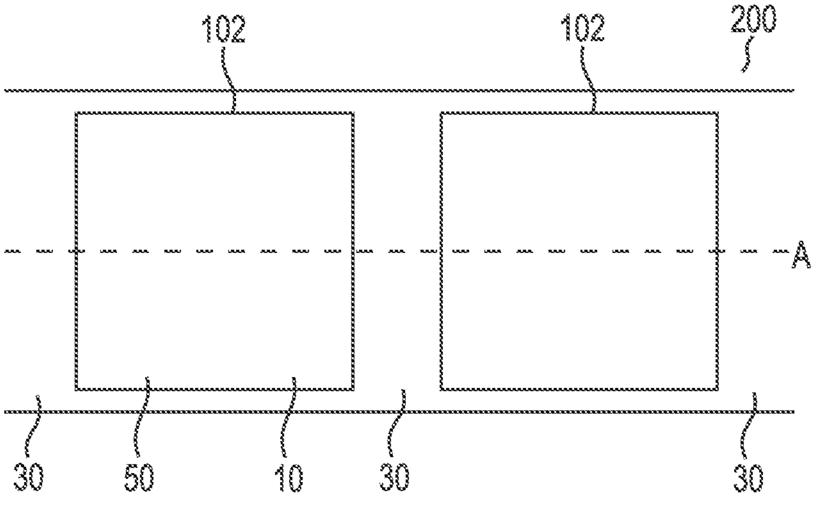
FIG. 3B is a top view of the schematic representation of FIG. 3A.

FIG. 3A is a schematic representation of a cross-section of a coated pouch array 200. A top view of one-dimensional array 200 (that is, a strip of coated pouches provided along a single axis) is shown in FIG. 3B, wherein the cross-sectional view of FIG. 3A is taken along line A of coated pouch array 200 as shown in FIG. 3B. FIGS. 3A, 3B show coated pouches 102 constructed in an array that is a linear or one-dimensional strip provided along a single axis. Array 200 is defined by first substrate 10 and second substrate 20, wherein first substrate 10 and second substrate 20 are different or the same. Coated pouches 102 are joined in area 30 of array 200 to define coated pouch interior surfaces 40, array exterior surface 50, and interior volumes 60 and 60' sealed therein. Interior surface 40 includes coating 70 affixed substantially to the entirety thereof. In embodiments, interior volumes 60, 60' are the same; in other embodiments, interior volumes 60, 60' are different and are selected to be different in order to provide different rates of 1-MCP release when the two pouches side-by-side are subjected to identical disgorgement conditions.

Figure 4A:
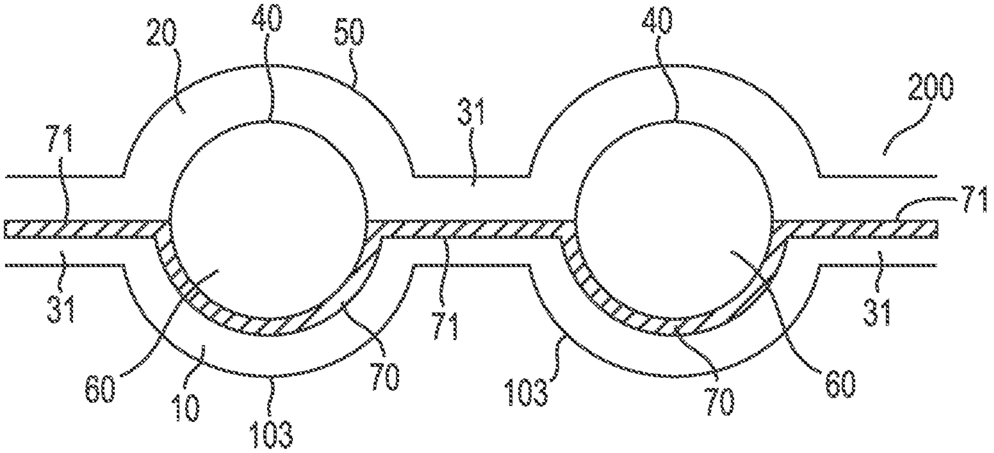
FIG. 4A is a schematic representation of a cross-section of another coated pouch array in accordance with the description.
Figure 4B:
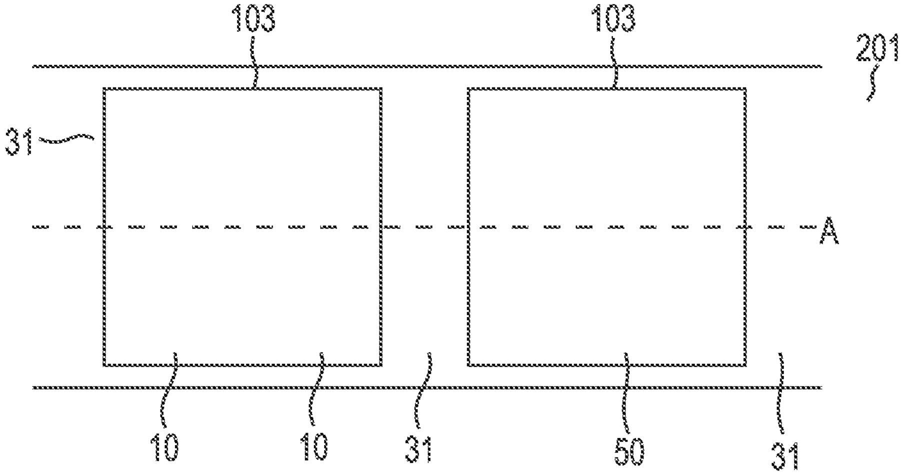
FIG. 4B is a top view of the schematic representation of FIG. 4A.

FIG. 4A is a schematic representation of a cross-section of a coated pouch array 201. A top view of one-dimensional array 201 (that is, a strip of coated pouches provided along a single axis) is shown in FIG. 4B, wherein the cross-sectional view of FIG. 4A is taken along line A of coated pouch array 201 as shown in FIG. 4B. FIG. 4A shows coated pouches 103 constructed in an array that is a linear or one-dimensional strip provided along a single axis. Coated pouches 103 are defined by first substrate 10 and second substrate 20, wherein first substrate 10 and second substrate 20 are different or the same. Coated pouches 103 are joined in area 31 to define interior surfaces 40, exterior surface 50, and interior volumes 60 sealed therein. Interior surface 40 includes coating 70 affixed to a portion thereof. Additionally, coating 71 is disposed in laminated section 31, which is the same as sealed area 30 but includes coating 71 disposed between first substrate 10 and second substrate 20. In embodiments, laminated area 31 excludes free exchange of coating 71 with the atmosphere. In embodiments, coating 71 is the same as coating 70; in other embodiments, coatings 70 and 71 differ in terms of 1-MCP/CD particulate embedded within a coating; carrier used in the coating; coating thickness; or weight percent 1-MCP/CD embedded in the coating.

Figure 5A:
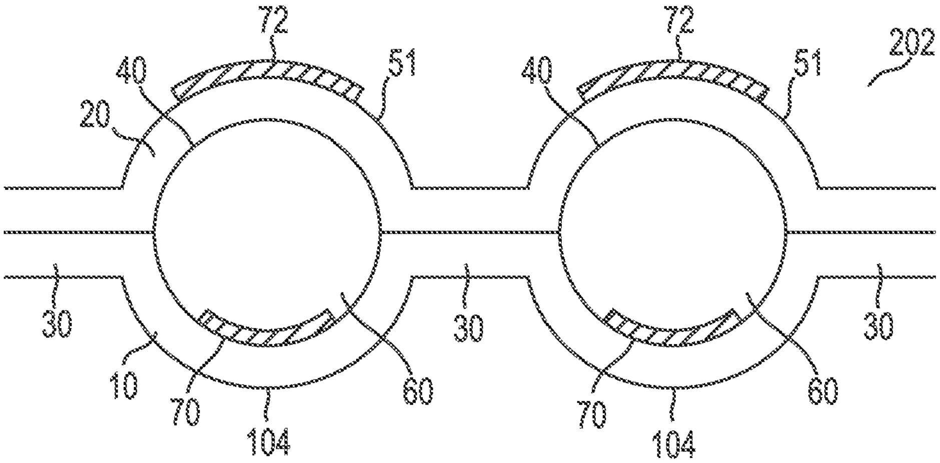
FIG. 5A is a schematic representation of another cross-section of an array in accordance with the description.
Figure 5B:
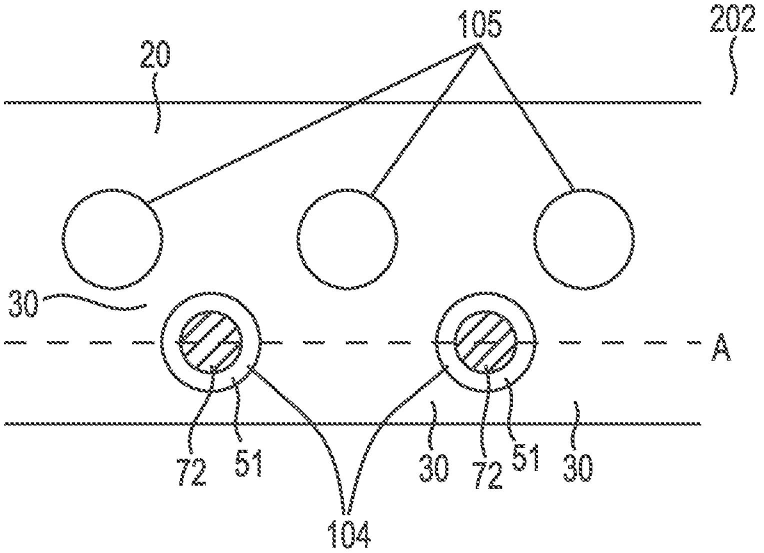
FIG. 5B is a top view of the schematic representation of FIG. 5A.

FIG. 5A is a schematic representation of a cross-section of a pouch array 202 having coated pouches 104 and (uncoated) pouches 105 (not shown in FIG. 5A) arranged in a two-dimensional array (that is, a sheet with pouches provided along at least two axes). A top view of array 202 is shown in FIG. 5B, wherein the cross-sectional view of sheet FIG. 5B is taken along line A to show pouch array 202 in FIG. 5A. FIG. 5B further shows the arrangement of coated pouches 104 and (uncoated) pouches 105 in the array 202. Coated pouches 104 and (uncoated) pouches 105 are both defined by first substrate 10 and second substrate 20 joined or sealed in area 30, wherein first substrate 10 and second substrate 20 are different or the same. Interior surfaces 40 of pouches 104 include a coating 70 affixed to a portion thereof, that is a discrete coating or coated area that includes a 1-MCP/CD particulate affixed within the coating. The interior surfaces of pouches 105 (not shown) do not include a coating including a 1-MCP/CD affixed to a portion thereof. Additionally, coated pouches 104 include an exterior coating 72 affixed to a portion of array exterior surface 51. In embodiments, exterior coating 72 is subjected to direct contact and free exchange with the atmosphere. In embodiments, coating 72 is the same as coating 70; in other embodiments, coatings 70 and 72 differ in terms of 1-MCP/CD particulate embedded within the coatings; carrier used in the coatings; coating thickness; or weight percent 1-MCP/CD embedded in the coatings.

Any of the embodiments of the arrays and coated pouches shown in FIGS. 1-5 above may be provided as inflatable coated pouches. The inflatable coated pouches may be discrete, individual inflatable coated pouches, a plurality thereof provided as a kit; or an array of inflatable coated pouches; or as an array of inflatable coated pouches combined with inflatable pouches (uncoated) without limitation.

EXPERIMENTAL SECTION

General Procedures

A. Clathrate Used in the Experiments

The alpha-cyclodextrin clathrate (complex) of 1-methylcyclopropene (1-MCP) used in the examples herein was from a particular lot number obtained from AgroFresh Solutions of Philadelphia, PA, USA and obtained pre-milled to n average particle size of about 5 μm as measured by laser particle size analyzer as described hereinbelow. This material is referred to herein as ACD1MCP19C005.

B. Concentration of 1-Methylcyclopropene (1-MCP) in Container Headspaces

Concentration of 1-methyl cyclopropene (volume/volume) in container headspace gas was measured by removing 100 μL of the headspace gas using a six port, two-position gas sampling valve (available for example as Valco #EC6W from Valco Instruments Inc. of Houston, TX) interfaced directly to a gas chromatograph (e.g. Agilent 7890B) using a Restek RTx-5, 30 m×530 μm ID×3 μm dF column, 0.25 μm film (available from Restek, Inc., of Bellefonte, PA) equipped with a flame ionization detector (FID) and calibrated against a 6-point 1-butene (99.0% pure, available for example from Scott Specialty Gases, Plumsteadville, PA; also known as Air Liquide America Specialty Gases LLC) calibration curve. Employing this method, the concentration of 1-MCP released (measured as μL/L—volume/volume (v/v)) in a headspace was obtained.

C. Measurement of Moisture Content of Organic Liquids

Moisture content of liquids such as overprint varnish was measured for moisture content by Karl Fisher moisture analysis using a Metrohm TITRANDO 851 coulometer.

D. Measurement of Percent Solids of Solutions

The percent solids of solutions such as lacquers were determined as follows: About 1 mL of the solution was added to each of three pre-weighed aluminum dishes. Each dish was reweighed. The dishes were then heated at 160° C. for one hour. Each dish was then reweighed. The percent solids of each sample was calculated from the weight difference between the weight of the dish before heating and after heating. Then the mean of the three individual values was calculated.

E. Measurement of Coating Weights

To measure coating weight, 1000 feet (304.8 meters) of a 13-inch wide (0.3302-meter wide) of coated roll was wound onto a weighed core having a diameter of three inches (0.0762 meters). The wound roll was reweighed, and the weight of the core was subtracted from the weight of the coated roll to reveal the weight of the coated substrate. Next 1000 feet (304.8 meters) of the uncoated substrate used in the coating of for Coating Rolls 1-4 was wound onto a weighed core having a diameter of three inches (0.0762 meters). The weight of the substrate was calculated. The weight of the substrate was then subtracted from the weight of the coated substrate to yield the weight of the coating. The coating weight was then converted to grams per square inch and grams per square meter.

Example 1

Mean particle size. A sample of the ACD1MCP19C005 was taken and the particle size measured by HORIBA LA-950 Laser Particle Size Analyzer. The results from the particle size measurement are displayed in TABLE 1:

TABLE 1

Alpha-cyclodextrin/1-MCP complex particle size results

| | | ACD1MCP19C005 |
|---|---|---|
| Mean particle size (μm) | | 5.0 |
| Diameter on | D10 | 2.95 |
| cumulative | D50 | 6.31 |
| % (μm) | D90 | 12.4 |

Measurement of 1-MCP content of ACD1MCP19C005. A known mass of 1-MCP/alpha-cyclodextrin clathrate (ACD1MCP19C005, about 0.0100 g) was added to a 248 mL Boston round bottle. Deionized water (3 mL) was added to the bottle, which was instantly capped. The bottle was placed on a shaker for one hour or until the water-ACD1MCP19C005 mixture was clear. Headspace gas (1.0 mL) was removed from the Boston bottle with a graduated syringe and injected into a clean 248 mL bottle sealed with a septum. The sealed bottle was allowed to sit for 15 minutes. Then the volume/volume concentration of 1-MCP in the second bottle was determined as described in "Concentration of 1-methylcyclopropene (1-MCP) in container headspaces" set forth above in the General Procedures section. Accordingly, the percentage of the approximately 0.01 g ACD1MCP19C005 sample that was 1-MCP could be calculated using the density of 1-MCP gas as 2.225 kg/m$^3$ (0.002225 g/mL).

The procedure was repeated a further four times (five procedures were conducted in total) to obtain an average result. The results are set forth in TABLE 2.

TABLE 2

Percent by weight ACD1MCP19C005 that was 1-MCP

| | Sample A | Sample B | Sample C | Sample D | Sample E | Average | Units |
|---|---|---|---|---|---|---|---|
| Mass of sample | 0.0161 | 0.0152 | 0.0140 | 0.0134 | 0.0141 | | g |
| 1-MCP concentration in second bottle | 4.824 | 4.452 | 4.204 | 4.024 | 4.324 | 4.364 | ppm by weight |
| 1-MCP concentration in original bottle | 1206 | 1113 | 1051 | 1006 | 1081 | 1091 | ppm by weight |
| Bottle volume | 248 | 248 | 248 | 248 | 248 | 248 | mL |
| 1-MCP density | 2.225 | 2.225 | 2.225 | 2.225 | 2.225 | 2.225 | kg/m$^3$ |
| Volume of 1-MCP released | 0.2991 | 0.2760 | 0.2606 | 0.2495 | 0.2681 | 0.2707 | mL |
| Volume of 1-MCP released | $2.991 \times 10^{-7}$ | $2.760 \times 10^{-7}$ | $2.606 \times 10^{-7}$ | $2.495 \times 10^{-7}$ | $2.681 \times 10^{-7}$ | $2.707 \times 10^{-7}$ | m$^3$ |
| Mass of 1-MCP released | $6.655 \times 10^{-4}$ | $6.100 \times 10^{-4}$ | $5.800 \times 10^{-4}$ | $5.600 \times 10^{-4}$ | $6.000 \times 10^{-4}$ | $6.000 \times 10^{-4}$ | g |
| ACD1MCP19C005 weight % that is 1-MCP | 4.13 | 4.04 | 4.14 | 4.14 | 4.23 | 4.14 | % by weight |

Thus 4.14±0.07% of the ACD1MCP19C005 by weight was 1-MCP.

Example 2

Sun Chemical DPC-1639 lacquer (also known as Sun Chemical SYSCS007 Vallocoat, available from Sun Chemical of Parsippany-Troy Hills, New Jersey, USA) comprised polyamide resin in a mixture of solvents The kinematic viscosity of the lacquer was adjusted before use as follows: A sample of the dried lacquer was tested using a #3 Zahn cup (available from Cole-Parmer, 795-104). If the effluent time exceeded 21 seconds, a small amount of diluent (described below) was added incrementally and mixed in until the dried lacquer had an effluent time of about 21 seconds. Between 10 mL and 100 mL of diluent was required per gallon of overprint varnish, depending on batch and mixing conditions. The diluent comprised 80% propan-1-ol, 16% of hydrotreated light naphtha (CAS number 64742-49-0), and 4% heptane by weight. The final diluted lacquer comprised about 42.2% solids.

The diluted lacquer was sealed in a one-gallon (3.78 liter) pail with an airtight lid and left overnight. To 96 parts by weight of the diluted lacquer were added 4 parts by weight of the ACD1MCP19C005 as follows: A one-gallon (7.6 liter) capacity bucket of the dried lacquer was mixed using a three-inch Cowles blade at 540 rpm (revolutions per minute). The alpha-cyclodextrin/1-MCP complex was slowly added to the dried lacquer being mixed. The mixture was tested for homogeneity by dipping a wooden tongue depressor into the mixture, removing the tongue depressor, and visually inspecting the mixture on the tongue depressor for agglomerations. Mixing was continued until the mixture was homogeneous, i.e. no large agglomerations were visible on the tongue depressor. The final mixture comprised about 48.1 percent solids including 4 weight percent of the complex. The final mixture was coated immediately following mixing.

Coating was carried out on a flexographic press fitted with an anilox roll of 400 lines per inch and having a volume of 7.06 BCM (billions of cubic microns) and a 100% screen flexographic plate.

Coating was carried out at a web speed of about 200 feet per minute (61 meters per minute) onto a 75 gauge polyester film substrate (0.75 thousandths of an inch thick or 19 microns thick). The treated substrate was dried in line in an impingement oven of about six feet (1.83 meters) in length set at about 140° F. (60° C.) with a residence time of about two seconds to provide a roll of coated polyester.

The dry coating weight was estimated by subtracting the weight of a known area of the 75 gauge substrate from the weight of a sample of the coated polyester of the same area, as described in the General Procedures section above. The amount of ACD1MCP19C005 per unit area could be estimated by using the concentration of the ACD1MCP19C005 in the dry components of the formulation and the dry coating weight.

The coating had an estimated dry coating weight of 0.8052 mg/sq. in. (about 0.1248 mg/cm$^2$) with a calculated 0.0660 mg/sq. in. (0.01023 mg/cm$^2$) of ACD1MCP19C005.

Example 3

Pouches. A label stock comprised a layer of pressure-sensitive adhesive on a 1.5 mil gauge (1.5 thousandths of an inch thick or 38 microns thick) polyester film. Two sheets of the label stock were laminated to each other, adhesive side to adhesive side, to create a label-stock laminate.

Then a sample of the coated polyester from Example 2 was edge-sealed to the label-stock laminate to create a 4 inch by 6 inch (10.2 cm×15.2 cm) pouch using a heat sealer (H-1254 from Uline). The coated polyester was attached to the label-stock laminate coated side to the laminate, so that in the resulting pouch the coating was in the interior of the pouch. A spacer made of polypropylene mesh was sealed into the pouch to ensure an air gap within the pouch. Nine such pouches were made.

Sandwich Laminate Samples. A label stock was made up of a layer of pressure-sensitive adhesive on a 1.5 mil gauge (1.5 thousandths of an inch thick or 38 microns thick) polyester film. Two sheets of the label stock were laminated to each other, adhesive side to polyester side, to create a precursor laminate with exposed adhesive on one side.

Then the coated side of a sample of the coated polyester as described in Example 2 was laminated to the adhesive side of the precursor laminate to form a sandwich laminate. Nine 4 inch by 6 inch samples (10.2 cm×15.2 cm samples) were cut from the sandwich laminate.

Film Samples. Nine 4 inch by 6 inch samples (10.2 cm×15.2 cm samples) were cut from the coated polyester of Example 2.

Example 4

Each of the pouches from Example 3 was rolled up and inserted into a (separate) 250 mL glass Boston round bottle. One mL of deionized water was injected into each bottle with care taken to avoid injection of water directly onto the pouch. After injection of the water, each bottle was immediately sealed with a TEFLON®-faced silicone rubber septum.

Similarly, each sandwich laminate sample and each film sample from Example 3 was rolled up and inserted into a (separate) 250 mL glass Boston round bottle. One mL of deionized water was injected into each bottle with care taken to avoid injection of water directly onto the laminate or film sample. After injection of the water, each bottle was immediately sealed with a TEFLON®-faced silicone rubber septum.

For each bottle, 1-methylcyclopropene (1-MCP) in the headspace was measured by removing a 100 μL sample of the headspace gas. A gas sample was removed from each bottle at two hours, four hours, and 24 hours after the water injection and the concentration of the 1-MCP in that headspace determined using the method described above in General Procedures. Employing this method, the amount of 1-MCP released (measured as μL/L—volume/volume (v/v), or parts per million (ppm) by volume) from each sealed pouch, each sandwich laminate sample, and each film sample at two hours, four hours, and 24 hours was determined. The average results and standard deviations for each time and type of item are displayed in TABLE 3.

TABLE 3

Concentration of 1-MCP released into headspace in Example 4.

| | 1-MCP concentration (ppm) | | |
|---|---|---|---|
| | 2 hours | 4 hours | 24 hours |
| Pouch Average | 3.4 | 4.2 | 5.6 |
| Pouch standard deviation | 1.0 | 1.0 | 1.0 |
| Sandwich laminate average | Not detected | Not detected | 2.3 |
| Sandwich laminate standard deviation | | | 1.7 |
| Film average | 75 | 111 | 119 |
| Film standard deviation | 5.2 | 6.1 | 9.5 |

The results for average 1-MCP released versus time are plotted in FIG. 6 for the sandwich laminate and the pouches.

Example 5

Minimal-volume pouches. A sheet somewhat larger than four inches by twelve inches (10.16 cm by 30.48 cm) was cut from the roll of coated polyester film of Example 2. The sheet was folded over on itself and flattened between the pages of a book so as to provide a folded over sheet of slightly larger than four inches by six inches (10.16 cm by 15.24 cm). The three open edges of the folded over sheet were edge-sealed using a heat sealer (H-1254 from Uline) to form a relatively flat enclosed pouch with minimal interior volume, wherein the interior of the pouch was four inches by six inches (10.16 cm by 15.24 cm) in side aspect. The edges were trimmed. A further two minimal-volume pouches were made in this way.

Mid-volume pouches. A sheet somewhat larger than four inches by twelve inches (10.16 cm by 30.48 cm) was cut from the roll of coated polyester film of Example 2. The sheet was folded over on itself, and the three open edges of the folded over sheet were edge-sealed using a heat sealer (H-1254 from Uline) to form an enclosed pouch with some interior volume occupied by air, wherein the interior of the pouch was about four inches by six inches (10.16 cm by 15.24 cm) in side aspect. The edges were trimmed. A further two mid-volume pouches were made in this way. The pouches contained more air than the minimal-volume pouches.

Maximal-volume pouches. A sheet somewhat larger than four inches by twelve inches (10.16 cm by 30.48 cm) was cut from the roll of coated polyester film of Example 2. The sheet was folded over on itself, and two opposing edges of the folded over sheet were edge-sealed using a heat sealer (H-1254 from Uline) to form a pouch open at one end. The end was pinched shut while compressed air was added to the interior of the pouch with a needle. Once the pouch was inflated and full, the needle was removed and the final edge heat-sealed to provide a sealed enclosed pouch with interior volume occupied by air, wherein the interior of the pouch was about four inches by six inches (10.16 cm by 15.24 cm) in side aspect. The edges were trimmed. A further two maximal-volume pouches were made in this way. The pouches contained more air than either the minimal-volume pouches or the mid-volume pouches.

The average volume of the minimal-volume pouches, the mid-volume pouches, and the maximal-volume pouches was determined by displacement. The full volume ($V_1$) of a large beaker was measured using a graduated cylinder. The beaker was filled with water and the samples submerged completely allowing water to be displaced from the beaker. The sample was removed, then the volume of the remaining water ($V_2$) was measured using a graduated cylinder. The volume of the pouch was determined by subtracting the remaining water volume ($V_2$) from the full volume ($V_1$). This measurement was verified by filling a large, graduated cylinder with a recorded amount of water ($V_i$). The sample was submerged, and the final volume recorded ($V_f$). The volume of the pouch was determined by subtracting the initial volume (Vi) from the final volume ($V_f$). The results are presented in TABLE 4.

Example 6

The following procedure was used to determine 1-MCP release from the pouches made in Example 5. Each pouch was rolled and placed in a separate 16-ounce (480 mL) jar. Two mL of deionized water was carefully added to each jar while avoiding direct contact between liquid water and the pouch. Each jar was sealed with a TEFLON®-faced silicone rubber septum. Then the concentration of 1-MCP was measured in the headspace of each jar at 24 hours after the injection of water into that jar. The headspace concentration was measured using the procedure set forth hereinabove in General Procedures. The averaged results for each type of pouch are set forth in TABLE 4.

The coating weight of the film used to make the pouches in Example 5 was 0.8052 mg/sq. in. (about 0.1248 mg/$cm^2$) with a calculated 0.0660 mg/sq. in. (0.01023 mg/$cm^2$) of ACD1MCP19C005. The coating area per pouch was 2×6×4 square inches (2×15.24×10.16 cm), which is 48 square inches (309.7 square cm). Therefore the amount of coating within each pouch was 0.8052×48 mg, or 38.65 mg. The amount of complex in each pouch was 0.0660 mg/sq. in. (0.01023 mg/$cm^2$)×48 sq. in. (309.7 square cm), which is 3.168 mg. 4.15% by weight of the ACD1MCP19C005 was 1-MCP, which corresponds to 3.168×4.15/100 mg of 1-MCP, or 0.1315 mg of 1-MCP in each pouch (assuming no loss of 1-MCP from the complex during its creation). The pouch volume (mL) per mg of 1-MCP in the pouch was calculated and is set forth in TABLE 4.

TABLE 4

Concentration of 1-MCP released into headspace in Example 6 and pouch volume as measured in Example 5.

| | Released 1-MCP concentration at 24 hours (ppm) | | Pouch | Pouch volume per mg of |
|---|---|---|---|---|
| | Average of three | Standard deviation | volume (mL) | 1-MCP in pouch/ mL-mg$^{-1}$ |
| Minimal-volume pouches | 1.5 | 1.5 | <5 | 38.0 |
| Mid-volume pouches | 2.0 | 0.1 | 24.2 | 184.0 |
| Maximal-volume pouches | 13.0 | 1.6 | 175 | 1330.1 |

Figure 7:
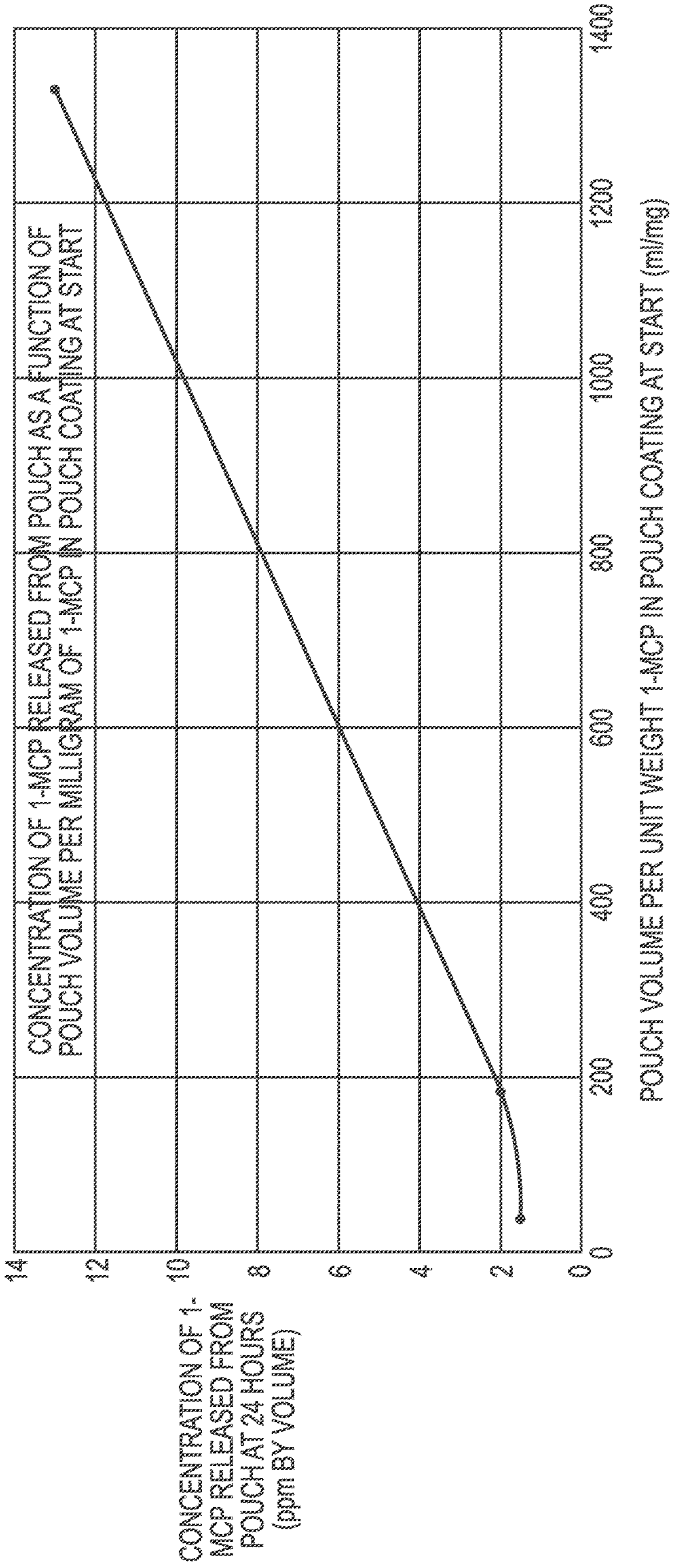
FIG. 7 is a plot of 1-MCP concentration in a headspace as a function of time, in accordance with the procedure of Example 6.

FIG. 7 is a plot of the average concentration of the 1-MCP released from the pouches 24 hours after addition of water to the jar against pouch volume per milligram of 1-MCP in the coating.

What is claimed is:

1. A coated thermoplastic pouch having an exterior surface and an interior surface defining an interior volume that is excluded from free exchange with the atmosphere, the interior volume consisting of one or more gases present at a pressure in excess of atmospheric pressure and a coating affixed to at least a portion of the interior surface, the coating comprising a carrier and a particulate, the particulate comprising a clathrate of 1-methylcyclopropene with α-cyclodextrin (1-MCP/CD); wherein at least a portion of the coated thermoplastic pouch is permeable to 1-methylcyclopropene (1-MCP) gas and at least a portion of the coated thermoplastic pouch is permeable to water vapor.

2. The coated thermoplastic pouch of claim 1 comprising an interior volume of 50 mL to 2000 mL of a gas that is not 1-methylcyclopropene (1-MCP), per milligram of 1-MCP present within the interior coating as 1-MCP/CD.

3. The coated thermoplastic pouch of claim 1 wherein the interior volume comprises a pressure that is 0.1 kPa to 140 kPa in excess of atmospheric pressure.

4. The coated thermoplastic pouch of claim 1 wherein the entirety of the coated thermoplastic pouch is permeable to both water vapor and 1-MCP.

5. The coated thermoplastic pouch of claim 1 wherein a first portion of the coated thermoplastic pouch is permeable to water vapor, and a second portion of the coated thermoplastic pouch is permeable to 1-MCP.

6. The coated thermoplastic pouch of claim 1 wherein the interior volume comprises $CO_2$, $N_2$, $O_2$, air, Ar, Ne, He, or a mixture thereof.

7. A kit comprising two or more coated thermoplastic pouches in accordance with claim 1.

8. The kit of claim 7 wherein the two or more coated pouches are joined in an array.

9. The kit of claim 8 wherein the array is detachably joined.

10. The kit of claim 8 wherein the array is in a strip format.

11. The kit of claim 8 wherein the array is in a sheet format.

12. The kit of claim 8 wherein the array is in a roll format.

13. The coated thermoplastic pouch of claim 1 wherein the air interior volume includes 50% or less relative humidity at 20° C.

14. The coated thermoplastic pouch of claim 1 wherein the gas comprises air.

15. An inflatable thermoplastic pouch having an exterior surface and an interior surface, and a coating affixed to at least a portion of the interior surface, the coating comprising a carrier and a particulate, the particulate comprising a clathrate of 1-methylcyclopropene with α-cyclodextrin (1-MCP/CD);

wherein at least a portion of the inflatable thermoplastic pouch is permeable to 1-methylcyclopropene (1-MCP) gas and at least a portion of the inflatable thermoplastic pouch is permeable to water vapor; and wherein the inflatable thermoplastic pouch is inflated with a gas and then sealed to define an interior volume therein that is excluded from free exchange with the atmosphere and consists of the gas at a pressure in excess of atmospheric pressure and the coating.

16. The inflatable thermoplastic pouch of claim 15 wherein the pressure in excess of atmospheric pressure is 0.1 kPa to 140 kPa in excess of atmospheric pressure.

17. The inflatable thermoplastic pouch of claim 15 wherein the entirety of the inflatable thermoplastic pouch is permeable to both water vapor and 1-MCP.

18. The inflatable thermoplastic pouch of claim 15 wherein a first portion of the inflatable thermoplastic pouch is permeable to water vapor, and a second portion of the coated thermoplastic pouch is permeable to 1-MCP.

19. The inflatable thermoplastic pouch of claim 15 wherein the coating comprises 0.0001 wt % to 50 wt % 1-MCP/CD based on the weight of the coating.

20. The inflatable thermoplastic pouch of claim 15 wherein the gas is air, $CO_2$, $N_2$, $O_2$, Ar, Ne, He, or a mixture thereof.

21. The coated thermoplastic pouch of claim 1 wherein the exterior and interior surfaces are defined by a first thermoplastic substrate and optionally a second thermoplastic substrate, further wherein at least a portion of the pressure in excess of atmospheric pressure is obtained by the mass of the first thermoplastic substrate or a portion thereof and/or the mass of the second substrate or a portion thereof operating to compress the gas within the interior volume.

* * * * *